(12) United States Patent
Hayes

(10) Patent No.: US 7,144,632 B2
(45) Date of Patent: Dec. 5, 2006

(54) ALIPHATIC-AROMATIC POLYETHERESTER COMPOSITIONS, ARTICLES, FILMS, COATING AND LAMINATES AND PROCESSES FOR PRODUCING SAME

(75) Inventor: Richard Allen Hayes, Brentwood, TN (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/459,161

(22) Filed: Jun. 11, 2003

(65) Prior Publication Data

US 2004/0254332 A1 Dec. 16, 2004

(51) Int. Cl.
*B32B 27/00* (2006.01)

(52) U.S. Cl. .............................. 428/423.7; 428/411.1; 442/76; 442/86; 528/272

(58) Field of Classification Search ............. 428/411.1, 428/423.7; 442/76, 86; 528/272
See application file for complete search history.

(56) References Cited

U.S. PATENT DOCUMENTS

| | | | |
|---|---|---|---|
| 3,651,014 A | 3/1972 | Witsiepe | |
| 4,328,333 A | 5/1982 | Barbee et al. | |
| 4,351,750 A * | 9/1982 | Ferm et al. ................... | 524/8 |
| 4,390,687 A | 6/1983 | Tung | |
| 5,164,248 A | 11/1992 | Fleury et al. | |
| 5,219,645 A | 6/1993 | Gallagher et al. | |
| 5,936,045 A | 8/1999 | Warzelhan et al. | |
| 6,046,248 A | 4/2000 | Warzelhan et al. | |
| 6,140,422 A * | 10/2000 | Khanarian et al. .......... | 525/176 |
| 6,255,443 B1 | 7/2001 | Kinkelin et al. | |
| 6,258,924 B1 | 7/2001 | Warzelhan et al. | |
| 6,297,347 B1 | 10/2001 | Warzelhan et al. | |
| 6,342,304 B1 | 1/2002 | Buchanan et al. | |
| 2002/0160674 A1 * | 10/2002 | Kinkelin et al. ............. | 442/76 |

FOREIGN PATENT DOCUMENTS

| | | |
|---|---|---|
| EP | 0 572 424 A2 | 6/1990 |
| EP | 0 882 758 A1 | 12/1998 |
| GB | 1 260 943 | 1/1972 |
| WO | WO 01/19909 A1 | 3/2001 |
| WO | WO 02/169468 A1 | 2/2002 |

* cited by examiner

*Primary Examiner*—Terressa Boykin
(74) *Attorney, Agent, or Firm*—Gail A. Dalickas

(57) ABSTRACT

Aliphatic-aromatic polyetherester compositions, articles made from the aliphatic-aromatic polyetherester compositions, and processes for producing the aliphatic-aromatic polyetherester compositions and articles are provided. Articles that can be made from the aliphatic-aromatic polyetherester compositions include films, coatings and laminates. Some of the compositions and articles are biocompostable. The films can further be used to form shaped articles such as sheets, food packaging such as sandwich wraps, thermoformed containers, and coatings for, for example, films and other substrates. The aliphatic-aromatic polyetheresters are based on copolyesters produced from a mixture of aromatic dicarboxylic acids, aliphatic dicarboxylic acids, poly(alkyene ether) glycols, and glycols.

81 Claims, No Drawings

ALIPHATIC-AROMATIC POLYETHERESTER COMPOSITIONS, ARTICLES, FILMS, COATING AND LAMINATES AND PROCESSES FOR PRODUCING SAME

BACKGROUND

The inadequate treatment of municipal solid waste that is being put in landfills and the increasing addition of nondegradable materials, including plastics, to municipal solid waste streams are combining to drastically reduce the number of landfills available and to increase the costs of municipal solid waste disposal. While recycling of reusable components of the waste stream is desirable in many instances, the costs is of recycling and the infrastructure required to recycle materials is sometimes prohibitive. In addition, there are some products that do not easily fit into the framework of recycling. The composting of non-recyclable solid waste is a recognized and growing method to reduce solid waste volume for landfilling and/or making a useful product from the waste to improve the fertility of fields and gardens. One of the limitations to marketing such compost is the visible contamination by undegraded plastic, such as film or fiber fragments.

It is desired to provide components that are useful in disposable products and that are degraded into less contaminating forms under the conditions typically existing in waste composting processes. Such conditions generally include temperatures of about 70° C. or less, and averaging in the 55–60° C. range; humid conditions as high as 100 percent relative humidity; and exposure times that range from weeks to months. It is further desirable to provide disposable components that will not only degrade aerobically/anaerobically in composting, but will continue to degrade in the soil or a landfill. As long as water is present, the components preferably continue to break down into lower molecular weight fragments, which can be ultimately biodegraded by microorganisms completely into biogas, biomass, and liquid leachate, as occurs with natural organics like wood.

The present invention provides aliphatic-aromatic copolyetheresters. In preferred embodiments, the aliphatic-aromatic copolyetheresters are biodegradable. The aliphatic-aromatic copolyetheresters can be formed into articles such as films, sheets, and containers.

Aliphatic-aromatic polyetheresters generally include polyesters derived from a mixture of aliphatic dicarboxylic acids and aromatic dicarboxylic acids, which also incorporate poly(alkylene ether) glycols. Generally, known aliphatic-aromatic copolyetheresters incorporate high levels of the poly(alkylene ether) glycol component. For example, Witsiepe, in U.S. Pat. No. 3,651,014, Barbee, et al., in U.S. Pat. No. 4,328,333, and Tung, in U.S. Pat. No. 4,390,687, disclose aliphatic-aromatic polyetherester compositions that include high levels of poly(alkylene ether) glycol. The high levels of the poly(alkylene ether) glycol typically translate to lowered thermal properties of the aliphatic-aromatic copolyetheresters. For example, Warzelhan, et al., disclose aliphatic-aromatic polyetherester compositions in U.S. Pat. Nos. 5,936,045, 6,046,248, 6,258,924, and 6,297,347 that have 20–25 mole percent of the poly(alkylene ether) glycol component and are found to have lowered crystalline melting point temperatures in the range of 111° C. to 127.5° C.

Aliphatic-aromatic copolyetheresters have also been disclosed that include mixtures of glycol components. The use of such mixtures has also been disclosed to lead to reduced thermal properties of the aliphatic-aromatic copolyetheresters. For example, Kinkelin, et al., in U.S. Pat. No. 6,255,443, disclose aliphatic-aromatic polyetherester compositions that contain glycol mixtures of nearly equal levels of 1,4-butanediol and 1,6-hexanediol. The resulting aliphatic-aromatic copolyetheresters were disclosed to have lowered crystalline melting point temperatures in the range of 78° C. to 89° C.

Known aliphatic-aromatic copolyetherester compositions and films derived therefrom have not been shown to provide high temperature characteristics, which are desired for many end uses, such as films, coatings and laminates, combined with excellent biodegradation rates. Although the use of blends to form biodegradable materials is known, as disclosed in WO 02/16468 A1, to provide certain film physical properties, the use of polymeric blends necessarily complicates the processes used to produce films, coatings, and laminates. The aliphatic-aromatic copolyetheresters disclosed herein do not require blending and provide biodegradable compositions having advantageous physical properties. The present invention provides aliphatic-aromatic copolyetheresters with improved combinations of thermal properties and biodegradation rates as compared to known aliphatic-aromatic copolyetheresters.

SUMMARY OF THE INVENTION

One aspect of the present invention provides an aliphatic-aromatic copolyetherester comprising an acid component, a glycol component, and 0 to about 5.0 mole percent of a polyfunctional branching agent based on 100 mole percent acid component. The acid component comprises about 90.0 to about 20.0 mole percent of an aromatic dicarboxylic acid component, from about 10.0 to about 80.0 mole percent of an aliphatic dicarboxylic acid component (mole percentages are based on 100 mole percent total acid component). The glycol component comprises about 99.9 to about 92.0 mole percent of a single first glycol component selected from the group consisting of ethylene glycol, 1,3-propanediol and 1,4-butanediol, from about 0.1 to 3.0 mole percent of a poly(alkylene ether) glycol component, from 0 to about 5.0 mole percent of a second glycol component (mole percentages are based on 100 mole percent total glycol component) other than the one selected from the first glycol component group. The polyfunctional branching agent comprises polyfunctional acids, glycols or mixtures thereof.

In some embodiments, the aliphatic-aromatic copolyetheresters include fillers. In some embodiments, the aliphatic-aromatic copolyetheresters are biodegradable.

A further aspect of the present invention provides shaped articles produced from the aliphatic-aromatic copolyetheresters of the present invention In some embodiments, the shaped articles include fillers. Shaped articles include, for example, film, sheets, fiber, melt blown containers, molded parts such as cutlery, foamed parts, coatings, polymeric melt extrusion coatings onto substrates, polymeric solution coatings on substrates, and laminates.

A further aspect of the present invention provides aliphatic-aromatic copolyetheresters that are the aliphatic-aromatic copolyetheresters of the present invention filled with from about 0.01 weight percent to about 80 weight percent filler based on the total weight of the filled aliphatic-aromatic copolyetherester composition.

In some embodiments, the filled aliphatic-aromatic copolyetheresters are biodegradable.

A further aspect of the present invention includes shaped articles produced from the aliphatic-aromatic copolyetheresters of the present invention filled with from about 0.01 weight percent to about 80 weight percent filler based on the total weight of the filled aliphatic-aromatic copolyetherester composition Examples of shaped articles that can be made from the filled aliphatic-aromatic copolyetheresters include film, sheets, fiber, melt blown containers, molded parts, such as cutlery, foamed parts, coatings, polymeric melt extrusion coatings onto substrates, polymeric solution coatings onto substrates, and laminates.

A further aspect of the present invention provides films made from the aliphatic-aromatic copolyetheresters of the present invention.

In some embodiments, the films are oriented. The films can be, for example, uniaxially oriented or biaxially oriented. In some embodiments, the films include fillers.

In some embodiments, the films can be laminated onto a substrate. In still other embodiments, the aliphatic-aromatic copolyetheresters can be coated onto a substrate. In further examples of such embodiments, the aliphatic-aromatic copolyetheresters are coated onto the substrate in the form of a film. Examples of substrates that can be coated or laminated with the aliphatic-aromatic copolyetheresters include paper, paperboard, inorganic foams, organic foams, and inorganic-organic foams.

These and other aspects of the present invention will be apparent to those skilled in the art in view of the following disclosures and the appended claims.

DETAILED DESCRIPTION

The present invention provides aliphatic-aromatic copolyetherester compositions, shaped articles such as films, coatings, and laminates of certain aliphatic-aromatic copolyetheresters and processes for producing the compositions and the articles. The films and coatings can be deposited onto substrates such as, for example, paper, paperboard, inorganic foams, organic foams, and inorganic-organic foams. Laminates can also be deposited onto substrates such as, for example, paper, paperboard, inorganic foams, organic foams, and inorganic-organic foams. The films, coatings, laminates, and substrates having the films coatings and/or laminates deposited thereon, are useful for packaging, particular food packaging, especially for disposable food packaging such as wraps, cups, bowls, and plates.

As used herein, the term "aliphatic polyesters" includes polyesters derived solely from aliphatic dicarboxylic acids.

As used herein, the term "aliphatic-aromatic polyesters" includes polyesters derived from a mixture of aliphatic dicarboxylic acids and aromatic dicarboxylic acids.

As used herein, the term "polyetheresters" includes polyesters that incorporate poly(alkylene ether) glycols, such as poly(ethylene glycol), poly(trimethylene ether glycol), poly(tetramethylene ether)glycol. "Aliphatic-aromatic copolyetheresters" are polyetheresters formed from a dicarboyxlic acid component derived from both aliphatic and aromatic dicarboxylic acids.

As used herein, the term "mixtures derived therefrom", when used in connection with a list of two or more elements, compounds, ingredients, or compositions from which a component can be selected, means that mixtures of any two or more of the listed elements, compounds, ingredients or compositions can be combined to form the total recited quantity of the component.

As used herein, the term "aliphatic-aromatic polyetheresters" includes polyesters derived from a mixture of aliphatic dicarboxylic acids and aromatic dicarboxylic acids that incorporate poly(alkylene ether) glycols.

The aliphatic-aromatic copolyetherester of the present invention comprises an acid component, a glycol component, and 0 to about 5.0 mole percent of a polyfunctional branching agent based on 100 mole percent acid component. The acid component comprises about 90.0 to about 20.0 mole percent of an aromatic dicarboxylic acid component, from about 10.0 to about 80.0 mole percent of an aliphatic dicarboxylic acid component (mole percentages are based on 100 mole percent total acid component). The glycol component comprises about 99.9 to about 92.0 mole percent of a single first glycol component selected from the group consisting of ethylene glycol, 1,3-propanediol and 1,4-butanediol, from about 0.1 to 3.0 mole percent of a poly(alkylene ether) glycol component, from 0 to about 5.0 mole percent of a second glycol component (mole percentages are based on 100 mole percent total glycol component) other than the one selected from the first glycol group. The polyfunctional branching agent comprises polyfunctional acids, glycols or mixtures thereof.

Aromatic dicarboxylic acid components useful in the aliphatic-aromatic copolyetheresters include unsubstituted and substituted aromatic dicarboxylic acids, bis(glycolates) of aromatic dicarboxylic acids, and lower alkyl esters of aromatic dicarboxylic acids having from 8 carbons to 20 carbons. Examples of desirable dicarboxylic acid components include those derived from terephthalates, isophthalates, naphthalates and bibenzoates. Specific examples of desirable aromatic dicarboxylic acid component include terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl)isophthalate, bis(3-hydroxypropyl)isophthalate, bis(4-hydroxybutyl)isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylenaphthalenezoic acid), dimethyl-4,4'-methylenebis(benzoate), and mixtures derived therefrom. Preferably, the aromatic dicarboxylic acid component is derived from terephthalic acid, dimethyl terephthalate, bis(2-hydroxyethyl)terephthalate, bis(3-hydroxypropyl)terephthalate, bis(4-hydroxybutyl)terephthalate, isophthalic acid, dimethyl isophthalate, bis(2-hydroxyethyl)isophthalate, bis(3-hydroxypropyl)isophthalate, bis(4-hydroxybutyl)isophthalate, 2,6-naphthalene dicarboxylic acid, dimethyl-2,6-naphthalate, and mixtures derived therefrom. However, essentially any aromatic dicarboxylic acid known can be used. Preferably, the aliphatic-aromatic copolyetheresters include an acid component comprising between 85 and 30 mole percent of the aromatic dicarboxylic acid component. More preferably, the aliphatic-aromatic copolyetheresters include an acid component comprising between 80 and 40 mole percent of the aromatic dicarboxylic acid component.

Aliphatic dicarboxylic acid components useful in the aliphatic-aromatic copolyether esters include unsubstituted, substituted, linear, and branched, aliphatic dicarboxylic acids, bisglycolates of aliphatic dicarboxylic acids, and lower alkyl esters of aliphatic dicarboxylic acids having 2 to 36 carbon atoms. Specific examples of desirable aliphatic dicarboxylic acid components include, oxalic acid, dimethyl oxalate, malonic acid, dimethyl malonate, succinic acid, dimethyl succinate, methylsuccinc acid, glutaric acid, dimethyl glutarate, bis(2-hydroxyethyl)glutarate, bis(3-hydroxypropyl)glutarate, bis(4-hydroxybutyl)glutarate, 2-methylglutaric acid, 3-methylglutaric acid, adipic acid, dimethyl adipate, bis(2-hydroxyethyl)adipate, bis(3-hydroxypropyl)adipate, bis(4-hydroxybutyl)adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom. Preferably, the aliphatic dicarboxylic acid component is selected from the group of succinc acid, dimethyl succinate, glutaric acid, dimethyl glutarate, adipic acid, dimethyl adipate and mixtures derived therefrom. However, essentially any aliphatic dicarboxylic acid known can be used. Preferably, the aliphatic-aromatic copolyetheresters include acid component comprising between 15 and 70 mole percent of the aliphatic dicarboxylic acid component.

More preferably, the aliphatic-aromatic copolyetheresters include acid component comprising between 20 and 60 mole percent of the aliphatic dicarboxylic acid component.

Poly(alkylene ether)glycols useful in the aliphatic-aromatic copolyetheresters preferably have a molecular weight in the range of about 500 to about 4000. Specific examples of poly(alkylene ether)glycols useful in the aliphataic-aromatic copolyetheresters include poly(ethylene glycol), poly(1,3-propylene glycol), poly(1,4-butylene glycol), (polytetrahydrofuran), poly(pentmethylene glycol), poly(hexamethylene glycol), poly(hepthamethyqene glycol), poly(ethylene glycol)-block-poly(propylene glycol)-block-poly(ethylene glycol), 4,4'-isopropylidenediphenol ethoxylate (Bisphenol A ethoxylate), 4,4'-(1-phenylethylidene)bisphenol ethoxylate (Bisphenol AP ethoxylate), 4,4'-ethylidenebisphenol ethoxylate (Bisphenol E ethoxylate), bis(4-hydroxyphenyl) methane ethoxylate (Bisphenol F ethoxylate), 4,4'-(1,3-phenylenediisopropylidene)bisphenol ethoxylate (Bisphenol M ethoxylate), 4,4'-(1,4-phenylenediisopropylidene)bisphenol ethoxylate (Bisphenol P ethoxylate), 4,4'sulfonyldiphenol ethoxylate (Bisphenol S ethoxylate), 4,4'-cyclohexylidenebisphenol ethoxylate (Bisphenol Z ethoxylate), and mixtures derived therefrom. However, essentially any poly(alkylene ether) glycol known can be used.

Second glycol components useful in the aliphatic-aromatic copolyetheresters include unsubstituted, substituted, straight chain, branched, cyclic aliphatic, aliphatic-aromatic and aromatic diols having from 2 carbon atoms to 36 carbon atoms. Specific examples of the desirable other glycol component include ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), tri(ethylene glycol) and mixtures derived therefrom. However, essentially any glycol known can be used.

Polyfunctional branching agents that can optionally be used in the aliphatic-aromatic copolyetheresters include any agents having three or more carboxylic acid functions, hydroxy functions or mixtures thereof. Specific examples of the desirable polyfunctional branching agent component include 1,2,4-benzenetricarboxylic acid, (trimellitic acid), trimethyl-1,2,4-benzenetricarboxylate, tris(2-hydroxyethyl)-1,2,4-benzenetricarboxylate, tris(3-hydroxypropyl)-1,2,4-benzenetricarboxylate, tris(4-hydroxybutyl)-1,2,4-benzenetricarboxylate, 1,2,4-benzenetricarboxylic anhydride, (trimellitic anhydride), 1,3,5-benzenetricarboxylic acid, 1,2,4,5-benzenetetracarboxylic acid, (pyromellitic acid), 1,2,4,5-benzenetetracarboxylic dianhydride, (pyromellitic anhydride), 3,3',4,4'-benzophenonetetracarboxyic dianhydride, 1,4,5,8-naphthalenetetracarboxylic dianhydride, citric acid, tetrahydrofuran-2,3,4,5-tetracarboxylic acid, 1,3,5-cyclohexanetricarboxylic acid, pentaerythritol, glycerol, 2-(hydroxymethyl)-1,3-propanediol, 2,2-bis(hydroxymethyl)propionic acid, and mixtures derived therefrom. However, essentially any polyfunctional material that includes three or more carboxylic acid or hydroxyl functions can be used. The polyfunctional branching agent can be included when higher resin melt viscosity is desired for specific end uses. Examples of such end uses include melt extrusion coatings, melt blown films or containers, and foams. Preferably, if a polyfunctional branching agent is used, the aliphatic-aromatic copolyetherester includes up to about 1.0 mole percent of the polyfunctional branching agent.

To provide the desired physical properties, the aliphatic-aromatic copolyetheresters of the present invention preferably have an inherent viscosity (IV) of at least about 0.15 dL/g, as measured on a 0.5 percent (weight/volume) solution of the copolyester in a 50:50 (weight) solution of trifluoroacetic acid:dichloromethane solvent system at room temperature. For some applications, the IV of the aliphatic-aromatic copolyetheresters is preferably at least 0.35 dL/g. Such higher inherent viscosities are desirable for some applications, such as films, bottles, sheets, and molding resins. For such applications in which a higher intrinsic viscosity is desired, polymerization conditions can be adjusted to obtain the desired inherent viscosities, for example, of at least about 0.5 and desirably higher than about 0.65 dL/g. Further processing of the copolyester can achieve inherent viscosities of 0.7, 0.8, 0.9, 1.0, 1.5, 2.0 dL/g and even higher.

As known to those skilled in the art, the inherent viscosity is an indicator of molecular weight. When the molecular weight is not measured directly, the inherent viscosity of a polymer in solution on the melt viscosity is used as an indicator of molecular weight. The inherent viscosities are particularly useful as an indicator of molecular weight for comparisons of samples within a polymer family, such as poly(ethylene terephthalate), poly(butylene terephthalate), etc., and are used as an indicator of molecular weight herein.

The aliphatic-aromatic copolyetherester of the present invention preferably incorporates the dicarboxylic acids and the glycols in approximately stoichiometric amounts. Preferably this would be in the range of 95 to 105 mole percent of total diacids incorporated into the final polymer based on 100 mole percent total glycols. More preferably, this would be in the range of 98 to 102 mole percent of total diacids incorporated into the final polymer based on 100 mole percent total glycols.

The aliphatic-aromatic copolyetheresters can be prepared by conventional polycondensation techniques. The compositions of the aliphatic-aromatic copolyetheresters can vary somewhat depending upon the method of preparation used, particularly in the amount of diol that is present within the copolyetherester. Exemplary preparation methods include the reaction of diol monomers with acid chlorides. For example, acid chlorides of the aromatic dicarboxylic acid component and acid chlorides of the aliphatic dicarboxylic acid component can be combined with the first glycol component, the poly(alkylene ether) glycol, and the second glycol component in a solvent, such as toluene, in the presence of a base, such as pyridine, which base neutralizes the hydrochloric acid as it is produced. Such procedures are described, for example, by R. Storbeck, et al., in *J. Appl. Polymer Science*, Vol. 59, pp. 1199–1202 (1996), the disclosure of which is hereby incorporated herein by reference. Other well-known variations using acid chlorides can also be used, such as interfacial polymerization methods, or the monomers can simply be stirred together while heating.

When the aliphatic-aromatic copolyetherester is made using acid chlorides, the ratio of the monomer units in the product polymer is about the same as the ratio of reacting monomers. Therefore, the ratio of monomers charged to the reactor is about the same as the desired ratio in the product. A stoichiometric equivalent of the diol components and the diacid components generally can thus be used to obtain a high molecular weight polymer.

Preferably, the aliphatic-aromatic copolyetheresters are produced by a melt polymerization method. In a melt polymerization method, the aromatic dicarboxylic acid component, (as acid, ester, or mixtures derived therefrom), the aliphatic dicarboxylic acid component, (as acid, ester, or mixtures derived therefrom), the first glycol component, the poly(alkylene ether) glycol, the second glycol component and optionally the polyfunctional branching agent, are combined in the presence of a catalyst and heated to a high enough temperature that the monomers combine to form esters and diesters, then oligomers, and finally polymers. The polymerization process produces a molten product. Generally, the first glycol component and the second glycol component are volatile and distill from the reactor as the polymerization proceeds. Such procedures are generally known.

The melt polymerization conditions, particularly with respect to the amounts of monomers used, depend on the polymer composition that is desired. The amount of the first glycol component, second glycol component, poly(alkylene ether)glycol component, aromatic dicarboxylic acid component, aliphatic dicarboxylic acid component, and branching agent can be chosen so that the aliphatic-aromatic copolyetherester produced contains the desired amounts of the various monomer units, desirably with equimolar amounts of monomer units derived from the respective diol and diacid components. Because of the volatility of some of the monomers, especially some of the first glycol components and the second glycol components, and depending on such variables as whether the reactor is sealed, (i.e., is under pressure), the polymerization temperature ramp rate, and the efficiency of the distillation columns used, it may be preferred to include some components in excess at the beginning of the polymerization reaction and remove excesses of such components by distillation as the reaction proceeds.

The exact amount of monomers to be charged to a particular reactor can be determined by a skilled practitioner, but often will be within the guidelines provided herein. Excesses of the diacid, the first glycol component, and/or the second glycol component can be desirably charged, and the excess diacid, first glycol and/or second glycol can be removed by distillation or other method of evaporation as the polymerization reaction proceeds. Ethylene glycol, 1,3-propanediol, and 1,4-butanediol are desirably charged in an amount about 10 to about 100 percent greater than the amount desired in the aliphatic-aromatic copolyetherester. More preferably, the first glycol component is charged in an amount about 20 to about 70 percent greater than the amount desired in the aliphatic-aromatic copolyetherester. The second glycol component is desirably charged in an amount from 0 to about 100 percent greater than the amount desired in the aliphatic-aromatic copolyetherester. The amount charged depends in part on the volatility of the second glycol component.

The width of the ranges provided for the various components used in making the aliphatic-aromatic copolyetherester is due to the wide variation in loss of components during polymerization, depending in part on the efficiency of distillation columns and other kinds of recovery and recycle systems, and thus are only an approximation. Exact amounts of monomers preferably charged to a reactor to achieve a specific composition in an aliphatic-aromatic copolyetherester can be determined by a skilled practitioner.

In a preferred polymerization process, the monomers are combined to form a mixture, and heated gradually with mixing with a catalyst or catalyst mixture to a temperature in the range of 230° C. to about 300° C., desirably 250° C. to 295° C. The exact conditions and the nature and amount of the catalysts depend on whether the diacids are polymerized as true acids or as dimethyl esters. The catalyst can be included initially with the reactants, and/or can be added one'or more times to the mixture as it is heated. The catalyst used can be modified as the reaction proceeds. The heating and stirring are continued for a sufficient time and to a sufficient temperature, generally with removal by distillation of excess reactants, to yield a molten polymer having a high enough molecular weight to be suitable for making fabricated products.

Catalysts that can be used include salts of Li, Ca, Mg, Mn, Zn, Pb, Sb, Sn, Ge, and Ti, such as acetate salts and oxides, including glycol adducts, and Ti alkoxides. Such catalysts are known, and the specific catalyst and/or combination and/or sequence of catalysts used can be selected by a skilled practitioner. The preferred catalyst and preferred conditions depend, in part, on, for example, whether the diacid monomer is polymerized as a free diacid or as a dimethyl ester, and on the chemical identity of the diol components. However, essentially any catalyst system known for use in polymerization reactions can be used.

The monomer composition of the aliphatic-aromatic copolyetherester can be chosen based on specific uses and/or for specific sets of properties desired in the aliphatic-aromatic copolyetherester. As one skilled in the art will appreciate, the thermal properties observed are a complex function of the chemical identity and amount of each component utilized in making the aliphatic-aromatic copolyetherester. The melt condensation process described hereinabove can be used to make a wide variety of aliphatic-aromatic copolyetheresters having adequate inherent viscosity for many applications. Solid-state polymerization can be used to achieve even higher inherent viscosities (molecular weights).

An aliphatic-aromatic copolyetherester made by melt polymerization, after extruding, cooling and pelletizing, may be essentially noncrystalline. As known to those skilled in the art, noncrystalline polymers can be made semicrystalline by heating the polymer to a temperature above its glass transition temperature for an extended period of time. The heating induces crystallization so that the product can then be heated to a higher temperature to raise the molecular weight. Alternatively, crystallinity can be produced prior to solid-state polymerization by treatment with a relatively poor solvent for polyesters, which treatment induces crystallization. Such solvents reduce the glass transition temperature (Tg), allowing for crystallization. Solvent induced crystallization is known for polyesters and is described in U.S. Pat. No. 5,164,478 and U.S. Pat. No. 3,684,766. The aliphatic-aromatic copolyetherester in a semicrystalline state can then be subjected to solid-state polymerization by placing the pelletized or pulverized polymer into a stream of an inert gas, usually nitrogen, or under a vacuum of 1 Torr, at an elevated temperature, but below the melting temperature of the polymer for an extended period of time.

The aliphatic-aromatic copolyetheresters can include additives known for use in polyesters. It is preferred that the additives are nontoxic, biodegradable and biobenign. Such additives can include thermal stabilizers such as, for example, phenolic antioxidants; secondary thermal stabilizers such as, for example, thioethers and phosphates; UV absorbers such as, for example benzophenone- and benzotriazole-derivatives; and/or UV stabilizers such as, for example, hindered amine light stabilizers, (HALS). Other additives that can be used include plasticizers, processing aids, flow enhancing additives, lubricants, pigments, flame retardants, impact modifiers, nucleating agents to increase crystallinity, antiblocking agents such as silica, base buffers such as sodium acetate, potassium acetate, and tetramethyl ammonium hydroxide, (for example; as disclosed in U.S. Pat. Nos. 3,779,993, 4,340,519, 5,171,308, 5,171,309, and U.S. Pat. No. 5,219,646 and references cited therein). Specific examples of plasticizers that can be added to improve processing and/or final mechanical properties, or to reduce rattle or rustle of films, coatings and laminates made from the aliphatic-aromatic copolyetheresters, include soybean oil, epoxidized soybean oil, corn oil, castor oil, linseed oil, epoxidized linseed oil, mineral oil, alkyl phosphate esters, Tween® 20, Tween® 40, Tween® 60, Tween® 80, Tween® 85, sorbitan monolaurate, sorbitan monooleate, sorbitan monopalmitate, sorbitan trioleate, sorbitan monostearate, citrate esters, such as trimethyl citrate, triethyl citrate, (Citroflex® 2, produced by Morflex, Inc. Greensboro, N.C.), tributyl citrate, (Citroflex® 4, produced by Morflex, Inc., Greensboro, N.C.), trioctyl citrate, acetyltri-n-butyl citrate, (Citroflex® A4, produced by Morflex, Inc., Greensboro, N.C.), acetyltriethyl citrate, (Citroflex® A-2, produced by Morflex, Inc., Greensboro, N.C.), acetyltri-n-hexyl citrate, (Citroflex® A6, produced by Morflex, Inc., Greensboro, N.C.), and butyryltri-n-hexyl citrate, (Citroflex® B-6, produced by Morflex, Inc., Greensboro, N.C.), tartarate esters, such as dimethyl tartarate, diethyl tartarate, dibutyl tartarate, and dioctyl tartarate, poly(ethylene glycol), derivatives of poly(ethylene glycol), paraffin, monoacyl carbohydrates, such as 6-O-sterylglucopyranoside, glyceryl monostearate, Myvaplex® 600, (concentrated glycerol monostearates), Myvaplex®, (concentrated glycerol monostearate that is a 90% minimum distilled monoglyceride produced from hydrogenated soybean oil and that is composed primarily of stearic acid esters), Myvacet, (distilled acetylated monoglycerides of modified fats), Myvacet® 507, (48.5 to 51.5 percent acetylation), Myvacet® 707, (66.5 to 69.5 percent acetylation), Myvacet® 908, (minimum of 96 percent acetylation), Myverol®, (concentrated glyceryl monostearates), Acrawax®, N,N-ethylene bis-stearamide, N,N-ethylene bisoleamide, dioctyl adipate, diisobutyl adipate, diethylene glycol dibenzoate, dipropylene glycol dibenzoate, polymeric plasticizers, such as poly(1,6-hexamethylene adipate), poly(ethylene adipate), Rucoflex®, and other compatible low molecular weight polymers and mixtures derived therefrom. Preferably, the plasticizers and other additives are nontoxic and biodegradable and/or bio-derived. However, essentially any additive known can be used.

In some embodiments, the aliphatic-aromatic copolyetheresters can be filled with inorganic, organic and/or clay fillers, such as, for example, wood flour, gypsum, talc, mica, carbon black, wollastonite, montmorillonite minerals, chalk, diatomaceous earth, sand, gravel, crushed rock, bauxite, limestone, sandstone, aerogels, xerogels, microspheres, porous ceramic spheres, gypsum dihydrate, calcium aluminate, magnesium carbonate, ceramic materials, pozzolamic materials, zirconium compounds, xonotlite, (a crystalline calcium silicate gel), perlite, vermiculite, hydrated or unhydrated hydraulic cement particles, pumice, perlite, zeolites, kaolin, clay fillers, including both natural and synthetic clays and treated and is untreated clays, such as organoclays and clays that have been surface treated with silanes and stearic acid to enhance adhesion with the copolyester matrix, smectite clays, magnesium aluminum silicate, bentonite clays, hectorite clays, silicon oxide, calcium terephthalate, aluminum oxide, titanium dioxide, iron oxides, calcium phosphate, barium sulfate, sodium carbonate, magnesium sulfate, aluminum sulfate, magnesium carbonate, barium carbonate, calcium oxide, magnesium oxide, aluminum hydroxide, calcium sulfate, barium sulfate, lithium fluoride, polymer particles, powdered metals, pulp powder, cellulose, starch, chemically modified starch, thermoplastic starch, lignin powder, wheat, chitin, chitosan, keratin, gluten, nut shell flour, wood flour, corn cob flour, calcium carbonate, calcium hydroxide, glass beads, hollow glass beads, seagel, cork, seeds, gelatins, wood flour, saw dust, agar-based materials, reinforcing agents, such as glass fiber, natural fibers, such as sisal, hemp, cotton, wool, wood, flax, abaca, sisal, ramie, bagasse, and cellulose fibers, carbon fibers, graphite fibers, silica fibers, ceramic fibers, metal fibers, stainless steel fibers, recycled paper fibers, for example, from repulping operations. Fillers can tend to increase the Young's modulus, improve the dead-fold properties, improve the rigidity of films, coatings and laminates, decrease the cost, and reduce the tendency of the film, coating, or laminate to block or self-adhere during processing or use. The use of fillers can also help to produce plastic articles that have many of the qualities of paper, such as texture and feel, as disclosed by, for example, Miyazaki, et al., in U.S. Pat. No. 4,578,296. Essentially any filler material known can be used in the aliphatic-aromatic copolyetheresters. Any desired additives, fillers or blend materials can be added before the polymerization process, at any stage during the polymerization process or in a post polymerization process.

Clay fillers that can be used in the aliphatic-aromatic copolyetheresters include both natural and synthetic clays and untreated and treated clays, such as organoclays and clays that have been surface treated with silanes or stearic acid to enhance the adhesion with the copolyester matrix. Specific usable clay materials include, for example, kaolin, smectite clays, magnesium aluminum silicate, bentonite clays, montmorillonite clays, hectorite clays, and mixtures derived therefrom. The clays can be treated with organic materials, such as surfactants, to make them organophilic. Specific commercial examples of usable clay fillers include Gelwhite MAS 100, a commercial product of the Southern Clay Company (magnesium aluminum silicate); Claytone 2000, a commercial product of the Southern Clay Company; Gelwhite L, a commercial product of the Southern Clay Company; Cloisite 30 B, a commercial product of the Southern Clay Company, that is defined as an organophilic natural montmorillonite clay with bis(2-hydroxyethyl) methyl tallow quaternary ammonium chloride salt; Cloisite Na, a commercial product of the Southern Clay Company, that is defined as a natural montmorillonite clay; Garamite 1958, a commercial product of the Southern Clay Company, that is defined as a mixture of minerals; Laponite RDS, a commercial product of the Southern Clay Company, that is defined as a synthetic layered silicate with an inorganic polyphosphate peptiser; Laponite RD, a commercial product of the Southern Clay Company, that is defined as a synthetic colloidal clay; Nanomers, that are commercial products of the Nanocor Company, that are defined as montmorillonite minerals that have been treated with compatibilizing agents; Nanomer 1.24TL, a commercial product of the Nanocor Company, that is defined as a montmorillonite mineral surface treated with amino acids; "P Series" Nanomers, that are commercial products of the Nanocor Company, that are defined as surface modified montmorillonite minerals; Polymer Grade (PG) Montmorillonite PGW, a commercial product of the Nanocor Company, that is defined as a high purity aluminosilicate mineral, sometimes referred to as a phyllosilicate; Polymer Grade (PG) Montmorillonite PGA, a commercial product of the Nanocor Company, that is defined as a high purity aluminosilicate mineral, sometimes referred to as a phyllosilicate; Polymer Grade (PG) Montmorillonite PGV, a commercial product of the Nanocor Company, that is defined as a high purity aluminosilicate mineral, sometimes referred to as a phyllosilicate; Polymer Grade (PG) Montmorillonite PGN, a commercial product of the Nanocor Company, that is defined as a high purity aluminosilicate mineral, sometimes referred to as a phyllosilicate; and mixtures derived therefrom. However, essentially any clay filler known can be used.

Some clay fillers can exfoliate to provide nanocomposites. This is especially true for the layered silicate clays, such as smectite clays, magnesium aluminum silicate, bentonite clays, montmorillonite clays, and hectorite clays. Such clays can be natural or synthetic, treated or not.

The particle sizes of fillers for use in the aliphatic-aromatic copolyetheresters can be within a wide range. As known to those skilled in the art, the filler particle size can be tailored based on the desired use of the filled aliphatic-aromatic copolyetherester. It is generally preferred that the average diameter of the filler be less than about 40 microns. More preferably, the average diameter of the filler is less than about 20 microns. However, fillers having diameters outside the preferred ranges can be used. The filler can include particle sizes ranging up to 40 mesh, (US Standard), or larger. Mixtures of filler particle sizes can also be advantageously used. For example, mixtures of calcium carbonate fillers with average particle sizes of about 5 microns and of about 0.7 microns can provide better space filling of the filler within the copolyetherester matrix. Use of two or more filler particle sizes allows for improved particle packing. In preferred particle packing, the spaces between a groups of large particles are substantially occupied by a selected group of smaller filler particles. In general, the particle packing is increased whenever any given set of particles is mixed with another set of particles having a particle size that is at least about 2 times larger or smaller than that of the first group of particles. The particle packing density for a two-particle system is maximized whenever the size ratio of a given set of particles is from about 3 to 10 times the size of another set of particles. Similarly, three or more different sets of particles can be used to further increase the particle packing density. The degree of packing density that will be optimal will depend on a number of factors, including, for example, the types and concentrations of the various components within both the thermoplastic polymer phase and the solid filler phase, the film, coating or lamination process used, and the desired mechanical, thermal and/or other performance properties of the final products to be manufactured. Andersen, et al., in U.S. Pat. No. 5,527,387, disclose particle-packing techniques. Filler concentrates that incorporate a mixture of filler particle sizes based on the above particle packing techniques are commercially available from the Shulman Company under the tradename Papermatch®.

The filler can be added to the aliphatic-aromatic copolyetherester at any stage during polymerization or after the polymerization is completed. For example, the fillers can be added with the copolyetherester monomers at the start of the polymerization process. This is preferable with, for example, the use of silica and titanium dioxide fillers, to provide adequate dispersion of the fillers within the polyester matrix. Alternatively, the filler can be added at an intermediate stage of the polymerization, for example, when a precondensate has formed and as the precondensate passes into the polymerization vessel. As yet a further alternative, the filler can be added after the copolyetherester exits the polymerizer. For example, the aliphatic-aromatic copolyetherester can be melt fed to any intensive mixing operation, such as a static mixer or a single- or twin-screw extruder and compounded with the filler.

As yet a further exemplary method for producing filled aliphatic-aromatic copolyetheresters, the aliphatic-aromatic copolyetherester can be combined with the filler in a subsequent postpolymerization process. Typically, such a process involves intensive mixing of the molten aliphatic-aromatic copolyetherester with the filler. The intensive mixing can be provided by, for example, static mixers, Brabender mixers, single screw extruders, and twin screw extruders. In a typical process, the aliphatic-aromatic copolyetherester is dried and then mixed with the filler. Alternatively, the aliphatic-aromatic copolyetherester and the filler can be cofed through two different feeders. In an extrusion process, for example, the aliphatic-aromatic copolyetherester and the filler can be fed into the back, feed section of the extruder. The aliphatic-aromatic copolyetherester and the filler can be advantageously fed into two different locations of the extruder. For example, the aliphatic-aromatic copolyetherester can be added in the back, feed section of the extruder while the filler is fed, ("side-stuffed"), in the front of the extruder near the die plate. The extruder temperature profile can be designed to allow the aliphatic-aromatic copolyetherester to melt under the processing conditions. The screw design can also provide stress and, in turn, heat, to the resin as the screw mixes the molten aliphatic-aromatic copolyetherester with the filler. Such processes to melt mix in fillers are disclosed, for example, by Dohrer, et al., in U.S. Pat. No. 6,359,050. Alternatively, the filler can be blended with the aliphatic-aromatic copolyetherester during the formation of a film or coating, as described below.

The aliphatic-aromatic copolyetheresters can be blended with other polymeric materials. Such materials can be biodegradable or not biodegradable. The materials can be naturally derived, modified naturally derived or synthetic.

Examples of biodegradable materials suitable for blending with the aliphatic-aromatic copolyetheresters include poly(hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and copolymers and mixtures derived therefrom. Specific examples of blendable biodegradable materials include the Biomax® sulfonated aliphatic-aromatic copolyesters of the DuPont Company, the Eastar Bio® aliphatic-aromatic copolyesters of the Eastman Chemical Company, the Ecoflex® aliphatic-aromatic copolyesters of the BASF corporation, poly(1,4-butylene terephthalate-co-adipate, (50:50, molar), the EnPo® polyesters of the Ire Chemical Company, poly(1,4-butylene succinate), the Bionolle® polyesters of the Showa High Polymer Company, poly(ethylene succinate), poly(1,4-butylene adipate-co-succinate), poly(1,4-butylene adipate), poly(amide esters), the Bak® poly(amide esters) of the Bayer Company, poly(ethylene carbonate), poly(hydroxybutyrate), poly(hydroxyvalerate), poly(hydroxybutyrate-co-hydroxyvalerate), the Biopol® poly(hydroxy alkanoates) of the Monsanto Company, poly(lactide-co-glycolide-co-caprolactone), the Tone(R) poly(caprolactone) of the Union Carbide Company, the EcoPLA® poly(lactide) of the Cargill Dow Company and mixtures derived therefrom. Essentially any biodegradable material can be blended with the aliphatic-aromatic copolyetheresters.

Examples of nonbiodegradable polymeric materials suitable for blending with the aliphatic-aromatic copolyetheresters include polyethylene, high density polyethylene, low density polyethylene, linear low density polyethylene, ultralow density polyethylene, polyolefins, ply(ethylene-co-glycidylmethacrylate), poly(ethylene-co-methyl (meth) acrylate-co-glycidyl acrylate), poly(ethylene-co-n-butyl acrylate-co-glycidyl acrylate), poly(ethylene-co-methyl acrylate), poly(ethylene-co-ethyl acrylate), poly(ethylene-co-butyl acrylate), poly(ethylene-co-(meth)acrylic acid), metal salts of poly(ethylene-co-(meth)acrylic acid), poly((meth)acrylates), such as poly(methyl methacrylate), poly(ethyl methacrylate), poly(ethylene-co-carbon monoxide), poly(vinyl acetate), poly(ethylene-co-vinyl acetate), poly(vinyl alcohol), poly(ethylene-co-vinyl alcohol), polypropylene, polybutylene, polyesters, poly(ethylene terephthalate), poly(1,3-propyl terephthalate), poly(1,4-butylene terephthalate), PETG, poly(ethylene-co-1,4-cyclohexanedimethanol terephthalate), poly(vinyl chloride), PVDC, poly(vinylidene chloride), polystyrene, syndiotactic polystyrene, poly(4hydroxystyrene), novalacs, poly(cresols), polyamides, nylon, nylon 6, nylon 46, nylon 66, nylon 612, polycarbonates, poly(bisphenol A carbonate), polysulfides, poly(phenylene sulfide), polyethers, poly(2,6-dimethylphenylene oxide), polysulfones, and copolymers thereof and mixtures derived therefrom.

Examples of natural polymeric materials suitable for blending with the aliphatic-aromatic copolyetheresters include starch, starch derivatives, modified starch, thermoplastic starch, cationic starch, anionic starch, starch esters, such as starch acetate, starch hydroxyethyl ether, alkyl starches, dextrins, amine starches, phosphate starches, dialdehyde starches, cellulose, cellulose derivatives, modified cellulose, cellulose esters, such as cellulose acetate, cellulose diacetate, cellulose priopionate, cellulose butyrate, cellulose valerate, cellulose triacetate, cellulose tripropionate, cellulose tributyrate, and cellulose mixed esters, such as cellulose acetate propionate and cellulose acetate butyrate, cellulose ethers, such as methylhydroxyethylcellulose, hydroxymethylethylcellulose, carboxymethylcellulose, methyl cellulose, ethylcellulose, hydroxyethycellulose, and hydroxyethylpropylcellulose, polysaccharides, alginic acid, alginates, phycocolloids, agar, gum arabic, guar gum, acaia gum, carrageenan gum, furcellaran gum, ghatti gum, psyllium gum, quince gum, tamarind gum, locust bean gum, gum karaya, xantahn gum, gum tragacanth, proteins, prolamine, collagen and derivatives thereof such as gelatin and glue, casein, sunflower protein, egg protein, soybean protein, vegetable gelatins, gluten, and mixtures derived therefrom. Thermoplastic starch can be produced, for example, as disclosed within U.S. Pat. No. 5,362,777. Essentially any polymeric material known can be blended with the aliphatic-aromatic copolyetheresters.

A polymeric material to be blended with the aliphatic-aromatic copolyetherester can be added to the aliphatic-aromatic copolyetherester at any stage during the polymerization or after the polymerization is completed. For example, the polymeric material can be added with the aliphatic-aromatic copolyetherester monomers at the start of the polymerization process. Alternatively, the polymeric material can be added at an intermediate stage of the polymerization, for example, as the precondensate passes into the polymerization vessel. As yet a further alternative, the polymeric material can be added after the copolyetherester exits the polymerizer. For example, the aliphatic-aromatic copolyetherester and the polymeric material can be melt fed to any intensive mixing operation, such as a static mixer or a single- or twin-screw extruder and compounded with the polymeric material.

As yet a further method for producing blends of the aliphatic-aromatic copolyetheresters with polymeric materials, the aliphatic-aromatic copolyetherester can be combined with the polymeric material in a subsequent postpolymerization process, as described hereinabove for the incorporation of fillers. Alternatively, the polymeric material can be blended with the aliphatic-aromatic copolyetherester during the formation of a film or coating, as described below.

The aliphatic-aromatic copolyetheresters can be used to make a wide variety of shaped articles. Shaped articles produced from the aliphatic-aromatic copolyetheresters of the present invention have greater thermal properties than found for shaped articles produced from known aliphatic-aromatic copolyetheresters. Shaped articles that can be made from the aliphatic-aromatic copolyetheresters include film, sheets, fiber, melt blown containers, molded parts such as cutlery, foamed parts, coatings, polymeric melt extrusion coatings on substrates, polymeric solution coatings onto substrates, and laminates. The aliphatic-aromatic copolyetheresters are useful in making any shaped article that can be made from a polymer such as a copolyester. The aliphatic-aromatic copolyetheresters can be formed into such shaped articles using any known process therefore.

The aliphatic-aromatic copolyetheresters are advantageously used in making films. Such films and processes for making films from the aliphatic-aromatic copolyetheresters are preferred embodiments of the present invention. Other embodiments include articles made from such films and processes for producing the articles. Films made from the aliphatic-aromatic copolyetheresters have a variety of uses, such as, for example, in packaging, especially of foodstuffs; adhesives tapes; insulators; capacitors; photographic development; x-ray development and as laminates. For many uses, the heat resistance of the film is an important factor. Therefore, a higher melting point, glass transition temperature, and crystallinity level are desirable in some embodiments, to provide better heat resistance and more stable electrical characteristics, along with a rapid biodegradation rate. Further, it is desired that the films have good barrier properties, including, for example, moisture barrier, oxygen barrier and carbon dioxide barrier properties; as well as good grease resistance, good tensile strength and a high elongation at break.

The aliphatic-aromatic copolyetheresters can be formed into films for use in a wide variety of applications, such as, for example, food packaging, labels, dielectric insulation, and water vapor barriers. The monomer composition of the copolyetherester can be chosen to result in a partially crystalline polymer desirable for the formation of film, wherein the crystallinity provides strength and elasticity. As first produced, the copolyetherester ester is generally semicrystalline in structure. The crystallinity increases on reheating and/or stretching of the polymer, as occurs in the production of film.

Films can be made from the aliphatic-aromatic copolyetheresters by any process known for making films. For example, thin films can be formed by dipcoating as disclosed in U.S. Pat. No. 4,372,311; by compression molding as disclosed in U.S. Pat. No. 4,427,614; by melt extrusion as disclosed in U.S. Pat. No. 4,880,592; by melt blowing as disclosed in U.S. Pat. No. 5,525,281; or any other processes known to those skilled in the art. The difference between a film and a sheet is the thickness, but there is no set industry standard as to when a film becomes a sheet. As used herein, the term "film" indicates a thickness of 0.25 mm (10 mils) thick or less. Preferably, films of the aliphatic-aromatic copolyetheresters have thicknesses between about 0.025 mm and about 0.15 mm (1 mil and 6 mils). However, thicker films can be formed, preferably up to a thickness of about 0.50 mm (20 mils).

Films of the aliphatic-aromatic copolyetheresters are preferably formed by either solution casting or extrusion. Extrusion is particularly preferred for formation of "endless" products, such as films and sheets, which emerge as a continuous length. In extrusion, a polymeric material, whether provided as a molten polymer or as plastic pellets or granules, is fluidized and homogenized. Additives, as described above, such as thermal or UV stabilizers, plasticizers, fillers and/or blendable polymeric materials, can be added, if desired. The fluidized polymer containing the optional additives is then forced through a suitably shaped die to produce a film having a desired cross section and shape. The extruding force can be exerted by a piston or ram (ram extrusion), or by a rotating screw (screw extrusion) that operates within a cylinder, such that the material is heated and plasticized, then extruded through the die in a continuous flow.

Single screw, twin screw, or multi-screw extruders can be used. Different kinds of dies can be used to produce different products, such as blown film (formed by a blow head for blown extrusions), sheets and strips (slot dies) and hollow and solid sections (circular dies). In this manner, films of different widths and thickness can be produced. After extrusion, the polymeric film is taken up on rollers, cooled and taken off by means of suitable devices that are designed to prevent any subsequent deformation of the film.

In extrusion processes, as known to those skilled in the art, a film can be produced by extruding a thin layer of polymer over chilled rolls and then further drawing down the film to size by tension rolls. In the extrusion casting process, molten polymer is conveyed from the extruder through a slot die, (T-shaped or "coat hanger" die), producing a nascent cast film. The die can be as wide as 10 feet and typically has thick wall sections on the final lands to minimize deflection of the lips from internal pressure. The sizes of die openings can be within a wide range, but 0.015 inch to 0.030 inch is typical. The nascent cast film can be drawn down, and thinned significantly, depending on the speed of the rolls taking up the film. The film is then solidified by cooling below the crystalline melting point or glass transition temperature. Cooling can be accomplished by passing the film through a water bath or over two or more chrome-plated chill rolls that have been cored for water-cooling. The cast film is then conveyed through nip rolls, a slitter to trim the edges, and then wound up. In producing cast film, conditions can be tailored to allow a relatively high degree of orientation in the machine direction, especially at high draw down conditions and wind up speeds, and a much lower level of orientation in the transverse direction. Alternatively, the conditions can be tailored to minimize the level of orientation, thus providing films with essentially equivalent physical properties in both the machine direction and the transverse direction. Preferably, the finished film is about 0.25 mm thick or less.

Blown film, which is generally stronger, tougher, and made more rapidly than cast film, is made by extruding a tube. In producing blown film, the flow of molten polymer is typically directed upward from the extruder and fed through an annular die. The melt flows around a mandrel and emerges through the ring-shaped opening in the form of a tube. As the tube leaves the die, internal pressure is introduced through the die mandrel with air, which expands the tube from about 1.5 to about 2.5 times the die diameter and simultaneously draws the film, causing a reduction in thickness. The air contained in the tube, known as a "bubble", cannot escape because it is sealed by the die on one end and by nip (or pinch) rolls on the other. Desirably, a uniform air pressure is maintained to ensure uniform thickness of the film bubble. The tubular film can be cooled internally and/or externally by directing air onto the film. Faster quenching in the blown film method can be accomplished by passing the expanded film about a cooled mandrel situated within the bubble. For example, one such method using a cooled mandrel is disclosed by Bunga, et al., in Canadian Patent 893,216. If the polymer being used to prepare blown film is semicrystalline, the bubble can become cloudy as it cools below the softening point of the polymer. Drawdown of the extrudate is not essential, but if drawn down, preferably the drawdown ratio is between 2 and 40. The draw down ratio is defined as the ratio of the die gap to the product of the thickness of the cooled film and the blow-up ratio. Draw down can be induced by tension from pinch rolls. Blow-up ratio is the ratio of the diameter of the cooled film bubble to the diameter of the circular die. The blow up ratio can be as great as 4 to 5, but 2.5 is more typical. The draw down induces molecular orientation with the film in the machine direction, (i.e., direction of the extrudate flow), and the blow-up ratio induces molecular orientation in the film in the transverse or hoop direction. The quenched bubble moves upward through guiding devices into a set of pinch rolls that flatten it to form a sleeve. The resulting sleeve can subsequently be slit along one side, making a larger film width than can typically be conveniently made by the cast film method. The slit film can be further gusseted and surface-treated in line.

Alternatively, a blown film can be produced by more elaborate techniques, such as the double bubble, tape bubble, or trapped bubble processes. The double-bubble process is a technique in which the polymeric tube is first quenched and then reheated and oriented by inflating the polymeric tube above the glass transition temperature, (Tg), but below the crystalline melting temperature, (Tm), of the polyester, (if the polyester is crystalline). The double bubble technique is known to those skilled in the art and is described, for example, by Pahkle in U.S. Pat. No. 3,456,044.

The conditions used to produce blown film depend on a variety of factors, such as the chemical composition of the polymer, the amount and type of additives, such as plasticizers, that are used, and the thermal properties of the polymeric composition. Such conditions can be is determined by one skilled in the art. Blown film processes offer advantages such as the relative ease of changing the film width and caliber simply by changing the volume of air in the bubble and the speed of the screw, the elimination of end effects, and the capability of providing biaxial orientation in the as produced film. Typical thicknesses of films formed in a blown film process can be in the range of about 0.004 to 0.008 inch, and the flat film width can range up to 24 feet or larger after slitting.

For manufacturing large quantities of film, a sheeting calender, a machine comprising a number of heatable parallel cylindrical rollers that rotate in opposite directions and spread out the polymer and stretch it to the required thickness, can be employed. The film is fed into the gap of the calender, and the last roller smoothes the film thus produced. If the film is required to have a textured surface, the final roller is provided with an appropriate embossing pattern. Alternatively, the film can be reheated and then passed through an embossing calender. The calender is followed by one or more cooling drums. Finally, the finished film is reeled up.

Extruded films can also be used as the starting material for other products. For example, the film can be cut into small segments for use as feed material for other processing methods, such as injection molding. As a further example, the film can be laminated onto a substrate as described below. As yet a further example, the films can be metallized, using known methods. The film tubes available from blown film operations can be converted to bags by, for example, heat-sealing processes. Extrusion processes can be combined with a variety of post-extruding operations for expanded versatility. Such post-forming operations include altering round to oval shapes, blowing the film to different dimensions, machining and punching, biaxial stretching, and other operations known to those skilled in the art.

Alternatively, a film can be made by solution casting, which produces more consistently uniform gauge film than that made by melt extrusion. Solution casting comprises dissolving polymeric granules, powder or the like in a suitable solvent with any desired formulant, such as a plasticizer or colorant. The solution is filtered to remove dirt or large particles and cast from a slot die onto a moving belt, preferably of stainless steel, and dried, whereupon the film cools. The extrudate thickness is typically five to ten times that of the finished film. The film can then be finished in a like manner to the extruded film. One of ordinary skill in the art can identify appropriate process parameters based on the polymeric composition and process used for film formation. The solution cast film can then be subjected to the same post treatments as described for the extrusion cast film.

Multilayer films can also be produced from the aliphatic-aromatic copolyetheresters, such as bilayer, trilayer, and multilayer film structures. One advantage to multilayer films is that specific properties can be tailored into the film to solve critical use needs while allowing the more costly ingredients to be relegated to the outer layers where they provide the greater needs. The multilayer film structures can be formed by, for example, coextrusion, blown film, dipcoating, solution coating, blade, puddle, air-knife, printing, Dahlgren, gravure, powder coating, spraying, or other known processes. Generally, the multilayer films are produced by extrusion casting processes. In an exemplary extrusion casting process, the polymeric materials from which the film is to be made are heated in a uniform manner to form a melt. The molten materials are conveyed to a coextrusion adapter that combines the molten materials to form a multilayer coextruded structure. The multilayer structure is transferred through an extrusion die opened to a predetermined gap, commonly in the range of between about 0.05 inch (0.13 cm) and 0.012 inch (0.03 cm). The material is then drawn down to the intended gauge thickness by means of a primary chill or casting roll maintained at typically in the range of about 15 to 55 C, (60–130 F). Typical draw down ratios range from about 5:1 to about 40:1. Individual layers can serve as barrier layers, adhesive layers, antiblocking layers, or for other purposes. For example, the inner layers can be filled and the outer layers can be unfilled, as disclosed within U.S. Pat. Nos. 4,842,741 and 6,309,736. Production processes are well known to those skilled in the art and are disclosed, for example, in U.S. Pat. Nos. 3,748,962, 4,522,203, 4,734,324, 5,261,899 and 6,309,736. El-Afandi, et al., in U.S. Pat. Nos. 5,849,374, 5,849,401, and 6,312,823, disclose compostable multilayer films having a core poly(lactide) layer with inner and outer layers of blocking reducing layers of, for example, aliphatic polyesters.

Individual layers of multilayer films can be made of the aliphatic-aromatic copolyetheresters, and/or of other polymeric materials that are biodegradable or not biodegradable. The other polymeric materials can be naturally derived, modified naturally derived or synthetic.

Examples of biodegradable materials and nonbiodegradable materials suitable as additional layers include those materials exemplified hereinabove for use in blending with the aliphatic-aromatic copolyetheresters. Examples of naturally derived polymeric materials suitable as additional layers include those natural materials disclosed hereinabove for use in blending with the aliphatic-aromatic copolyesters. Essentially, any polymeric material known for use in forming multilayer structures can be used.

Regardless of how a film is formed from the aliphatic-aromatic copolyetheresters, the film can be subjected to biaxial orientation by stretching in both the machine and transverse direction after formation. The machine direction stretch is initiated in forming the film simply by rolling out and taking up the film. This inherently stretches the film in the direction of takeup, orienting some of the fibers. Although this strengthens the film in the machine direction, it allows the film to tear easily in the direction at right angles because all of the fibers are oriented in one direction. The biaxially oriented film can further be subjected to additional drawing of the film in the machine direction, in a process known as tensilizing. Biaxial stretching orients the fibers parallel to the plane of the film, but leaves the fibers randomly oriented within the plane of the film. This provides superior tensile strength, flexibility, toughness and shrinkability, for example, in comparison to non-oriented films. It is desirable to stretch the film along two axes at right angles to each other, which increases tensile strength and elastic modulus in the directions of stretch. It is most desirable for the amount of stretch in each direction to be roughly equivalent, thereby providing similar properties or behavior within the film when tested from any direction. However, certain applications, such as those requiring a certain amount of shrinkage or greater strength in one direction over another, as in labels or adhesive and magnetic tapes, may require uneven, or uniaxial, orientation of the fibers of the film.

Biaxial orientation can be obtained by any known process for orienting films. However, tentering is preferred, wherein the material is stretched while heating in the transverse direction simultaneously with, or subsequent to, stretching in the machine direction. The orientation can be performed on available commercial equipment. For example, suitable equipment is available from Bruckner Maschenenbau of West Germany. One form of such equipment operates by clamping on the edges of the sheet to be drawn and, at the appropriate temperature, separating the edges of the sheet at a controlled rate. For example, a film can be fed into a temperature-controlled box, heated above its glass transition temperature and grasped on either side by tenterhooks that simultaneously exert a drawing tension (longitudinal stretching) and a widening tension (lateral stretching). Typically, stretch ratios of 3:1 to 4:1 can be employed. Alternatively, and preferably for commercial purposes, the biaxial drawing process is conducted continuously at high production rates in multistage roll drawing equipment, as available from Bruckner, where the drawing of the extruded film stock takes place in a series of steps between heated rolls rotating at different and increasing rates. When the appropriate combinations of draw temperatures and draw rates are employed, the monoaxial stretching will be preferably from about 4 to about 20, more preferably from about 4 to about 10. Draw ratio is defined as the ratio of a dimension of a stretched film to a non-stretched film.

Uniaxial orientation can be obtained by stretching the film in only one direction in the above-described processes for introducing biaxial orientation or by directing the film through a machine direction orienter, ("MDO"), such as is commercially available from vendors such as the Marshall and Williams Company of Providence, R.I. The MDO apparatus has a plurality of stretching rollers that progressively stretch and thin the film in the machine direction of the film, that is the direction of travel of the film through the apparatus.

Preferably, the stretching is carried out at a temperature at least 10° C. above the glass transition temperature of the polymer. Also preferably, the stretching is carried out below the Vicat softening temperature of the polymer, especially at least 10° C. below the Vicat softening point, depending to some degree to the rate of stretching.

Orientation can be enhanced in blown film operations by adjusting the blow-up ratio, (BUR), which is the ratio of the diameter of the film bubble to the die diameter. For example, it is generally preferred to have a BUR of 1 to 5 for the production of bags or wraps. However, the BUR can be adjusted based on the desired balance of properties desired in the machine direction and the transverse direction. For a balanced film, a BUR of about 3:1 is generally appropriate. If it is desired to have a "splitty" film that easily tears in one direction, then a BUR of 1:1 to about 1.5:1 is generally preferred.

Shrinkage can be controlled by holding the film in a stretched position and heating for a few seconds before quenching. The heat stabilizes the oriented film, so that the film can then be forced to shrink only at temperatures above the heat stabilization temperature. Further, the film can also be subjected to rolling, calendering, coating, embossing, printing, or any other typical finishing operations.

Appropriate process conditions and parameters for film making by any method can be determined by a skilled artisan for a given polymeric composition and desired application. The properties exhibited by a film depend on several factors, including the polymeric composition, the method of forming the polymer, the method of forming the film, and whether the film was stretched or biaxially oriented. These factors affect many properties of the film, such as, for example, shrinkage, tensile strength, elongation at break, impact strength, dielectric strength and constant, tensile modulus, chemical resistance, melting point, heat deflection temperature.

The film properties can be further adjusted by adding certain additives and fillers to the polymeric composition, such as colorants, dyes, UV and thermal stabilizers, antioxidants, plasticizers, lubricants antiblock agents, and slip agents, as disclosed hereinabove. Alternatively, the aliphatic-aromatic copolyetheresters can be blended with one or more other polymeric materials to improve certain characteristics, as described hereinabove.

As disclosed by Moss, in U.S. Pat. No. 4,698,372, Haffner, et al., in U.S. Pat. No. 6,045,900, and McCormack in WO 95/16562, the films, especially the filled films, can be formed microporoas, if desired. The formation of microporous films is also disclosed in U.S. Pat. Nos. 4,626,252, 5,073,316, and 6,359,050. As is known to those skilled in the art, the stretching of a filled film can create fine pores. The presence of pores of appropriate size can allow the film to serve as a barrier to liquids and particulate matter, while allowing air and/or water vapor to pass through.

To enhance the printability (ink receptivity) of the surface of a film, adhesion, or other desirable characteristics, the films of the aliphatic-aromatic copolyetheresters can be treated by known, conventional post forming operations, such as corona discharge, chemical treatments, or flame treatment.

The films of the aliphatic-aromatic copolyetheresters are useful in a wide variety of applications. For example, the films can be used as a component of personal sanitary items, such as disposable diapers, incontinence briefs, feminine pads, sanitary napkins, tampons, tampon applicators, motion sickness bags, baby pants, personal absorbent products, and other personal care items Films made from the aliphatic-aromatic copolyetheresters combine excellent water barrier properties, to avoid leak through, with excellent toughness to easily conform to the body and to stretch with the body movements during use. After use, the soiled articles will biocompost when discarded appropriately.

As further examples, films comprising the aliphatic-aromatic copolyetheresters are useful as protective films for use in agriculture, such as, for example, mulch films, seed coverings, agriculture mats containing seeds, ("seed tapes"), garbage and lawn waste bags. Further examples of uses for films comprising the aliphatic-aromatic copolyetheresters include adhesive tape substrates, bags, bag closures, bed sheets, bottles, cartons, dust bags, fabric softener sheets, garment bags, industrial bags, trash bags, waste bin liners, compost bags, labels, tags, pillow cases, bed liners, bedpan liners, bandages, boxes, handkerchiefs, pouches, wipes, protective clothing, surgical gowns, surgical sheets, surgical sponges, temporary enclosures, temporary siding, toys, and wipes.

A preferred use of films comprising the aliphatic-aromatic copolyetheresters is in food packaging applications, especially for fast food packaging. Specific examples of food packaging uses include fast food wrappers, stretch wrap films, hermetic seals, food bags, snack bags, grocery bags, cups, trays, cartons, boxes, bottles, crates, food packaging films, blister pack wrappers, and skin packaging.

A particularly preferred end use for films comprising the aliphatic-aromatic copolyetheresters includes wraps. Wraps can be used to enclose meats, other perishable items, and especially fast food items, such as, for example, sandwiches, burgers, and dessert items. Desirably, films for use in wraps provide a balance of physical properties appropriate for the intended end use of the wraps, including paper-like stiffness combined with sufficient toughness so as not to tear when used to wrap, for example, a sandwich, good deadfold characteristics, so that once folded, wrapped or otherwise manipulated into the desired shape, the wraps will maintain their shape and not tend to spontaneously unfold or unwrap. Also desired for some applications are grease resistance and/or a balance of moisture barrier properties that does not allow moisture to condense onto food, such as a sandwich, wrapped in the film. The wraps can have a smooth surface or a textured surface, which texture can be obtained by methods such as, for example, embossing, crimping, quilting or other known processes. The wraps can incorporate fillers, such as, for example, inorganic particles, organic particles including starch, or combinations of fillers as disclosed hereinabove.

The films can be further processed to produce desirable articles, such as containers. For example, the films can be thermoformed as disclosed, for example, in U.S. Pat. Nos. 3,303,628, 3,674,626, and 5,011,735. The films can be used to package foods, such as meats, by vacuum skin packaging techniques, as disclosed in, for example, U.S. Pat. Nos. 3,835,618, 3,950,919, Re 30,009, and 5,011,735. The films can further be laminated onto substrates, as described below.

In other preferred embodiments, the aliphatic-aromatic copolyetheresters can be used for form coatings on substrates. Substrates can be coated with polymer solutions, dispersions, latexes, and emulsions of the copolyetheresters by, for example, rolling, spreading, spraying, brushing, or pouring processes, followed by drying; by coextruding the copolyetheresters with other materials; by powder coating the copolyetheresters onto a preformed substrate; or by melt/extrusion coating a preformed substrate with the copolyetheresters. The substrate can be coated on one side or on both sides. The coated substrates have a variety of uses, such as in packaging, especially of foodstuffs, and as disposable cups, plates, bowls and cutlery. For many uses, heat resistance of the coating is an important factor. Therefore, a higher melting point, glass transition temperature, and crystallinity level may be desirable to provide better heat resistance, along with a sufficiently rapid biodegradation rate. Further, it is desired that the coatings provide good barrier properties for moisture, grease, oxygen, and carbon dioxide, and have good tensile strength and a high elongation at break.

Coatings can be made from the copolyetheresters by any known coating process. For example, thin coatings can be formed by dipcoating as disclosed in U.S. Pat. Nos. 4,372,311 and 4,503,098, extrusion onto substrates, as disclosed, for example, in U.S. Pat. Nos. 5,294,483, 5,475,080, 5,611,859, 5,795,320, 6,183,814, and 6,197,380; or by blade, puddle, air-knife, printing, Dahlgren, gravure, powder coating, spraying, or other known processes. The coatings can be of any thickness. In some preferred embodiments, the coating is 0.25 mm (10 mils) thick or less. More preferably, the thickness of the coating is between about 0.025 mm and 0.15 mm (1 mil and 6 mils). However, thicker coatings can be formed, for example, having a thickness of about 0.50 mm (20 mils) or greater.

Various substrates can be coated directly with a film. Coatings comprising the aliphatic-aromatic copolyetheresters are preferably formed by solution, dispersion, latex, or emulsion casting; powder coating; or extrusion onto a preformed substrate. A coating can also be made by solution casting onto a substrate, which produces more consistently uniform gauge coating than that made by melt extrusion. Solution casting is described hereinabove. The coating can then be finished in a like manner to an extruded coating. Similarly, polymeric dispersions and emulsions can be coated onto substrates by equivalent processes. Coatings can be applied to textiles, nonwovens, foil, paper, paperboard, and other sheet materials by continuously operating spread-coating machines. A coating knife, such as a "doctor knife", ensures uniform spreading of the coating materials (in the form of solution, emulsions, or dispersions in water or an organic medium) on the supporting material, which is moved along by rollers. The coating is then dried. Alternatively, a solution, emulsion, or dispersion comprising the aliphatic-aromatic copolyetherester can be sprayed, brushed, rolled or poured onto a substrate. For example, Potts, in U.S. Pat. Nos. 4,372,311 and 4,503,098, discloses coating water-soluble substrates with solutions of water-insoluble materials, and U.S. Pat. No. 3,378,424 discloses processes for coating a fibrous substrate with an aqueous polymeric emulsion.

Coatings comprising the aliphatic-aromatic copolyetheresters can also be applied to substrates by powder coating processes. In a powder coating process, a polymer is coated onto the substrate in the form of a powder having a fine particle size. The substrate to be coated can be heated to above the fusion temperature of the polymer and the substrate dipped into a bed of the powdered polymer fluidized by the passage of air through a porous plate. The fluidized bed is typically not heated. A layer of the polymer adheres to the hot substrate surface and melts to provide the coating. Coating thicknesses can be in the range of about 0.005 inch to 0.080 inch, (0.13 to 2.00 mm). Other powder coating processes include spray coating, whereby the substrate is not heated until after it is coated, and electrostatic coating. For example, paperboard containers can be electrostatically spray-coated with a thermoplastic polymer powder, as disclosed in U.S. Pat. Nos. 4,117,971, 4,168,676, 4,180,844, 4,211,339, and 4,283,189. The containers can then be heated, causing the polymeric powder to melt to form a laminated polymeric coating.

Films comprising the aliphatic-aromatic copolyetheresters can also be applied to metal articles of complex shapes, for example, using a whirl sintering process. The articles, heated to above the melting point of the polymer, are introduced into a fluidized bed of powdered polymer wherein the polymer particles are held in suspension by a rising stream of air, thus depositing a coating on the metal by sintering. As a further alternative, coatings of the aliphatic-aromatic copolyetheresters can be applied by spraying molten, atomized copolyetherester onto substrates, such as paperboard. Such processes are disclosed for use in applying wax coatings in, for example, U.S. Pat. Nos. 5,078,313, 5,281,446, and 5,456,754.

Coatings comprising the aliphatic-aromatic copolyetheresters are preferably formed by melt or extrusion coating processes. Extrusion is particularly preferred for formation of "endless" products, such as coated paper and paperboard, which emerge as a continuous length. Extrusion processes are described hereinabove. Extrusion coating of polyesters onto paperboard is disclosed, for example, in U.S. Pat. Nos. 3,924,013, 4,147,836, 4,391,833, 4,595,611, 4,957,578, and 5,942,295. Kane, in U.S. Pat. No. 3,924,013, discloses the formation of ovenable trays mechanically formed from paperboard previously laminated with polyester. Chaffey, et al., in U.S. Pat. No. 4,836,400, disclose the production of cups formed from paper stock that has been coated with a polymer on both sides. Beavers, et al., in U.S. Pat. No. 5,294,483, disclose the extrusion coating of certain polyesters onto paper substrates. As a further example of extrusion coating, wires and cable can be sheathed directly with polymeric films extruded from oblique heads.

Calendering processes can also be used to produce polymeric laminates onto substrates. Calendering processes are described hereinabove. Multiple polymer layers can also be coated onto a substrate, such as bilayer, trilayer, and multilayer film structures, as described hereinabove. The additional layers can serve as barrier layers, adhesive layers, antiblocking layers, or for other purposes. Further, for example, the inner layers can be filled and the outer layers can be unfilled, as disclosed in U.S. Pat. Nos. 4,842,741 and 6,309,736. Production processes are well known, and are described, for example, in U.S. Pat. Nos. 3,748,962, 4,522, 203, 4,734,324, 5,261,899 and 6,309,736. El-Afandi, et al., in U.S. Pat. Nos. 5,849,374, 5,849,401, and 6,312,823, disclose compostable multilayer films with a core poly (lactide) layer with inner and outer layers of blocking reducing layers composed of, for example, aliphatic polyesters. Kuusipalo, et al., in WO Application 00/01530, disclose paper and paperboard coated with poly(lactide) and biodegradable adhesive layers, such as aliphatic-aromatic polyesters.

Additional layers in a multilayer coating can comprise the aliphatic-aromatic copolyetheresters and/or other polymeric materials, which can be biodegradable or nonbiodegradable, naturally derived, modified naturally derived or synthetic. Examples of biodegradable, nonbiodegradable, and naturally derived polymeric materials useful for forming additional layers are disclosed hereinabove with regard to blends and multilayer films.

Generally, a coating is applied to a thickness of between about 0.2 to 15 mils, more typically in the range of about 0.5 to 2 mils. The substrates can vary widely in thickness, but a range of from about 0.5 to more than 24 mils thickness is common.

Suitable substrates for coating with the aliphatic-aromatic copolyetherpolyesters include articles of paper, paperboard, cardboard, fiberboard, cellulose, such as Cellophane®, starch, plastic, polystyrene foam, glass, metal, for example; aluminum or tin cans, metal foils, polymeric foams, organic foams, inorganic foams, organic-inorganic foams, and polymeric films. In some preferred embodiments, the substrates are made from biodegradable substrates, such as, for example, paper, paperboard, cardboard, cellulose, and starch. In other preferred embodiments, the substrates are made from biobenign substrates such as, for example, inorganic and inorganic-organic foams.

Polymeric films that are suitable as substrates can comprise the aliphatic-aromatic coplyetheresters and/or other polymeric materials that are biodegradable or not biodegradable. The other polymeric materials can be naturally derived, modified naturally derived or synthetic. Suitable biodegradable, nonbiodegradable, naturally derived, and modified naturally derived polymeric materials as disclosed hereinabove for use in blending are suitable as substrates.

Organic foams, such as derived from expanded starches and grains, can be used as substrates. Such materials are disclosed, for example, in U.S. Pat. Nos. 3,137,592, 4,673, 438, 4,863,655, 5,035,930, 5,043,196, 5,095,054, 5,300,333, 5,413,855, 5,512,090, and 6,106,753. Specific examples of the materials include; EcoFoam®, a product of the National Starch Company of Bridgewater, N.J., that is a hydroxypropylated starch product, and EnviroFil®, a product of the EnPac Company, a DuPont-Con Agra Company.

Exemplary preferred organic-inorganic foams are cellular foams filled with inorganic fillers such as, for example, calcium carbonate, clays, cement, or limestone, and having a starch-based binder. Exemplary starch-based binders include potato starch, corn starch, waxy corn starch, rice starch, wheat starch, tapioca, and a small amount of fiber, as disclosed by Andersen, et al, in U.S. Pat. No. 6,030,673. Such binders can be produced by mixing the ingredients together with water to form a batter. The substrate is formed by pressing the batter between two heated molds. The water contained within the batter is turned to steam, raising the pressure within the mold, forming the foamed product. Products produced using such process are commercially available by the EarthShell Packaging Company. Commercially available products currently include 9-inch plates, 12-ounce bowls and hinged-lid sandwich and salad containers, ("clam shells").

Examples of other organic, inorganic and organic-inorganic foam substrates are disclosed in: U.S. Pat. Nos. 5,095,054, 5,108,677, 5,234,977, 5,258,430, 5,262,458, 5,292,782, 5,376,320, 5,382,611 5,405,564, 5,412,005, 5,462,980, 5,462,982, 5,512,378, 5,514,430, 5,549,859, 5,569,514, 5,569,692, 5,576,049, 5,580,409, 5,580,624, 5,582,670, 5,614,307, 5,618,341, 5,626,954, 5,631,053, 5,658,603, 5,658,624, 5,660,900, 5,660,903, 5,660,904, 5,665,442, 5,679,145, 5,683,772, 5,705,238, 5,705,239, 5,709,827, 5,709,913, 5,753,308, 5,766,525, 5,770,137, 5,776,388, 5,783,126, 5,800,647, 5,810,961, 5,830,305, 5,830,548, 5,843,544, 5,849,155, 5,868,824, 5,879,722, 5,897,944, 5,910,350, 5,928,741, 5,976,235, 6,083,586, 6,090,195, 6,146,573, 6,168,857, 6,180,037, 6,200,404, 6,214,907, 6,231,970, 6,242,102, 6,347,934, 6,348,524, and 6,379,446. However, essentially any known foam material can be used as a substrate for coating with the aliphatic-aromatic copolyetheresters.

To enhance the coating process, the substrates can be treated by known, conventional post forming operations, such as corona discharge, and/or chemical treatments, such as primers, flame treatments, adhesives. The substrate can be primed with, for example, an aqueous solution of polyethyleneimine, (available from Morton international under the name Adcote® 313), or a styrene-acrylic latex; or can be flame treated, as disclosed, for example, in U.S. Pat. Nos. 4,957,578 and 5,868,309.

If desired, the substrate can be coated with an adhesive prior to coating with an aliphatic-aromatic copolyetherester, by conventional coating technologies or by extrusion. Specific examples of adhesives that can be used to coat the substrate include; glue, gelatine, caesin, starch, cellulose esters, aliphatic polyesters, poly(alkanoates), aliphatic-aromatic polyesters, sulfonated aliphatic-aromatic polyesters, polyamide esters, rosin/polycaprolactone triblock copolymers, rosin/poly(ethylene adipate) triblock copolymers, rosin/poly(ethylene succinate) triblock copolymers, poly(vinyl acetates), poly(ethylene-co-vinyl acetate), poly(ethylene-co-ethyl acrylate), poly(ethylene-co-methyl acrylate), poly(ethylene-co-propylene), poly(ethylene-co-1-butene), poly(ethylene-co-1-pentene), poly(styrene), acrylics, Rhoplex® N-1031, (an acrylic latex from the Rohm & Haas Company), polyurethanes, AS 390, (an aqueous polyurethane adhesive base for Adhesion Systems, Inc.) with AS 316, (an adhesion catalyst from Adhesion Systems, Inc.), Airflex® 421, (a water-based vinyl acetate adhesive formulated with a crosslinking agent), sulfonated polyester urethane dispersions, (such as sold as Dispercoll® U-54, Dispercoll® U-53, and Dispercoll® KA-8756 by the Bayer Corporation), nonsulfonated urethane dispersions, (such as Aquathane® 97949 and Aquathane® 97959 by the Reichold Company; Flexthane® 620 and Flexthane® 630 by the Air Products Company; Luphen® D DS 3418 and Luphen® D 200A by the BASF Corporation; Neorez® 9617 and Neorez® 9437 by the Zeneca Resins Company; Quilastic® DEP 170 and Quilastic® 172 by the Merquinsa Company; Sancure® 1601 and Sancure® 815 by the B. F. Goodrich Company), urethane-styrene polymer dispersions, (such as Flexthane® 790 and Flexthane® 791 of the Air Products & Chemicals Company), Non-ionic polyester urethane dispersions, (such as Neorez® 9249 of the Zeneca Resins Company), acrylic dispersions, (such as Jagotex® KEA-5050 and: Jagotex® KEA 5040 by the Jager Company; Hycar® 26084, Hycar® 26091, Hycar® 26315, Hycar® 26447, Hycar® 26450, and Hycar® 26373 by the B. F. Goodrich Company; Rhoplex® AC-264, Rhoplex® HA-16, Rhoplex® B-60A, Rhoplex® AC-234, Rhoplex® E-358, and Rhoplex® N-619 by the Rohm & Haas Company), silanated anionic acrylate-styrene polymer dispersions, (such as Acronal® S-710 by the BASF Corporation and Texigel® 13-057 by Scott Bader Inc.), anionic acrylate-styrene dispersions, (such as Acronal(®296D, Acronal® NX 4786, Acronal® S-305D, Acronal® S-400, Acronal® S-610, Acronal® S-702, Acronal® S-714, Acronal® S-728, and Acronal® S-760 by the BASF Corporation; Carboset® CR-760 by the B. F. Goodrich Company; Rhoplex® P-376, Rhoplex® P-308, and Rhoplex® NW-1715K by the Rohm & Haas Company; Synthemul® 40402 and Synthemul® 40403 by the Reichold Chemicals Company; Texigel® 13-57 Texigel® 13-034, and Texigel® 13-031 by Scott Bader Inc.; and Vancryl® 954, Vancryl® 937 and Vancryl® 989 by the Air Products & Chemicals Company), anionic acrylate-styrene-acrylonitrile dispersions, (such as Acronal® S 886S, Acronal® S 504, and Acronal® DS 2285 X by the BASF Corporation), acrylate-acrylonitrile dispersions, (such as Acronal® 35D, Acronal® 81 D, Acronal® B 37D, Acronal® DS 3390, and Acronal® V275 by the BASF Corporation), vinyl chloride-ethylene emulsions, (such as Vancryl® 600, Vancryl® 605, Vancryl® 610, and Vancryl® 635 by Air Products and Chemicals Inc.), vinylpyrrolidone/styrene copolymer emulsions, (such as Polectron® 430 by ISP Chemicals), carboxylated and noncarboxylated vinyl acetate ethylene dispersions, (such as Airflex® 420, Airflex®) 421, Airflex® 426, Airflex® 7200, and Airflex® A-7216 by Air Products and Chemicals Inc. and Dur-o-set® E150 and Dur-o-set® E-230 by ICI), vinyl acetate homopolymer dispersions, (such as Resyn® 68-5799 and Resyn® 25-2828 by ICI), polyvinyl chloride emulsions, (such as Vycar® 460×24, Vycar® 460×6 and Vycar® 460×58 by the B. F. Goodrich Company), polyvinylidene fluoride dispersions, (such as Kynar® 32 by Elf Atochem), ethylene acrylic acid dispersions, (such as Adcote® 50T4990 and Adcote® 50T4983 by Morton International), polyamide dispersions, (such as Micromid® 121RC, Micromid® 141L, Micromid® 142LTL, Micromid® 143LTL, Micromid® 144LTL, Micromid® 321 RC, and Micromid® 632HPL by the Union (amp Corporation), anionic carboxylated or noncarboxylated acrylonitrile-butadiene-styrene emulsions and acrylonitrile emulsions, (such as Hycar® 1552, Hycar® 1562×107, Hycar® 1562×117 and Hycar® 1572×64 by B. F. Goodrich), resin dispersions derived from styrene, (such as Tacolyn® 5001 and Piccotex® LC-55WK by Hercules), resin dispersions derived from aliphatic and/or aromatic hydrocarbons, (such as Escorez® 9191, Escorez® 9241, and Escorez® 9271 by Exxon), styrene-maleic anhydrides, (such as SMA® 1440 H and SMA® 1000 by AtoChem), and mixtures derived therefrom. In some preferred embodiments, the substrate is coated with a biodegradable adhesion binder layer such as, for example glue, gelatine, casein, or starch. However, essentially any adhesive known can be used.

The adhesives can be applied by melt processes or by known solution, emulsion, dispersion, or coating processes. For example, U.S. Pat. No. 4,343,858 discloses a coated paperboard formed by the coextrusion of a polyester top film and an intermediate layer of an ester of acrylic acid, methacrylic acid, or ethacrylic acid, on top of a paperboard. U.S. Pat. No. 4,455,184 discloses a process to coextrude a polyester layer and a polymeric adhesive layer onto a paperboard substrate. Fujita, et al., in U.S. Pat. No. 4,543,280, disclose the use of adhesives in the extrusion coating of polyester onto ovenable paperboard. Huffman, et al., in U.S. Pat. No. 4,957,578, disclose the extrusion of a polyester layer on top of a polyethylene-coated paperboard. The polyethylene layer can be corona discharged or flame treated to promote adhesion. They further disclose the direct formation of the structure through coextrusion of the polyethylene layer on top of the paperboard with the polyester on top of the polyethylene with a coextruded adhesive tie layer of Bynel® ethylene copolymer between the polyethylene layer and the polyester layer.

One of ordinary skill in the art can identify appropriate process parameters based on the composition and process used for the coating. The properties exhibited by a coating are determined by several factors as indicated above, including the coating composition and method for forming, the method of applying the coating, and whether the coating was oriented during manufacture. Such factors affect a variety of properties of the coating, such as, for example, shrinkage, tensile strength, elongation at break, impact strength, dielectric strength and constant, tensile modulus, chemical resistance, melting point, and heat deflection temperature.

The coating properties can be adjusted by adding additives and/or fillers such as, for example, colorants, dyes, UV and thermal stabilizers, antioxidants, plasticizers, lubricants antiblock agents, and slip agents. Alternatively, the aliphatic-aromatic copolyetheresters can be blended with one or more other polymeric materials to vary certain characteristics of the aliphatic-aromatic copolyesters, as described above.

The substrates can be formed into articles prior to coating or after they are coated. For example, containers can be produced from flat, coated paperboard by pressforming, by vacuum forming, or by folding and adhering them into the final desired shape. Coated, flat paperboard stock can be formed into trays by the application of heat and pressure, as disclosed, for example, in U.S. Pat. No. 4,900,594. Substrates can be vacuum formed into containers for foods and beverages, as disclosed, for example, in U.S. Pat. No. 5,294,483. Other articles that can be coated include, for example, cutlery, flower pots, mailing tubes, light fixtures, ash trays, gameboards, food containers, fast food containers, cartons, boxes, milk cartons, fruitjuice containers, carriers for beverage containers, ice cream cartons, cups, disposable drinking cups, two-piece cups, one-piece pleated cups, cone cups, coffee cups, lidding, lids, straws, cup tops, french fry containers, fast food carry out boxes, packaging, support boxes, confectionery boxes, boxes for cosmetics, plates, bowls, vending plates, pie plates, trays, baking trays, breakfast plates, microwavable dinner trays, "TV" dinner trays, egg cartons, meat packaging platters, disposable single use liners that can be utilized with containers such as cups or food containers, substantially spherical objects, bottles, jars, crates, dishes, medicine vials, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container. Water-resistant polymer coated paper and paperboard are commonly used in packaging material for foodstuffs and as disposable containers. Coating polymers and multilamellar coating structures including the same have been developed that give packages desirable oxygen, water vapor, and aroma tightness in order to enhance preservation of the products packaged therein.

Coatings comprising the aliphatic-aromatic copolyetheresters are useful in a wide variety of areas, including, for example, uses described hereinabove for films comprising the aliphatic-aromatic copolyetheresters. A particularly preferred use of the coatings comprising the aliphatic-aromatic polyesters is in food packaging, especially for fast food packaging, and in wraps. Specific examples of food packaging and wrap uses are described hereinabove with respect to films.

Further preferred embodiments of the present invention include laminates of the aliphatic-aromatic copolyetheresters onto substrates, processes for producing the laminates, and articles derived therefrom. Films comprising the aliphatic-aromatic copolyetheresters, prepared as described above, can be laminated onto a wide variety of substrates through any known art process, including, for example, thermoforming, vacuum thermoforming, vacuum lamination, pressure lamination, mechanical lamination, skin packaging, and adhesion lamination. A laminate is differentiated from a coating in that, in a laminate, a preformed film is attached to a substrate. The substrate can be its final use shape, such as, for example, in the form of a plate, cup, bowl, tray, or can be in an intermediate shape still to be formed, such as a sheet or film, when the film is attached. The film can be attached to the substrate by the application of heat and/or pressure, as with, for example heated bonding rolls. The laminate bond strength or peel strength can generally be enhanced by the use of higher temperatures and/or pressures. When adhesives are used, the adhesives can be hot melt adhesives or solvent-based adhesives. To enhance the lamination process, the films and/or the substrates can be treated by known, conventional post forming operations, such as corona discharge, chemical treatments, such as primers, flame treatments, as previously described. For example, U.S. Pat. No. 4,147,836 describes subjecting a paperboard to a corona discharge to enhance the lamination process with a poly(ethylene terephthalate) film. For example, Quick, et al., in U.S. Pat. No. 4,900,594, disclose the corona treatment of a polyester film to aide in the lamination to paperstock with adhesives. Schirmer, in U.S. Pat. No. 5,011,735, discloses the use of corona treatments to aid the adhesion between various blown films. U.S. Pat. Nos. 5,679,201 and 6,071,577 disclose the use of flame treatments to aid in the adhesion within polymeric lamination processes. Sandstrom, et al., in U.S. Pat. No. 5,868,309, disclose the use of paperboard substrate primer consisting of certain styrene-acrylic materials to improve the adhesion with polymeric laminates.

Processes for producing polymeric coated or laminated paper and paperboard substrates for use as containers and cartons are well known and are described, for example, in U.S. Pat. Nos. 3,863,832, 3,866,816, 4,337,116, 4,456,164, 4,698,246, 4,701,360, 4,789,575, 4,806,399, 4,888,222, and 5,002,833. For example, Kane, in U.S. Pat. No. 3,924,013, discloses the formation of ovenable trays mechanically formed from paperboard previously laminated with polyester. Schmidt, in U.S. Pat. No. 4,130,234, discloses the polymeric film lamination of paper cups. The lamination of films onto nonwoven fabrics is disclosed in U.S. Pat. No. 6,045,900 and 6,309,736. Depending on the intended use of the polyester laminated substrate, the substrate can be laminated on one side or on both sides.

Films comprising the aliphatic-aromatic copolyetheresters can be passed through heating and pressure/nip rolls to be laminated onto flat substrates. More commonly, the films are laminated onto substrates by processes that are derivatives of thermoforming. The films can thus be laminated onto substrates by vacuum lamination, pressure lamination, blow lamination, and mechanical lamination. When the films are heated, they soften and can be stretched onto a substrate of any given shape. Processes for adhering a polymeric film to a preformed substrate are known, and are disclosed, for example, in U.S. Pat. No. 2,590,221.

In vacuum lamination, the film can be clamped or simply held against the substrate and then heated until it becomes soft. A vacuum is then applied, typically through porous substrates or designed-in holes, causing the softened film to mold into the contours of the substrate and laminate onto the substrates. The as formed laminate is then cooled. The vacuum can be maintained or not during the cooling process. For substrate shapes that require a deep draw, such as, for example, cups, deep bowls, boxes, cartons, a plug assist can be utilized. In such substrate shapes, the softened film tends to thin out significantly before it reaches the base or bottom of the substrate shape, leaving only a thin and weak laminate on the bottom of the substrate shape. The plug assist is any type of mechanical helper that carries more film stock toward an area of the substrate shape where the lamination would otherwise be too thin. Plug assist techniques can be adapted to vacuum and pressure lamination processes. Vacuum lamination processes of films onto preformed substrates are known and are disclosed, for example, in U.S. Pat. No. 4,611,456 and 4,862,671. Knoell, in U.S. Pat. No. 3,932,105, discloses processes for the vacuum lamination of a film onto a folded paperboard carton. Lee, et al., in U.S. Pat. No. 3,957,558, disclose the vacuum lamination of thermoplastic films onto a molded pulp product, such as a plate. Foster, et al., in U.S. Pat. No. 4,337,116, disclose the lamination of poly(ethylene terephthalate) films onto preformed molded pulp containers by preheating the pulp container and the film, pressing the film into contact with the substrate and applying vacuum through the molded pulp container substrate. Plug assisted, vacuum lamination processes are also known. For example, Wommelsdorf, et al., in U.S. Pat. No. 4,124,434, disclose such processes for deep drawn laminates, such as coated cups, and Faller, in U.S. Pat. Nos. 4,200,481 and 4,257,530, discloses production of lined trays by such processes.

Pressure lamination can be described as the opposite of vacuum lamination. The film can be clamped, heated until it softens, and then forced into the contours of the substrate to be laminated by the application of air pressure to the side of the film opposite to the substrate. Exhaust holes can be present to allow the trapped air to escape, or in the more common situation, the substrate is porous to air and the air simply escapes through the substrate. The air pressure can be released once the laminated substrate cools and the film solidifies. Pressure lamination tends to allow a faster production cycle, improved part definition and greater dimensional control over vacuum lamination. Pressure lamination of films onto preformed subsrates is known and is disclosed, for example, in U.S. Pat. Nos. 3,657,044 and 4,862,671. Wommelsdorf, in U.S. Pat. No. 4,092,201, discloses a process for lining an air-permeable container, such as a paper cup, with a thermoplastic foil through use of a warm pressurized stream of gas.

Mechanical lamination includes any lamination method that does not use vacuum or air pressure. The film is heated and then mechanically applied to the substrate. Examples of the mechanical application can include molds or pressure rolls.

Suitable substrates for lamination with the aliphatic-aromatic copolyetheresters include articles made of paper, paperboard, cardboard, fiberboard, cellulose, such as Cellophane®, starch, plastic, polystyrene foam, glass; metals such as, for example; aluminum or tin cans, metal foils; polymeric foams, organic foams, inorganic foams, organic-inorganic foams, and polymeric films. In some preferred embodiments, the substrates are biodegradable substrates, such as paper, paperboard, cardboard, cellulose, starch, or biobenign substrates such as inorganic and inorganic-organic foams. Organic foams can be derived from expanded starches and grains. Suitable organic foams, inorganic foams, and organic-inorganic foams are described hereinabove.

Polymeric materials suitable as substrates can comprise the aliphatic-aromatic copolyetheresters and/or other polymeric materials that can be biodegradable or not biodegradable. The materials can be naturally derived, modified naturally derived or synthetic. Examples of suitable biodegradable, nonbiodegradable, and naturally derived polymeric materials for use in substrates are disclosed hereinabove.

The substrates can be formed into their final shape prior to lamination. Any conventional process can be used to form the substrates. For example, for molded pulp substrates, a "precision molding", "die-drying", and "close-drying" process can be used. The processes include molding fibrous pulp from an aqueous slurry against a screen-covered open-face suction mold to the substantially finished contoured shape, followed by drying the damp pre-form under a strong pressure applied by a mated pair of heated dies. Such processes are disclosed, for example, in U.S. Pat. Nos. 2,183,869, 4,337,116, and 4,456,164. Precision molded pulp articles tend to be dense, hard and boardy, with a smooth, hot-ironed surface finish. Disposable paper plates produced by such processes have been sold under the "Chinet" name by the Huhtamaki Company.

Molded pulp substrates can also be produced by the commonly known "free-dried" or "open-dried" processes. The free-dried process includes molding fibrous pulp from an aqueous slurry against a screen-covered, open-face suction mold to essentially the final molded shape and then drying the damp pre-form in a free space, such as placing it on a conveyor, and moving it slowly through a heated drying oven. Molded pulp substrates can also be produced by being "after pressed" after forming through a free-dried process, for example, as disclosed within U.S. Pat. No. 2,704,493, or by other conventional processes such as described, for example, in U.S. Pat. No. 3,185,370.

Laminated substrates can be converted to the final shape using well-known processes, such as press forming or folding up. Such processes are disclosed, for example, in U.S. Pat. Nos. 3,924,013, 4,026,458, and 4,456,164. U.S. Pat. No. 4,900,594 discloses the production of trays from flat, polyester laminated paperstock through the use of pressure and heat.

If desired, adhesives can be applied to the film comprising the aliphatic-aromatic copolyetheresters and/or to the substrate, and can enhance the bond strength of the laminate. The film can be coated with an adhesive by conventional coating technologies or by coextrusion. Adhesive lamination of films onto preformed substrates is known and is disclosed, for example, in U.S. Pat. Nos. 2,434,106, 2,510,908, 2,628,180, 2,917,217, 2,975,093, 3,112,235, 3,135,648, 3,616,197, 3,697,369, 4,257,530, 4,016,327, 4,352,925, 5,037,700, 5,132,391, and 5,942,295. For example, Schmidt, in U.S. Pat. No. 4,130,234, discloses the use of hot melt adhesives in the lamination of polymeric films to paper cups. Dropsy, in U.S. Pat. No. 4,722,474, discloses the use of adhesives for plastic laminated cardboard packaging articles. Quick, et al., in U.S. Pat. No. 4,900,594, disclose the formation of paperboard trays through pressure and heat forming of a flat polyester laminated paperboard stock adhered with a crosslinkable adhesives system. Martini, et al., in U.S. Pat. No. 5,110,390, disclose the lamination of coextruded bilayer films onto water-soluble substrates through the use of adhesives. Gardiner, in U.S. Pat. Nos. 5,679,201 and 6,071,577, discloses the use of adhesives to provide improved bond strengths between polyester coated paperboard onto polyethylene-coated paperboard used to make juice containers. Specific examples of adhesives that can be useful in applying to a substrate a laminate comprising the aliphatic-aromatic copolyestherester are disclosed hereinabove for use in applying coatings. Preferred are biodegradable adhesives such as, for example, glue, gelatine, casein or starch. However, essentially any known adhesive can be used.

Laminates and laminated articles comprising the aliphatic-aromatic copolyetheresters have a wide variety of uses. Exemplary uses include the personal care articles disclosed hereinabove with regard to uses of films, as well as the agricultural uses and other uses disclosed hereinabove. A particularly preferred use of laminates comprising the aliphatic-aromatic copolyetheresters is in food packaging, especially for fast food packaging. Specific examples of food packaging uses for laminates include fast food wrappers, stretch wrap films, hermetic seals, food bags, snack bags, containers for frozen food, drinking cups or goblets, heat-sealed cartons for liquid food stuffs, disposable dishes, disposable containers, grocery bags, cups, trays, cartons, boxes, bottles, crates, food packaging films, blister pack wrappers, skin packaging, hinged lid sandwich and salad containers, ("clam shells"). In cups intended for hot drinks, it is preferable to have a watertight polyester coating only on the inner surface. On the other hand, for cups intended for cold drinks, it is preferable to have a polyester coating on both the inner and outer surface of the cup to protect from water condensing on the outer surface of the cup. For heat-sealed cartons, it is preferable that the sealable polyester coating be on both the inner and outer surface of the container. A specifically preferred end use for the laminates includes wraps. Such wraps can take the form of a polymeric laminated paper. Wraps can be used to enclose meats, other perishable items, and especially fast food items, such as sandwiches, burgers, and dessert items. Desirably, the laminates of the present invention used as wraps combine a balance of physical properties, including paper-like stiffness combined with sufficient toughness so as not to tear when used to wrap, for example, a sandwich, good deadfold characteristics, so that once folded, wrapped or otherwise manipulated into the desired shape, the wraps will maintain their shape and not tend to spontaneously unfold or unwrap, good grease resistance, where desired, and a balance of properties providing a moisture barrier while not allowing for moisture to condense onto the, for example, sandwich. The wraps can have a smooth surface or a textured surface, such as produced by embossing, crimping, or quilting. The wraps can incorporate fillers, such as, for example, inorganic particles, organic particles, such as starch, and combinations thereof.

The aliphatic-aromatic copolyetheresters can be formed into sheets. Polymeric sheets have a variety of uses, such as in signage, glazings, thermoforming articles, displays and display substrates for example. For many uses, the heat resistance of the sheet is an important factor. Therefore, a higher melting point, glass transition temperature, and crystallinity level are desirable to provide better heat resistance and greater stability. Further, it is often desired that the sheets have ultraviolet (UV) and scratch resistance, good tensile strength, high optical clarity, and a good impact strength, particularly at low temperatures. The sheets can be used for forming signs, glazings (such as in bus stop shelters, sky lights or recreational vehicles), displays, automobile lights and in thermoforming articles, for example. In a preferred embodiment, the sheets have a thickness sufficient to provide rigidity, which is generally about 0.50 mm or greater. However, sheets greater than 25 mm, and thinner than 0.25 mm can be formed.

The aliphatic-aromatic copolyetheresters can be formed into sheets using known methods. For example, the copolyetheresters can be formed into sheets directly from the polymerization melt. In the alternative, the copolyetherester can be formed into an easily handled shape (such as pellets) from the melt, which can then be used to form a sheet. Sheets can be formed by processes including extrusion, solution casting or injection molding. The parameters for specific processes can be determined by one skilled in the art, and depend upon factors including viscosity of the copolyetherester and the desired thickness of the sheet. In some preferred embodiments, sheets comprising the aliphatic-aromatic copolyetheresters are formed by either solution casting or extrusion. Extrusion is particularly preferred for formation of "endless" products, such as films and sheets, which emerge as a continuous length. For example, PCT patent applications, WO 96/38282 and WO 97/00284, describe the formation of crystallizable sheets by melt extrusion.

In extrusion processes, sheets of different widths and thickness can be produced. After extrusion, the polymeric sheet is taken up on rollers, cooled and taken off by means of suitable devices that are designed to prevent any subsequent deformation of the sheet. A sheet can be produced by extruding a thin layer of polymer over chilled rolls and then further drawing down the sheet to a desired thickness and size by tension rolls. In some preferred embodiments, the finished sheet is greater than 0.25 mm thick. For manufacturing large quantities of sheets, a sheeting calender can be employed, as described hereinabove with regard to film formation. Extrusion can be combined with a variety of post-extruding operations for expanded versatility. Such post-forming operations include, for example, altering round to oval shapes, stretching the sheet to different dimensions, machining and punching, biaxial stretching.

Sheets comprising the aliphatic-aromatic copolyetheresters can be combined with other polymeric materials during extrusion and/or finishing to form laminates or multilayer sheets with improved characteristics, such as water vapor resistance. A multilayer or laminate sheet can be made using known methods, and can have as many as five or more separate layers joined together, for example, by heat, adhesive and/or a tie layer. A sheet can also be made by solution casting, which produces a more consistently uniform gauge sheet than that made by melt extrusion. Solution casting processes are known to those skilled in the art and are described hereinabove for producing films.

Alternatively, sheets and sheet-like articles, such as discs, can be formed by injection molding using known methods. Regardless of the process used for producing a sheet, appropriate process parameters can be determined by one skilled in the art based on the polymeric composition and process used for sheet formation.

Regardless of how the sheet is formed, it can be subjected to biaxial orientation by stretching in both the machine and transverse direction after formation, as described hereinabove. Biaxially stretched sheets are preferred for certain uses where uniform sheeting is desired. Biaxial orientation can be obtained using known processes; however, tentering is preferred. The properties exhibited by a sheet depend on several factors indicated above, including the polymeric composition, the method of forming the polymer, the method of forming the sheet, and whether the sheet was treated for stretch or biaxially oriented. These factors affect a variety of properties of the sheet, including shrinkage, tensile strength, elongation at break, impact strength, dielectric strength and constant, tensile modulus, chemical resistance, melting point, and heat deflection temperature.

The sheet properties can be further adjusted by adding additives and/or fillers to the aliphatic-aromatic copolyetherester, such as, for example, colorants, dyes, UV and thermal stabilizers, antioxidants, plasticizers, lubricants antiblock agents, and slip agents, as recited above. In some embodiments, the aliphatic-aromatic copolyetheresters used to form a sheet can be blended with one or more other polymers, such as starch, to improve certain characteristics. Other polymers can be added to change such characteristics as air permeability, optical clarity, strength and/or elasticity, for example.

Sheets comprising the aliphatic-aromatic copolyetheresters can be thermoformed by any known method into any desirable shape, such as covers, skylights, shaped greenhouse glazings, displays, and food trays. The thermoforming is accomplished by heating the sheet to a sufficient temperature and for sufficient time to soften the copolyester so that the sheet can be easily molded into the desired shape. One skilled in the art can determine the optimal thermoforming parameters depending upon the viscosity and crystallization characteristics of the sheet.

The aliphatic-aromatic copolyetheresters are useful in making plastic containers. Plastic containers are widely used for foods and beverages, and also for non-food uses. Plastic containers can be made by any known method, such as, for example, methods used in making containers from poly (ethylene terephthalate) (PET). Such methods include extrusion, injection molding, injection blow molding, rotational molding, thermoforming of a sheet, and stretch-blow molding. A preferred method for molding a container is stretch-blow molding, as used in the production of PET containers, such as bottles. Use can be made of any of the cold parison methods, in that a preformed parison (generally made by injection molding) is taken out of the mold and then subjected to stretch blow molding in a separate step. The hot parison method can also be used, wherein the hot parison is immediately subjected to stretch blow molding in the same equipment without complete cooling after injection molding to make the parison. The desired parison temperature depends on the exact composition of the polymer to be used. Generally, parison temperatures in the range from about 90° C. to about 160° C. are suitable. The stretch blow molding temperature also depends on the composition of the material being molded, but a mold temperature of about 80° C. to about 150° C. is generally useful.

Containers made from the aliphatic-aromatic copolyetheresters can have any shape desired. Examples of containers include narrow-mouth bottles and wide-mouth bottles having threaded tops and a volume of about 400 mL to about 3 liters, although smaller and larger containers can to be formed. The containers can be used in standard cold fill applications. Some aliphatic-aromatic copolyetheresters are suitable for use in hot fill applications. The containers can be used for foods and beverages, and other solids and liquids. The containers can be clear and transparent, or can be modified to have a desired color or to be opaque, rather than transparent by adding colorants or dyes, or by causing crystallization of the polymer, which results in opaqueness.

The aliphatic-aromatic copolyetheresters can also be made into fibers. The term "fibers", as used herein, refers to continuous monofilaments, non-twisted or entangled multifilament yarns, staple yarns, spun yarns, and non-woven-materials. Synthetic fibers, such as yarns made from nylon, acrylic, and polyesters, are made by spinning and drawing the polymer into a filament, which is then formed into a yarn by winding many filaments together. Fibers are often treated mechanically and/or chemically to impart desirable characteristics such as strength, elasticity, heat resistance, hand (feel of fabric), depending upon the desired end product to be fashioned from the fibers. Such fibers can be used to form uneven fabrics, knifted fabrics, fabric webs, or any other fiber-containing structures, such as tire cords. Polyester fibers are used in a variety of applications. In particular, polyester fibers are used in textiles, for example, in combination with natural fibers such as cotton and wool, which can be fashioned into items such as clothing and rugs. Further, polyester fibers are desirable for use in industrial applications due to their elasticity and strength, for articles such as tire cords and ropes. Fibers comprising the aliphatic-aromatic copolyetheresters can be used in many of the applications in which other synthetic fibers, particularly polyester fibers, are used.

For use in making fibers, the composition of the aliphatic-aromatic copolyetherester is desirably chosen to result in a partially crystalline polymer. The crystallinity is desirable for the formation of fibers because it provides strength and elasticity. As first produced, the polyester is mostly amorphous in structure. In preferred embodiments, the polyester polymer readily crystallizes on reheating and/or extension of the polymer.

Fibers comprising the aliphatic-aromatic copolyetheresters can be made using any known process for making synthetic fibers. Generally, however, melt spinning is preferred for polyester fibers. Melt spinning includes heating the polymer to form a molten liquid, or melting the polymer against a heated surface. The molten polymer is forced through a spinneret with a plurality of fine holes. Upon contact with air or a non-reactive gas stream after passing through the spinneret, the polymer solution from each spinneret solidifies into filaments. The filaments are gathered together downstream from the spinneret by a convergence guide, and can be taken up by a roller or a plurality of rollers. This process allows filaments of various sizes and cross sections to be formed, including filaments having, for example, a round, elliptical, square, rectangular, lobed or dog-boned cross section.

Following the extrusion and uptake of the fiber, the fiber is usually drawn, thereby increasing the crystallization and maximizing desirable properties such as orientation along the longitudinal axis, that increases elasticity, and strength. The drawing can be done in combination with takeup by using a series of rollers, some of which are generally heated, or can be done as a separate stage in the process of fiber formation. The polymer can be spun at speeds of from about 600 to 6000 meters per minute or higher, depending on the desired fiber size. For textile applications, a fiber with a denier per filament of from about 0.1 to about 100 is desired. Preferably, the denier is about 0.5 to 20, more preferably 0.7 to 10. However, for industrial applications the fiber should be from about 0.5 to 100 denier per filament, preferably about 1.0 to 10.0, most preferably 3.0 to 5.0 denier per filament. The required size and strength of a fiber can be readily determined by one skilled in the art, depending upon the intended use of the fiber.

Filamentary materials thus made are amenable to further processing through the use of additional processing equipment, or can be used directly in applications requiring a continuous filament textile yarn. If desired, the filamentary material subsequently can be converted from a flat yarn to a textured yarn using known false twist texturing conditions or other known processes. In particular, it may be desirable to increase the surface area of the fiber to provide a softer feel and to enhance the ability of the fibers to breathe, thereby providing better insulation and water retention in the case of textiles, for example. The fibers can therefore be crimped or twisted by the false twist method, air jet, edge crimp, gear crimp, or stuffer box, for example. Alternatively, the fibers can be cut into shorter lengths, called staple, which can be processed into yarn. A skilled artisan can determine the best method of crimping or twisting based on the desired application and the composition of the fiber.

After formation, the fibers can be finished by any method appropriate to the desired final use. For textiles, finishing can include dyeing, sizing, or addition of chemical agents such as, for example, antistatic agents, flame retardants, UV light stabilizers, antioxidants, pigments, dyes, stain resistants, and antimicrobial agents, as desired to adjust the look and hand of the fibers. For industrial applications, the fibers can be treated to impart additional desired characteristics such as strength, elasticity or shrinkage, for example. Continuous filaments comprising the aliphatic-aromatic copolyetheresters can be used as produced or texturized for use in a variety of applications such as textile fabrics for apparel and home furnishings. High tenacity fibers can be used in industrial applications such as high strength fabrics, tarpaulins, sailcloth, sewing threads and rubber reinforcement for tires and V-belts.

Staple fibers comprising the aliphatic-aromatic copolyetheresters can be blended with natural fibers, such as cotton and wool. Polyester fiber is known to be a chemically resistant fiber and is generally resistant to mold, mildew, and other problems inherent to natural fibers. Polyester fiber further provides strength and abrasion resistance and lowers the cost of material. Therefore, it is ideal for use in textiles and other commercial applications, such as for use in fabrics for apparel, home furnishings and carpets.

The aliphatic-aromatic copolyetheresters can be used with another synthetic or natural polymer to form heterogeneous fiber or bicomponent fiber, thereby providing a fiber with improved properties. The heterogeneous fiber can be formed in any suitable manner using known methods, such as, for example, side-by-side, sheath-core, and matrix designs.

The aliphatic-aromatic copolyetheresters can be formed into shaped foamed articles. Thermoplastic polymeric materials are foamed to provide low-density articles, such as films, cups, food trays, decorative ribbons, furniture parts. Polyesters, such as poly(ethylene terephthalate), typically have a much higher density, (e.g.; 1.3 g/cc), than other polymers. Foaming is therefore desirable to decrease the weight of molded parts, films, sheets, food trays, and thermoformed parts made from polyesters. Such foamed articles also provide improved insulating properties than unfoamed articles.

Generally, polyesters to be foamed should have a sufficiently high Melt viscosity to hold a formed foamed shape long for the polyester to solidify to form the final foamed article. This can be achieved by raising the inherent viscosity of the as-produced polyester by post-polymerization processes, such as a solid-state polymerization method, as described above. Alternatively, the polyester can incorporate a branching agent, such as described in U.S. Pat. Nos. 4,132,707, 4,145,466, 4,999,388, 5,000,991, 5,110,844, 5,128,383, and 5,134,028. Such branched polyesters can additionally be subjected to the solid-state polymerization, as described above, to further enhance the melt viscosity. The polyester can further incorporate a chain extension agent, such as a dianhydride or a polyepoxide, which is typically added during the foaming process.

The aliphatic-aromatic copolyetheresters can be foamed by a wide variety of methods, including the injection of an inert gas such as nitrogen or carbon dioxide into the melt during extrusion or molding operations. Alternatively, inert hydrocarbon gases such as methane, ethane, propane, butane, and pentane; or chlorofluorocarbons, hydrochlorofluorocarbons, or hydrofluorocarbons, can be used. Another method involves the dry blending of chemical blowing agents with the polyester and then extruding or molding the compositions to provide foamed articles. During the extrusion or molding operation, an inert gas such as nitrogen is released from the blowing agents and provides the foaming action. Typical blowing agents include azodicaronamide, hydrazocarbonamide, dinitrosopentamethylenetetramine, p-toluenesulfonyl hydrazodicarboxylate, 5-phenyl-3,6-dihydro-1,3,4-oxadiazin-2-one, sodium borohydride, sodium bicarbonate, 5-phenyltetrazole, p,p'-oxybis(benzenesulfonylhydrazide). Still another method involves the blending of sodium carbonate or sodium bicarbonate with one portion of the polyester pellets, blending of an organic acid, such as citric acid, with another portion of the polyester pellets and then blending of the two types of pellets through extrusion or molding at elevated temperatures. Carbon dioxide gas is released from the interaction of the sodium carbonate and citric acid to provide the desired foaming action in the polymeric melt.

It is desirable that the polymer for foaming incorporate nucleation agents to create sites for bubble initiation. Such agents also influence the cell size of a foamed sheet or other article formed, and can hasten the solidification of the foamed article. Examples of nucleation agents can include sodium acetate, talc, titanium dioxide, and polyolefin materials such as polyethylene, polypropylene.

Polymeric foaming equipment and processes are known, and are disclosed, for example, in U.S. Pat. Nos. 5,116,881, 5,134,028, 4,626,183, 5,128,383, 4,746,478, 5,110,844, 5,000,844, and 4,761,256. Reviews on foaming technology can be found in Kirk-Othmer Encyclopedia of Chemical Technology, Third Edition, Volume 11, pp. 82–145 (1980), John-Wiley and Sons, Inc., New York, N.Y. and the Encyclopedia of Polymer Science and Engineering, Second Edition, Volume 2, pp. 434–446 (1985), John Wiley and Sons, Inc., New York, N.Y. As described above, foamable polymers can include a wide variety of additives, fillers, or can be blended with other materials. For biodegradable foams, the addition of cellulose, cellulose derivatives, such as chemically modified cellulose, starch, and starch derivatives, such as chemically modified starch and thermoplastic starch, is especially preferred.

EXAMPLES

Test Methods

Unless otherwise stated, the following test methods are used in the Examples.

Differential Scanning Calorimetry, (DSC), is performed on a TA Instruments Model Number 2920 machine. Samples are heated under a nitrogen atmosphere at a rate of 20° C./minute to 300° C., programmed cooled back to room temperature at a rate of 20° C./minute and then reheated to 300° C. at a rate of 20° C./minute. The observed glass transition temperature, (Tg), and crystalline melting temperature, (Tm), noted in the following Examples were from the second heating.

Inherent Viscosity, (IV), is defined in "Preparative Methods of Polymer Chemistry", W. R. Sorenson and T. W. Campbell, 1961, p. 35. It is determined at a concentration of 0.5 g/10 mL of a 50:50 weight percent trifluoroacetic acid-:dichloromethane acid solvent system at room temperature by a Goodyear R-103B method.

Laboratory Relative Viscosity, (LRV), is the ratio of the viscosity of a solution of 0.6 gram of the polyester dissolved in 10 mL of hexafluoroisopropanol (HFIP) containing 80 ppm sulfuric acid, to the viscosity of the sulfuric acid-containing hexafluoroisopropanol itself, both measured at 25° C. in a capillary viscometer. The LRV can be numerically related to IV. Where this relationship is utilized, the term "calculated IV" is noted.

Biodegradation testing was performed according to the ISO 14855 method "Determination of the ultimate aerobic biodegradability and disintegration of plastic materials under controlled composting conditions—Method by analysis of evolved carbon". This test involved injecting an inoculum consisting of a stabilized and mature compost derived from the organic fraction of municipal solid waste with ground powder of the polymer to be tested on a vermiculite matrix, composting under standard conditions at an incubation temperature controlled at 58° C.+/−2° C. The test was conducted with one polymer sample that had been ground to powder. The carbon dioxide evolved is used to determine the extent of biodegradation.

Prior to testing film properties, film samples to be tested were conditioned for 40 hours at 72° F. and 50 percent humidity. Elmendorf Tear was determined as per ASTM 1922. Graves Tear was determined as per ASTM D1004. Tensile Strength at break, tensile modulus and percent elongation at break were determined as per ASTM D882.

Comparative Example 1 (CE 1)

To a 1.0 liter glass flask were added bis(2-hydroxyethyl) terephthalate, (508.48 grams), dimethyl glutarate, (82.14 grams), tris(2-hydroxyethyl)trimellitate, (2.23 grams), manganese(II) acetate tetrahydrate, (0.2363 grams), and antimony(III) trioxide, (0.1902 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.3 hours. The reaction mixture was then heated to 275° C. over 0.7 hours with stirring under a slight nitrogen purge. The reaction mixture was then stirred at 275° C. for 1.2 hours while under a slight nitrogen purge. 83.3 grams of a colorless distillate was collected over the heating cycle. The reaction mixture was then staged to full vacuum with stirring at 275° C. The resulting reaction mixture was stirred for 2.3 hours under full vacuum, (pressure less than 100 mtorr). The vacuum was then released with nitrogen and the reaction mass allowed to cool to room temperature. An additional 53.1 grams of distillate was recovered and 391.6 grams of a solid product was recovered.

The product was measured for inherent viscosity, (IV), as described above, and was found to have an IV of 0.71 dL/g. The product underwent differential scanning calorimetry, (DSC), analysis. A glass transition temperature, (Tg), was found with an onset temperature of 47.5° C., a midpoint temperature of 49.9° C., and an endpoint temperature of 52.2° C. A crystalline melting temperature, (Tm), was observed aft 215.3° C., (27.7 J/g).

A sample of the product underwent biodegradation testing, as described above. After 14 days, 3 weight percent of the sample was found to be biodegraded. After 26.3 days, 3.2 weight percent of the sample was found to be biodegraded.

Comparative Example 2 (CE 2)

To a 1.0 liter glass flask was added bis(2-hydroxyethyl) terephthalate, (635.66 grams), dimethyl glutarate, (2.01 grams), tris(2-hydroxyethyl)trimellitate, (2.23 grams), poly(ethylene glycol), (average molecular weight of 1500), (42.38 grams), manganese(II) acetate tetrahydrate, (0.2363 grams), and antimony(III) trioxide, (0.1902 grams). The reaction mixture was stirred and heated to 180° C. under a slow nitrogen purge. After reaching 180° C., the reaction mixture was heated to 200° C. over 0.2 hours with stirring under a slow nitrogen purge. The resulting reaction mixture was stirred at 200° C. under a slight nitrogen purge for 1.0 hour. The reaction mixture was then heated to 275° C. over 0.8 hours with stirring under a slight nitrogen purge. The resulting reaction mixture was stirred at 275° C. for 1.1 hours while under a slight nitrogen purge. 86.6 grams of a colorless distillate was collected over this heating cycle. The reaction mixture was then staged to full vacuum with stirring at 275° C. The resulting reaction mixture was stirred for 2.0 hours under full vacuum, (pressure less than 100 mtorr). The vacuum was then released with nitrogen and the reaction mass allowed to cool to room temperature. An additional 67.3 grams of distillate was recovered and 395.1 grams of a solid product was recovered.

A sample of the product was measured for inherent viscosity, (IV), as described above, and was found to have an IV of 0.69 dL/g. The sample underwent differential scanning calorimetry, (DSC), analysis. A crystalline melting temperature, (Tm), was observed at 251.5° C., (38.8 J/g). The sample underwent biodegradation testing, as described above. After 26.3 days, 4.4 weight percent of the sample was found to be biodegraded.

Comparative Example 3 (CE 3)

To a 250 milliliter glass flask were added bis(2-hydroxyethyl)terephthalate, (50.85 grams), dimethyl glutarate, (8.22 grams), tris(2-hydroxyethyl)trimellitate, (0.23 grams), polyethylene glycol, (average molecular weight=1450), (72.88 grams), manganese(II) acetate tetrahydrate, (0.026 grams), and antimony(III) trioxide, (0.021 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.0 hour. The reaction mixture was then heated to 275° C. over 0.2 hours with stirring under a slight nitrogen purge. The resulting reaction mixture was stirred at 275° C. for 0.9 hours while under a slight nitrogen purge. 15.5 grams of a colorless distillate was collected over this heating cycle. The reaction mixture was then staged to full vacuum with stirring at 275° C. The resulting reaction mixture was stirred for 3.0 hours under full vacuum, (pressure less than 100 mtorr). The vacuum was then released with nitrogen and the reaction mass allowed to cool to room temperature. An additional 8.8 grams of distillate was recovered and 120.0 grams of a solid product was recovered.

A sample of the product was measured for laboratory relative viscosity, (LRV), as described above and was found to have an LRV of 38.25. This sample was calculated to have an inherent viscosity of 0.94 dL/g. The sample underwent differential scanning calorimetry, (DSC), analysis. A very broad crystalline melting temperature, (Tm), was observed at 206.7° C., (3.6 J/g) during the first heating cycle. No thermal transitions were observed on the second heating cycle.

Comparative Example (CE 4)

To a 250 milliliter glass flask were added bis(2-hydroxyethyl)terephthalate, (101.70 grams), dimethyl glutarate, (16.43 grams), tris(2-hydroxyethyl)trimellitate, (0.45 grams), polyethylene glycol, (average molecular weight=1450), (29.23 grams), manganese(II) acetate tetrahydrate, (0.047 grams), and antimony(III) trioxide, (0.038 grams). The reaction mixture was stirred and heated to 180° C. under a slow nitrogen purge. After reaching 180° C., the reaction mixture was heated to 200° C. over 0.8 hours with stirring under a slow nitrogen purge. The resulting reaction mixture was stirred at 200° C. under a slight nitrogen purge for 1.0 hour. The reaction mixture was then heated to 275° C. over 2.0 hours with stirring under a slight nitrogen purge. The resulting reaction mixture was stirred at 275° C. for 1.0 hour while under a slight nitrogen purge. 7.1 grams of a colorless distillate was collected over this heating cycle. The reaction mixture was then staged to full vacuum with stirring at 275° C. The resulting reaction mixture was stirred for 1.9 hours under full vacuum, (pressure less than 100 mtorr). The vacuum was then released with nitrogen and the reaction mass allowed to cool to room temperature. An additional 14.3 grams of distillate was recovered and 94.4 grams of a solid product was recovered.

A sample of the product was measured for laboratory relative viscosity, (LRV), as described above and was found to have an LRV of 34.43. This sample was calculated to have an inherent viscosity of 0.87 dL/g. The sample underwent differential scanning calorimetry, (DSC), analysis. A crystalline melting temperature, (Tm), was observed at 196.4° C., (19.6 J/g).

Example 1

To a 1 liter glass flask were added bis(2-hydroxyethyl) terephthalate, (508.48 grams), dimethyl glutarate, (82.14 grams), tris(2-hydroxyethyl)trimellitate, (2.23 grams), polyethylene glycol, (average molecular weight=1500), (42.38 grams), manganese(II) acetate tetrahydrate, (0.2363 grams), and antimony(III) trioxide, (0.1902 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.1 hours. The reaction mixture was then heated to 275° C. over 0.8 hours with stirring under a slight nitrogen purge. The resulting reaction mixture was stirred at 275° C. for 1.2 hours while under a slight nitrogen purge. 80.2 grams of a colorless distillate was collected over this heating cycle. The reaction mixture was then staged to full vacuum with stirring at 275° C. The resulting reaction mixture was stirred for 3.5 hours under full vacuum, (pressure less than 100 mtorr). The vacuum was then released with nitrogen and the reaction mass allowed to cool to room temperature. An additional 59.0 grams of distillate was recovered and 438.1 grams of a solid product was recovered.

A sample of the product was measured for laboratory relative viscosity, (LRV), as described above and was found to have an LRV of 25.69. This sample was calculated to have an inherent viscosity of 0.71 dL/g.

The sample underwent differential scanning calorimetry, (DSC), analysis. A crystalline melting temperature, (Tm), was observed at 216.5° C., (22.4 J/g).

The sample underwent biodegradation testing, as described above. After 26.5 days, 15.7 weight percent of the sample had been found to be biodegraded. After 33.5 days, 21.6 weight percent of the sample had been found to be biodegraded.

This example demonstrates thermal properties of the aliphatic-aromatic copolyetheresters according to the present invention. Example 1, which incorporates a poly (alkyene glycol ether) within the preferred amounts disclosed herein, has essentially equivalent thermal properties, as demonstrated with the observed crystalline melting temperature, (Tm), and crystallinity level, as found for an equivalent aliphatic-aromatic copolyester that does not incorporate any poly(alkylene glycol ether) (described in Comparative Example CE 1). On the other hand, the aliphatic-aromatic copolyetherester, as demonstrated by Example 1, has a significantly higher level of thermal properties, as shown by the observed crystalline melting temperature, (Tm), and crystallinity level, than found for known aliphatic-aromatic copolyetheresters, such as the copolyetherester of Comparative Example CE 3, which incorporates 20 mole percent poly(alkylene glycol ether), and that of Comparative Example CE 4, which incorporates 4 mole percent poly(alkylene glycol ether).

This example further demonstrates the surprisingly enhanced biodegradation rate for the aliphatic-aromatic copolyetheresters of the present invention. The aliphatic-aromatic copolyetherester of Example 1 was found to have approximately five times the biodegradation level after 26.3 days over an aliphatic-aromatic copolyester with a comparable level of aliphatic dicarboxylic acid that did not incorporate a poly(alkylene glycol ether) (Comparative Example CE 1). Further, the aliphatic-aromatic copolyetherester of Example 1 was found to have over three times the biodegradation rate after 26.3 days than found for known aliphatic-aromatic copolyetheresters that incorporate an equivalent level of poly(alkylene glycol ether), but with a level of aliphatic dicarboxylic acid below that of the present aliphatic-aromatic copolyether esters, as in Comparative Example CE 2.

Example 2

To a 250 milliliter glass flask was added bis(2-hydroxyethyl)terephthalate, (99.15 grams), dimethyl glutarate, (16.02 grams), polyethylene glycol, (average molecular weight=1000), (8.14-grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.4 hours with stirring under a slow nitrogen purge. The resulting reaction mixture was stirred at 200° C. under a slight nitrogen purge for 1.1 hours. The reaction mixture was then heated to 275° C. over 2.1 hours with stirring under a slight nitrogen purge. 7.8 grams of a colorless distillate was collected over this heating cycle. The reaction mixture was then staged to full vacuum with stirring at 275° C. The resulting reaction mixture was stirred for 3.4 hours under full vacuum, (pressure less than 100 mtorr). The vacuum was then released with nitrogen and the reaction mass allowed to cool to room temperature. An additional 7.7 grams of distillate was recovered and 80.3 grams of a solid product was recovered.

A sample of the product was measured for laboratory relative viscosity, (LRV), as described above and was found to have an LRV of 32.46. This sample was calculated to have an inherent viscosity of 0.83 dL/g.

The sample underwent differential scanning calorimetry, (DSC), analysis. A crystalline melting temperature, (Tm), was observed at 215.3° C., (26.8 J/g).

Example 3

To a 250 milliliter glass flask was added bis(2-hydroxyethyl)terephthalate, (99.15 grams), dimethyl glutarate, (16.02 grams), polyethylene glycol, (average molecular weight=2000), (8.14 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 1.3 hours with stirring under a slow nitrogen purge. The resulting reaction mixture was stirred at 200° C. under a slight nitrogen purge for 1.3 hours. The reaction mixture was then heated to 275° C. over 0.8 hours with stirring under a slight nitrogen purge. The resulting reaction mixture was allowed to stir at 275° C. for 12 hours under a slight nitrogen purge, 9.3 grams of a colorless distillate was collected over this heating cycle. The reaction mixture was then staged to full vacuum with stirring at 275° C. The resulting reaction mixture was stirred for 2.0 hours under full vacuum, (pressure less than 100 mtorr). The vacuum was then released with nitrogen and the reaction mass allowed to cool to room temperature. An additional 12.4 grams of distillate was recovered and 89.7 grams of a solid product was recovered.

A sample of the product was measured for laboratory relative viscosity, (LRV), as described above and was found to have an LRV of 31.03. This sample was calculated to have an inherent viscosity of 0.81 dL/g.

The sample underwent differential scanning calorimetry, (DSC), analysis. A crystalline melting temperature, (Tm), was observed at 212.0° C., (27.0 J/g).

Example 4

To a 250 milliliter glass flask was added bis(2-hydroxyethyl)terephthalate, (99.15 grams), dimethyl glutarate, (16.02 grams), poly(ethylene glycol)-block-poly(propylene glycol)-block-(poly(ethylene glycol), (10 weight percent poly(ethylene glycol), CAS Number 9003-11-6, average molecular weight=1100), (8.14 grams), manganese (II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.5 hours with stirring under a slow nitrogen purge. The resulting reaction mixture was stirred at 200° C. under a slight nitrogen purge for 1.0 hour. The reaction mixture was then heated to 275° C. over 2.0 hours with stirring under a slight nitrogen purge. The resulting reaction mixture was allowed to stir at 275° C. for 1.1 hours under a slight nitrogen purge. 17.8 grams of a colorless distillate was collected over this heating cycle. The reaction mixture was then staged to full vacuum with stirring at 275° C. The resulting reaction mixture was stirred for 3.8 hours under full vacuum, (pressure less than 100 mtorr). The vacuum was then released with nitrogen and the reaction mass allowed to cool to room temperature. An additional 3.1 grams of distillate was recovered and 68.4 grams of a solid product was recovered.

A sample of the product was measured for laboratory relative viscosity, (LRV), as described above and was found to have an LRV of 23.16. This sample was calculated to have an inherent viscosity of 0.67 dL/g.

The sample underwent differential scanning calorimetry, (DSC), analysis. A crystalline melting temperature, (Tm), was observed at 223.2° C., (27.4 J/g).

Example 5

To a 250 milliliter glass flask was added bis(2-hydroxyethyl)terephthalate, (99.15 grams), dimethyl glutarate, (16.02 grams), poly(ethylene glycol)-block-poly(propylene glycol)-block-(poly(ethylene glycol), (10 weight percent poly(ethylene glycol), CAS Number 9003-11-6, average molecular weight=2000), (8.14 grams), manganese (II) acetate tetrahydrate, (0.042 grams), and antimony(II) trioxide, (0.034 grams). The reaction mixture was stirred and heated to 180° C. under a slow nitrogen purge. After reaching 180° C., the reaction mixture was heated to 200° C. over 0.6 hours with stirring under a slow nitrogen purge. The resulting reaction mixture was stirred at 200° C. under a slight nitrogen purge for 1.0 hour. The reaction mixture was then heated to 275° C. over 1.0 hour with stirring under a slight nitrogen purge. The resulting reaction mixture was allowed to stir at 275° C. for 1.0 hour under a slight nitrogen purge. 17.2 grams of a colorless distillate was collected over this heating cycle. The reaction mixture was then staged to full vacuum with stirring at 275° C. The resulting reaction mixture was stirred for 4.1 hours under full vacuum, (pressure less than 100 mtorr). The vacuum was then released with nitrogen and the reaction mass allowed to cool to room temperature. An additional 4.9 grams of distillate was recovered and 86.5 grams of a solid product was recovered.

A sample of the product was measured for laboratory relative viscosity, (LRV), as described above and was found to have an LRV of 23.07. This sample was calculated to have an inherent viscosity of 0.66 dL/g.

The sample underwent differential scanning calorimetry, (DSC), analysis. A crystalline melting temperature, (Tm), was observed at 221.9° C., (28.8 J/g).

Example 6

To a 250 milliliter glass flask was added bis(2-hydroxyethyl)terephthalate, (99.15 grams), dimethyl glutarate, (16.02 grams), polyethylene glycol, (average molecular weight=1000), (12.21 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.2 hours with stirring under a slow nitrogen purge. The resulting reaction mixture was stirred at 200° C. under a slight nitrogen purge for 1.0 hour. The reaction mixture was then heated to 275° C. over 1.2 hours with stirring under a slight nitrogen purge. The resulting reaction mixture was allowed to stir at 275° C. for 1.0 hour under a slight nitrogen purge. 7.6 grams of a colorless distillate was s collected over the heating cycle. The reaction mixture was then staged to full vacuum with stirring at 275° C. The resulting reaction mixture was stirred for 3.5 hours under full vacuum, (pressure less than 100 mtorr). The vacuum was then released with nitrogen and the reaction mass allowed to cool to room temperature. An additional 9.2 grams of distillate was recovered and 89.5 grams of a solid product was recovered.

A sample of the product was measured for laboratory relative viscosity, (LRV), as described above and was found to have an LRV of 17.94. This sample was calculated to have an inherent viscosity of 0.57 dL/g.

The sample underwent differential scanning calorimetry, (DSC), analysis. A crystalline melting temperature, (Tm), was observed at 208.3° C., (26.5 J/g).

Example 7

To a 250 milliliter glass-flask was added bis(2-hydroxyethyl)terephthalate, (99.15 grams), dimethyl glutarate, (16.02 grams), poly(ethylene glycol)-block-poly(propylene glycol)-block-(poly(ethylene glycol), (10 weight percent poly(ethylene glycol), CAS Number 9003-11-6, average molecular weight=1100), (12.21 grams), manganese (II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.4 hours with stirring under a slow nitrogen purge. The resulting reaction mixture was stirred at 200° C. under a slight nitrogen purge for 1.0 hour. The reaction mixture was then heated to 275° C. over 2.0 hours with stirring under a slight nitrogen purge. The resulting reaction mixture was allowed to stir at 275° C. for 1.0 hour under a slight nitrogen purge. 25.4 grams of a colorless distillate was collected over this heating cycle. The reaction mixture was then staged to full vacuum with stirring at 275° C. The resulting reaction mixture was stirred for 3.2 hours under full vacuum, (pressure less than 100 mtorr). The vacuum was then released with nitrogen and the reaction mass allowed to cool to room temperature. An additional 3.0 grams of distillate was recovered and 63.8 grams of a solid product was recovered.

A sample of the product was measured for laboratory relative viscosity, (LRV), as described above and was found to have an LRV of 21.63. This sample was calculated to have an inherent viscosity of 0.64 dL/g.

The sample underwent differential scanning calorimetry, (DSC), analysis. A crystalline melting temperature, (Tm), was observed at 233.3° C., (32.3 J/g).

Example 8

To a 250 milliliter glass flask was added bis(2-hydroxyethyl)terephthalate, (99.15 grams), dimethyl glutarate, (16.02 grams), poly(ethylene glycol)-block-poly(propylene glycol)-block-(poly(ethylene glycol), (10 weight percent poly(ethylene glycol), CAS Number 9003-11-6, average molecular weight=1100), (16.28 grams), manganese (II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.9 hours with stirring under a slow nitrogen purge. The resulting reaction mixture was stirred at 200° C. under a slight nitrogen purge for 0.8 hours. The reaction mixture was then heated to 275° C. over 0.6 hours with stirring under a slight nitrogen purge. The resulting reaction mixture was allowed to stir at 275° C. for 1.2 hours under a slight nitrogen purge. 9.7 grams of a colorless distillate was collected over this heating cycle. The reaction mixture was then staged to full vacuum with stirring at 275° C. The resulting reaction mixture was stirred for 3.6 hours under full vacuum, (pressure less than 100 mtorr). The vacuum was then released with nitrogen and the reaction mass allowed to cool to room temperature. An additional 11.3 grams of distillate was recovered and 94.7 grams of a solid product was recovered.

A sample of the product was measured for laboratory relative viscosity, (LRV), as described above and was found to have an LRV of 23.18. This sample was calculated to have an inherent viscosity of 0.64 dL/g.

The sample underwent differential scanning calorimetry, (DSC), analysis. A crystalline melting temperature, (Tm), was observed at 206.4° C., (23.9 J/g).

Examples 1 through 8 illustrate certain properties of aliphatic-aromatic copolyetheresters of the present invention. The aliphatic-aromatic copolyetheresters of Examples 1 through 8, which incorporate a poly(alkyene glycol ether) within the preferred amounts disclosed herein, have substantially equivalent thermal properties, as demonstrated by the observed crystalline melting temperature, (Tm), and crystallinity level, as found for an equivalent aliphatic-aromatic copolyester that does not incorporate any poly(alkylene glycol ether) (Comparative Example CE 1). On the other hand, the aliphatic-aromatic copolyetheresters of Examples 1 through 8 have improved thermal properties, as shown by the observed crystalline melting temperature, (Tm), and crystallinity level, in comparison with the thermal properties of known aliphatic-aromatic copolyetheresters, such as that of Comparative Example CE 3, which incorporates 20 mole percent poly(alkylene glycol ether), and that of Comparative Example CE 4, which incorporates 4 mole percent poly(alkylene glycol ether).

Example 9

To a 250 milliliter glass flask was added bis(2-hydroxyethyl)terephthalate, (92.80 grams), dimethyl glutarate, (20.02 grams), polyethylene glycol, (average molecular weight=1000), (8.14 grams), manganese(II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 0.5 hours. The reaction mixture was then heated to 275° C. over 0.8 hours with stirring under a slight nitrogen purge. The resulting reaction mixture was allowed to stir at 275° C. for 1.1 hours under a slight nitrogen purge. 9.8 grams of a colorless distillate was collected over this heating cycle. The reaction mixture was then staged to full vacuum with stirring at 275° C. The resulting reaction mixture was stirred for 2.2 hours under full vacuum, (pressure less than 100 mtorr). The vacuum was then released with nitrogen and the reaction mass allowed to cool to room temperature. An additional 11:5 grams of distillate was recovered and 84.1 grams of a solid product was recovered.

A sample of the product was measured for laboratory relative viscosity, (LRV), as described above and was found to have an LRV of 36.74. This sample was calculated to have an inherent viscosity of 0.91 dL/g.

The sample underwent differential scanning calorimetry, (DSC), analysis. A crystalline melting temperature, (Tm), was observed at 195.8° C., (23.2 J/g).

Example 10

To a 250 milliliter glass flask was added bis(2-hydroxyethyl)terephthalate, (92.80 grams), dimethyl glutarate, (20.02 grams), poly(ethylene glycol)-block-poly(propylene glycol)-block-(poly(ethylene glycol), (10 weight percent poly(ethylene glycol), CAS Number 9003-11-6, average molecular weight=1100), (8.14 grams), manganese (II) acetate tetrahydrate, (0.042 grams), and antimony(III) trioxide, (0.034 grams). The reaction mixture was stirred and heated to 180° C. under a slow nitrogen purge. After reaching 180° C., the reaction mixture was heated to 200° C. over 0.8 hours with stirring under a slow nitrogen purge. The resulting reaction mixture was stirred at 200° C. under a slight nitrogen purge for 0.8 hours. The reaction mixture was then heated to 275° C. over 0.7 hours with stirring under a slight nitrogen purge. The resulting reaction mixture was allowed to stir at 275° C. for 0.9 hours under a slight nitrogen purge. 7.3 grams of a colorless distillate was collected over this heating cycle. The reaction mixture was then staged to full vacuum with stirring at 275° C. The resulting reaction mixture was stirred for 3.3 hours under full vacuum, (pressure less than 100 mtorr). The vacuum was then released with nitrogen and the reaction mass allowed to cool to room temperature. An additional 11.9 grams of distillate was recovered and 83.0 grams of a solid product was recovered.

A sample of the product was measured for laboratory relative viscosity, (LRV), as described above and was found to have an LRV of 28.36. This sample was calculated to have an inherent viscosity of 0.76 dL/g.

The sample underwent differential scanning calorimetry, (DSC), analysis. A crystalline melting temperature, (Tm), was observed at 196.9° C., (24.3 J/g).

Example 11

To a 250 milliliter glass flask was added bis(2-hydroxyethyl)terephthalate, (92.80 grams), dimethyl glutarate, (20.02 grams), poly(ethylene glycol)-block-poly(propylene glycol)block-(poly(ethylene glycol), (10 weight percent poly(ethylene glycol), CAS Number 9003-11-6, average molecular weight=1100), (12.21 grams), manganese (II) acetate tetrahydrate, (0.042 grams), and antimony(III) trioxide, (0.034 grams). The reaction mixture was stirred and h to 180° C. under a slow nitrogen purge. After reaching 180° C., the reaction mixture was heated to 200° C. over 0.7 hours with stirring under a slow nitrogen purge. The resulting reaction mixture was stirred at 200° C. under a slight nitrogen purge for 0.8 hours. The reaction mixture was then heated to 275° C. over 0.7 hours with stirring under a slight nitrogen purge. The resulting reaction mixture was allowed to stir at 275° C. for 1.2 hours under a slight nitrogen purge. 6.60 grams of a colorless distillate was collected over this heating cycle. The reaction mixture was then staged to full vacuum with stirring at 275° C. The resulting reaction mixture was stirred for 3.7 hours under full vacuum, (pressure less than 100 mtorr). The vacuum was then released with nitrogen and the reaction mass allowed to cool to room temperature. An additional 12.8 grams of distillate was recovered and 87.4 grams of a solid product was recovered.

A sample of the product was measured for laboratory relative viscosity, (LRV), as described above and was found to have an LRV of 30.53. This sample was calculated to have an inherent viscosity of 0.81 dL/g.

The sample underwent differential scanning calorimetry, (DSC), analysis. A crystalline melting temperature, (Tm), was observed at 189.6° C., (18.9 J/g).

Comparative Example CE 5

To a 1.0 liter glass flask was added bis(2-hydroxyethyl) terephthalate, (443.27 grams), DBE dibasic ester, (20:60:20 mole percent dimethyl succinate:dimethyl glutarate:dimethyl adipate), (123.20 grams), tris(2-hydroxyethyl)trimellitate, (0.20 grams), sodium acetate, (0.75 grams), manganese(II) acetate tetrahydrate, (0.2339 grams), and TYZOR® PC-42 organic titanate, (6.3 weight percent titanium), (0.1248 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.0 hour. The reaction mixture was then heated to 275° C. over 0.7 hours with stirring under a slight nitrogen purge. The resulting reaction mixture was stirred at 275° C. for 1.0 hour while under a slight nitrogen purge. 64.4 grams of a colorless distillate was collected over this heating cycle. The reaction mixture was then staged to full vacuum with stirring at 275° C. The resulting reaction mixture was stirred for 3.0 hours under full vacuum, (pressure less than 100 mtorr). The vacuum was then released with nitrogen and the reaction mass allowed to cool to room temperature. An additional 55.0 grams of distillate was recovered and 390.8 grams of a solid product was recovered.

A sample of the product was measured for laboratory relative viscosity, (LRV), as described above, and was found to have a LRV of 24.58. This sample was calculated to have an inherent viscosity, (IV), of 0.69 dL/g.

The sample underwent differential scanning calorimetry, (DSC), analysis. A broad crystalline melting temperature, (Tm), was observed at 182.0° C., (17.7 J/g).

The sample underwent biodegradation testing, as described above. After 26.3 days, 4.2 weight percent of the sample was found to be biodegraded.

Example 12

To a 1.0 liter glass flask was added bis(2-hydroxyethyl) terephthalate, (443.27 grams), DBE dibasic ester, (20:60:20 mole percent dimethyl succinate:dimethyl glutarate:dimethyl adipate), (123.20 grams), tris(2-hydroxyethyl)trimellitate, (0.20 grams), poly(ethylene glycol), (average molecular weight of 1450), (41.94 grams), sodium acetate, (0.75 grams), manganese(II) acetate tetrahydrate, (0.2339 grams), and TYZOR® PC42 organic titanate, (6.3 weight percent titanium), (0.1248 grams). The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.1 hours. The reaction mixture was then heated to 275° C. over 0.7 hours with stirring under a slight nitrogen purge. The resulting reaction mixture was stirred at 275° C. for 1.0 hour while under a slight nitrogen purge. 78.0 grams of a colorless distillate was collected over this heating cycle. The reaction mixture was then staged to full vacuum with stirring at 275° C. The resulting reaction mixture was stirred for 2.8 hours under full vacuum, (pressure less than 100 mtorr). The vacuum was then released with nitrogen and the reaction mass allowed to cool to room temperature. An additional 45.5 grams of distillate was recovered and 436.7 grams of a solid product was recovered.

A sample of the product was measured for laboratory relative viscosity, (LRV), as described above, and was found to have a LRV of 25.66. This sample was calculated to have an inherent viscosity, (IV), of 0.71 dL/g.

The sample underwent differential scanning calorimetry, (DSC), analysis. A broad crystalline melting temperature, (Tm), was observed at 184.7° C., (16.9 J/g).

The sample underwent biodegradation testing, as described above. After 26.3 days, 17.8 weight percent of the sample had been found to be biodegraded. After 131.1 days, 41.8 weight percent of the sample had been found to be biodegraded.

This example demonstrates the present invention. The aliphatic-aromatic copolyetherester of Example 12, which incorporates a poly(alkyene glycol ether) within the preferred amounts disclosed herein, has substantially equivalent thermal properties, as demonstrated by the observed crystalline melting temperature, (Tm), and crystallinity level, as found for an aliphatic-aromatic copolyester with a comparable level of aliphatic dicarboxylic acid, but that did not incorporate a poly(alkylene glycol ether) (Comparative Example CE 5). This example further demonstrates the present invention by showing a surprisingly enhanced biodegradation rate for the aliphatic-aromatic copolyetheresters of the example. The aliphatic-aromatic copolyetherester of Example 12 was found to have approximately four times the biodegradation level after 26.3 days as did the aliphatic-aromatic copolyester of Comparative Example 5.

Example 13

To a 250 milliliter glass flask was added bis(2-hydroxyethyl)terephthalate, (120.10 grams), a 50 weight percent aqueous glutaric acid solution, (53.50 grams), tris(2-hydroxyethyl)trimellitate, (0.17 grams), poly(ethylene glycol), (average molecular weight of 3400), (5.11 grams), Cloisite® Na, (clay product of the Southern Clay Company, as described above), (14.21 grams), and TYZOR® PEL-G organic titanate, (8.2 weight percent titanium, a product of the DuPont Company), (0.057 grams). The reaction mixture was stirred and heated to 180° C. under a slow nitrogen purge. After reaching 180° C., the reaction mixture was heated to 200° C. over 0.4 hours with stirring under a slow nitrogen purge. The resulting reaction mixture was stirred at 200° C. under a slight nitrogen purge for 1.1 hours. The reaction mixture was then heated to 275° C. over 1.1 hours with stirring under a slight nitrogen purge. The resulting reaction mixture was stirred at 275° C. for 1.0 hour while under a slight nitrogen purge. 68.5 grams of a colorless distillate was collected over this heating cycle. The reaction mixture was then staged to full vacuum with stirring at 275° C. The resulting reaction mixture was stirred for 2.7 hours under full vacuum, (pressure less than 100 mtorr). The vacuum was then released with nitrogen and the reaction mass allowed to cool to room temperature. An additional 7.4 grams of distillate was recovered and 110.6 grams of a solid product was recovered.

A sample of the product was measured for laboratory relative viscosity, (LRV), as described above, and was found to have a LRV of 27.12. This sample was calculated to have an inherent viscosity, (IV), of 0.74 dL/g.

The sample underwent differential scanning calorimetry, (DSC), analysis. A broad crystalline melting temperature, (Tm), was observed at 172.2° C., (16.4 J/g).

Example 14

To a 250 milliliter glass flask was added bis(2-hydroxyethyl)terephthalate, (86.44 grams), dimethyl glutarate, (24.03 grams), poly(ethylene glycol)-block-poly(propylene glycol)-block-(poly(ethylene glycol), (10 weight percent poly(ethylene glycol), CAS Number 9003-11-6, average molecular weight=1100), (8.14 grams), manganese (II) acetate tetrahydrate, (0.042 grams), and antimony(II) trioxide, (0.034 grams). The reaction mixture was stirred and heated to 180° C. under a slow nitrogen purge. After reaching 180° C., the reaction mixture was heated to 200° C. over 0.4 hours with stirring under a slow nitrogen purge. The resulting reaction mixture was stirred at 200° C. under a slight nitrogen purge for 1.1 hours. The reaction mixture was then heated to 275° C. over 1.5 hours with stirring under a slight nitrogen purge. The resulting reaction mixture was allowed to stir at 275° C. for 1.1 hours under a slight nitrogen purge. 4.0 grams of a colorless distillate was collected over this heating cycle. The reaction mixture was then staged to full vacuum with stirring at 275° C. The resulting reaction mixture was stirred for 3.7 hours under full vacuum, (pressure less than 100 mtorr). The vacuum was then released with nitrogen and the reaction mass allowed to cool to room temperature. An additional 10.3 grams of distillate was recovered and 81.0 grams of a solid product was recovered.

A sample of the product was measured for laboratory relative viscosity, (LRV), as described above and was found to have an LRV of 29.04. This sample was calculated to have an inherent viscosity of 0.77 dL/g.

The sample underwent differential scanning calorimetry, (DSC), analysis. A crystalline melting temperature, (Tm), was observed at 182.2° C., (17.4 J/g).

Example 15

To a 1 liter glass flask was added bis(2-hydroxyethyl) terephthalate, (391.07 grams), dimethyl glutarate, (164.25 grams), tris(2-hydroxyethyl)trimellitate, (0.67 grams), polyethylene glycol, (average molecular weight=1450, 39.77 grams), ethylene glycol, (70.03 grams), sodium acetate, (0.72 grams), manganese(II) acetate tetrahydrate, (0.23 grams), and antimony(III) trioxide, (0.19 grams). The reaction mixture was stirred and heated to 180° C. under a slow nitrogen purge. After reaching 180° C., the reaction mixture was heated to 200° C. over 0.5 hours with stirring under a slow nitrogen purge. The resulting reaction mixture was stirred at 200° C. under a slight nitrogen purge for 0.9 hours. The reaction mixture was then heated to 275° C. over 1.4 hours with stirring under a slight nitrogen purge. The resulting reaction mixture was stirred at 275° C. for 2.0 hours while under a slight nitrogen purge. 109.75 grams of a colorless distillate was collected over this heating cycle. The reaction mixture was then staged to full vacuum with stirring at 275° C. The resulting reaction mixture was stirred for 5.5 hours under full vacuum, (pressure less than 100 mtorr). The vacuum was then released with nitrogen and the reaction mass allowed to cool to room temperature. An additional 72.18 grams of distillate was recovered and 463.84 grams of a solid product was recovered.

A sample of the product was measured for laboratory relative viscosity, (LRV), as described above and was found to have an LRV of 25.38. This sample was calculated to have an inherent viscosity of 0.71 dL/g.

The sample underwent differential scanning calorimetry, (DSC), analysis. A broad crystalline melting temperature, (Tm), was observed at 154.9° C., (8.6 J/g).

Example 16

To a 250 milliliter glass flask was added bis(2-hydroxyethyl)terephthalate, (76.05 grams), dimethyl glutarate, (47.91 grams), tris(2-hydroxyethyl)trimellitate, (0.36 grams), polyethylene glycol, (average molecular weight=1500, 9.9 grams), manganese(II) acetate tetrahydrate, (0.0546 grams), and antimony(III) trioxide, (0.439 grams). The reaction mixture was stirred and heated to 180° C. under a slow nitrogen purge. After reaching 180° C., the reaction mixture was heated to 200° C. over 1.1 hours with stirring under a slow nitrogen purge. The resulting reaction mixture was stirred at 200° C. under a slight nitrogen purge for 1.1 hours. The reaction mixture was then heated to 275° C. over 1.7 hours with stirring under a slight nitrogen purge. The resulting reaction mixture was stirred at 275° C. for 1.0 hour while under a slight nitrogen purge. 7.2 grams of a colorless distillate was collected over this heating cycle. The reaction mixture was then staged to full vacuum with stirring at 275° C. The resulting reaction mixture was stirred for 3.6 hours under full vacuum, (pressure less than 100 mtorr). The vacuum was then released with nitrogen and the reaction mass allowed to cool to room temperature. An additional 1.0 grams of distillate was recovered and 99.9 grams of a solid product was recovered.

A sample of the product was measured for laboratory relative viscosity, (LRV), as described above and was found to have an LRV of 6.70. This sample was calculated to have ah inherent viscosity of 0.37 dL/g.

The sample underwent differential scanning calorimetry, (DSC), analysis. A broad crystalline melting temperature, (Tm), was observed at 122.6° C., (12.2 J/g).

Example 17

To a 1.0 liter glass flask was added bis(2-hydroxyethyl) terephthalate, (228.16 grams), dimethyl glutarate, (143.74 grams), tris(2-hydroxyethyl)trimellitate, (1.06 grams), polyethylene glycol, (average molecular weight=1450, 27.33 grams), manganese(II) acetate tetrahydrate, (0.1637 grams), antimony(III) trioxide, (0.1318 grams) and a weight percent slurry of calcium carbonate in ethylene glycol, (170.78 grams) The reaction mixture was stirred and heated to 180° C. under a slow nitrogen purge. After reaching 180° C., the reaction mixture was heated to 200° C. over 0.3 hours with stirring under a slow nitrogen purge. The resulting reaction mixture was stirred at 200° C. under a slight nitrogen purge for 1.3 hours. The reaction mixture was then heated to 275° C. over 0.8 hours with stirring under a slight nitrogen purge. The resulting reaction mixture was stirred at 275° C. for 1.3 hours while under a slight nitrogen purge. 87.5 grams of a colorless distillate was collected over this heating cycle. The reaction mixture was then staged to full vacuum with stirring at 275° C. The resulting reaction mixture was stirred for 1.8 hours under full vacuum, (pressure less than 100 mtorr). The vacuum was then released with nitrogen and the reaction mass allowed to cool to room temperature. An additional 49.5 grams of distillate was recovered and 368.3 grams of a solid product was recovered.

A sample of the product was measured for laboratory relative viscosity, (LRV), as described above and was found to have an LRV of 34.79. This sample was calculated to have an inherent viscosity of 0.88 dL/g.

The sample underwent differential scanning calorimetry, (DSC), analysis. Within the first heating cycle, a glass transition temperature, (Tg), was found with an onset temperature of 73.3° C., a midpoint temperature of 76.2° C., and an endpoint temperature of 77.0° C. This glass transition was not observed during the second heating cycle of the DSC experiment. During the second heating cycle, a small crystalline melting temperature, (Tm), was observed at 138.4° C., (0.1 J/g).

This sample underwent biodegradation testing as described above. After 31 days of testing, 24.4 weight percent of the sample was found to have been biodegraded.

Example 18

To a 250 milliliter glass flask was added dimethyl terephthalate, (67.97 grams), DBE dibasic ester, (20:60:20 mole percent dimethyl succinate:dimethyl glutarate:dimethyl adipate), (24.03 grams), 1,3-propanediol, (60.88 grams), poly(tetramethylene glycol), (average molecular weight of 2000), (5.80 grams), and titanium(IV) isopropoxide, (0.058 grams). The reaction mixture was stirred and heated to 180° C. under a slow nitrogen purge. After reaching 180° C., the reaction mixture was heated to 190° C. over 0.4 hours with stirring under a slight nitrogen purge. The resulting reaction mixture was stirred at 190° C. for 1.1 hours with a slight nitrogen purge. The reaction mixture was then heated to 200° C. over 0.4 hours with stirring under a slow nitrogen purge. The resulting reaction mixture was stirred at 200° C. under a slight nitrogen purge for 1.1 hours. The reaction mixture was then heated in 255° C. over 1.5 hours with stirring under a slight nitrogen purge. The resulting reaction mixture was stirred at 255° C. for 0.5 hours while under a slight nitrogen purge. 28.9 grams of a colorless distillate was collected over this heating cycle. The reaction mixture was then staged to full vacuum with stirring at 255° C. The resulting reaction mixture was stirred for 3.2 hours under full vacuum, (pressure less than 100 mtorr). The vacuum was then released with nitrogen and the reaction mass allowed to cool to room temperature. An additional 16.7 grams of distillate was recovered and 93.22 grams of a solid product was recovered.

A sample of the product was measured for laboratory relative viscosity, (LRV), as described above, and was found to have a LRV of 41.56. This sample was calculated to have an inherent viscosity, (IV), of 1.0 dL/g.

The sample underwent differential scanning calorimetry, (DSC), analysis. A crystalline melting temperature, (Tm), was observed at 179.7° C., (28.1 J/g).

Example 19

To a 250 milliliter glass flask was added dimethyl terephthalate, (67.97 grams), DBE dibasic ester, (20:60:20 mole percent dimethyl succinate:dimethyl glutarate:dimethyl adipate), (24.03 grams), 1,4-butanediol, (72.10 grams), poly(tetramethylene glycol), (average molecular weight of 2000), (2.08 grams), and titanium(IV) isopropoxide, (0.062 grams). The reaction mixture was stirred and heated to 180° C. under a slow nitrogen purge. After reaching 180° C., the reaction mixture was heated to 190° C. over 0.3 hours with stirring under a slight nitrogen purge. The resulting reaction mixture was stirred at 190° C. for 1.0 hour with a slight nitrogen purge. The reaction mixture was then heated to 200° C. over 0.4 hours with stirring under a slow nitrogen purge. The resulting reaction mixture was stirred at 200° C. under a slight nitrogen purge for 1.0 hour. The reaction mixture was then heated to 255° C. over 1.3 hours with stirring under a slight nitrogen purge. The resulting reaction mixture was stirred at 255° C. for 0.7 hours while under a slight nitrogen purge. 39.7 grams of a colorless distillate was collected over this heating cycle. The reaction mixture was then staged to full vacuum with stirring at 255° C. The resulting reaction mixture was stirred for 2.5 hours under full vacuum, (pressure less than 100 mtorr). The vacuum was then released with nitrogen and the reaction mass allowed to cool to room temperature. An additional 10.3 grams of distillate was recovered and 95.5 grams of a solid product was recovered.

A sample of the product was measured for laboratory relative viscosity, (LRV), as described above, and was found to have a LRV of 41.98. This sample was calculated to have an inherent viscosity, (IV), of 1.0 dL/g.

The sample underwent differential scanning calorimetry, (DSC), analysis. A crystalline melting temperature, (Tm), was observed at 178.5° C., (26.9 J/g).

Example 20

Material produced similarly to that described for Example 1, above, except at a larger scale, is dried in a hopper dryer for 8 hours at 70° C. to a −40° C. dew point. The material is then fed at a rate of 20 pounds per hour into the feed section of a ½-inch diameter single screw Davis Standard extruder, (screw L/D of 24:1, model number DS-15H). The extruder conditions and temperature profile is noted below. The molten polymer is then fed into a Killion 3 roll stack sheet line with the conditions and temperature profile noted below.

Extruder Zone 1 temperature, (feed section): 415° F.
Extruder Zone 2 temperature: 440° F.
Extruder Zone 3 temperature: 460° F.
Extruder Zone 4 (front) temperature: 460° F.
Flange: 460° F.
Pipe: 460° F.
Flange: 460° F.
Die temperature: 460° F.
Die Lips: 460° F.
Melt Temperature: 465° F.
Extruder Amps: 5
Extruder RPM: 50
Chill Roll Top temperature: 70° F.
Chill Roll Middle temperature: 70° F.
Chill Roll Bottom temperature: 70° F.
Film Take Off Speed: 235 inches/minute A film 8 inches wide with a thickness of 0.003 inches, (3 mils), is produced.

The film is tested as a fast food sandwich wrap packaging and found to have excellent deadfold performance.

Example 21

2 inch squares of the film produced above in Example 20 is preheated to 50° C. for 4 minutes, (being careful not to allow the hot air to impinge directly onto the film so as to avoid hot spots), and biaxially oriented on a tenter frame T. M. Long Biaxial stretcher. The draw ratio of the stretcher is set at 3 times 3 and the stretching rate is 5 inches per second (12.7 cm/second). The biaxially stretched film is found to have at least a 10 percent greater tensile strength in both the machine direction, (MD), and in the transverse direction, (TD), than the undrawn film.

The biaxially stretched film is tested as a fast food sandwich wrap packaging and found to have excellent deadfold performance.

Examples 22–39 and Comparative Examples CE 6–CE 9

Polymers prepared similarly to those described above in the Examples and Comparative Examples noted below in Table 1, except at a larger scale, are dried in a hopper dryer for 8 hours at 60° C. to a −40° C. dew point. The dried polymers are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with the heater profile noted within Table 1.

TABLE 1

| | | Extruder Heater Profile | | | | | | |
|---|---|---|---|---|---|---|---|---|
| Example | Polymer Example | Zone 1 (° C.) | Zone 2 (° C.) | Zone 3 (° C.) | Zone 4 (° C.) | Zone 5 (° C.) | Die (° C.) | Melt (° C.) |
| CE6 | CE1 | 200 | 225 | 235 | 235 | 235 | 240 | 240 |
| CE7 | CE2 | 235 | 260 | 270 | 270 | 270 | 275 | 280 |
| CE8 | CE3 | 190 | 215 | 230 | 230 | 230 | 235 | 235 |
| 22 | 1 | 200 | 225 | 235 | 235 | 235 | 240 | 240 |
| 23 | 2 | 200 | 225 | 235 | 235 | 235 | 240 | 240 |
| 24 | 3 | 200 | 225 | 235 | 235 | 235 | 240 | 245 |
| 25 | 4 | 205 | 230 | 245 | 245 | 245 | 250 | 250 |
| 26 | 5 | 205 | 230 | 245 | 245 | 245 | 250 | 250 |
| 27 | 6 | 195 | 220 | 230 | 230 | 230 | 235 | 235 |
| 28 | 7 | 210 | 240 | 255 | 255 | 255 | 260 | 265 |
| 29 | 8 | 190 | 215 | 225 | 225 | 225 | 230 | 230 |
| 30 | 9 | 180 | 205 | 220 | 220 | 220 | 225 | 225 |
| 31 | 10 | 180 | 210 | 220 | 220 | 220 | 225 | 225 |
| 32 | 11 | 175 | 200 | 210 | 210 | 210 | 215 | 220 |
| CE9 | CE5 | 165 | 190 | 200 | 200 | 200 | 205 | 210 |
| 33 | 12 | 170 | 195 | 205 | 205 | 205 | 210 | 215 |
| 34 | 13 | 160 | 180 | 190 | 190 | 190 | 195 | 200 |
| 35 | 14 | 170 | 195 | 205 | 205 | 205 | 210 | 215 |
| 36 | 15 | 145 | 165 | 175 | 175 | 175 | 180 | 185 |
| 37 | 16 | 105 | 130 | 140 | 140 | 140 | 145 | 145 |
| 38 | 18 | 165 | 190 | 200 | 200 | 200 | 205 | 205 |
| 39 | 19 | 165 | 190 | 200 | 200 | 200 | 205 | 210 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

Comparative Example CE 8 is found to have a low yield of film due to extensive blocking.

The films of Examples 22–39 are tested as fast food sandwich wraps and are found to have excellent deadfold performance.

The films of Examples 22 to 39 are tested for physical properties and found to have an excellent combination of toughness, as measured by Elmendorf Tear, Graves Tear, and percent elongation at break, and strength, as measured by tensile strength at break and tensile modulus.

10 inch by 16 inch rectangles are cut out of the film of Examples 22–29, and Comparative Example CE 8 and the size accurately measured. The film rectangles are placed in a Fisher Scientific Isotemp Incubator, Model Number 625D, heated to 60° C. for 1 hour. The film rectangles are then accurately remeasured. It is found that Examples 22–29 have at least 10 percent less shrinkage than is found for Comparative Example CE 8.

Pieces of the films of Examples 22–29, Example 33, Comparative Examples CE 6, CE 7, and CE 9, (8-inch by 8-inch squares), are placed in a rotary composter with about 0.5 cubic yards squared of mixed municipal solid waste, (from that glass, cans, and much of the light plastic and paper is removed), and sewage sludge in the ratio of about 2:1. The composter is rotated once a week and the temperature and moisture content is monitored. The films of Examples 22–29 are found to disintegrate at least 10 percent more rapidly than the films of Comparative Examples CE 6 and CE 7. The film of Example 33 is found to disintegrate at least 10 percent more rapidly than the film of Comparative Example CE 9.

Example 40

A polymer prepared similarly to those described in Example 18, except at a larger scale, is dried in a hopper dryer for 8 hours at 80° C. to a −40° C. dew point. The dried polymer is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 170 | 180 | 200 | 200 | 200 | 205 | 195 |

The extruded polymer film is electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

The film is tested as fast food sandwich wraps and is found to have excellent deadfold performance.

Examples 41–57 and Comparative Examples CE 10–CE 13

The films produced in the Examples listed below in Table 2, with a thickness of between about 1.5 mils to 8 mils, are sent through a Machine Direction Orienter (MDO) Model Number 7200 from the Marshall and Williams Company of Providence, Rhode Island. The MDO unit was preheated to the temperature listed in Table 2, below, and the film is stretched as noted below in Table 2 while at that temperature. For example, "Stretched 3X" means that, for example, a 1 meter long film would be stretched to a length of 3 meters.

TABLE 2

| Example | Cast Film Example | MDO Temperature (° C.) | MDO Stretch |
|---|---|---|---|
| CE 10 | CE 6 | 70 | 3× |
| CE 11 | CE 7 | 80 | 3× |
| CE 12 | CE 8 | 40 | 3× |
| 41 | 22 | 60 | 3× |
| 42 | 23 | 60 | 4× |
| 43 | 24 | 55 | 3.5× |
| 44 | 25 | 60 | 4.5× |
| 45 | 26 | 60 | 4× |
| 46 | 27 | 50 | 4× |
| 47 | 28 | 60 | 4× |
| 48 | 29 | 50 | 3.5× |
| 49 | 30 | 45 | 4× |
| 50 | 31 | 50 | 3.5× |
| 51 | 32 | 40 | 3.5× |
| CE 13 | CE 9 | 40 | 4× |
| 52 | 33 | 40 | 4× |
| 53 | 34 | 40 | 3.5× |
| 54 | 35 | 40 | 4× |
| 55 | 36 | 40 | 5× |
| 56 | 37 | 50 | 4× |
| 57 | 38 | 40 | 3.5× |

Comparative Example CE 12 is found to have a low yield of film due to extensive blocking.

The uniaxially stretched films of Examples 41 to 57 are found to have at least a 10 percent greater tensile strength in the machine direction, (MD), than the corresponding undrawn films of Examples 22 to 38.

The uniaxially stretched films of Examples 41 to 57 are tested as a fast food wrap packaging and found to have excellent deadfold performance.

10 inch by inch rectangles are cut out of the film of Examples 41–48, and Comparative Example CE 12 and the size accurately measured. The film rectangles are placed in a Fisher Scientific Isotemp Incubator, Model Number 625D, heated to 60° C. for 1 hour. The film rectangles are then accurately remeasured. It is found that Examples 41–48 have at least 10 percent less shrinkage than is found for Comparative Example CE 12.

Pieces of the films of Examples 41–48, Example 52, Comparative Examples CE 10, CE 11 and CE 13, (8-inch by Finch squares), are placed in a rotary composter with about 0.5 cubic yards squared of mixed municipal solid waste, (from that glass, cans, and much of the light plastic and paper is removed), and sewage sludge in the ratio of about 2:1. The composter is rotated once a week and the temperature and moisture content is monitored. The films of Examples 41–48 are found to disintegrate at least 10 percent more rapidly than the films of Comparative Examples CE 10 and CE 11. The film of Example 52 is found to disintegrate at least 10 percent more rapidly than the film of Comparative Example CE 13.

Examples 58–64

2 inch squares of the films produced above and detailed in Table 3 below are preheated to the temperature noted below in Table 3 for 4 minutes, (being careful not to allow the hot air to impinge directly onto the film so as to avoid hot spots), and biaxially oriented on a tenter frame T. M. Long Biaxial stretcher. The drains ratio of the stretcher is set at 3 times 3 and the stretching rate is 5 inches per second (12.7 cm/second).

TABLE 3

| Example | Cast Film Example | Biaxial Stretch Temperature (° C.) |
|---|---|---|
| 58 | 24 | 60 |
| 59 | 58 | 70 |
| 60 | 31 | 60 |
| 61 | 34 | 50 |
| 62 | 36 | 60 |
| 63 | 37 | 50 |
| 64 | 38 | 60 |

The biaxially stretched films of Examples 58 to 64 are found to have at least a 10 percent greater tensile strength in both the machine direction, (MD), and in the transverse direction, (TD), then found for the corresponding undrawn cast film.

The biaxially stretched films of Examples 58–64 are tested as a fast food sandwich wrap packaging and found to have excellent deadfold performance.

Examples 65–69

A polymer prepared similarly to as described in Example 5, except at a larger scale, is dried in a hopper dryer for 8 hours at 80° C. to a −40° C. dew point. The material is powder blended with 0.10 weight percent, (based on polymer weight), Irganox-1010, a hindered phenolic antioxidant from the Ciba Company. The material is placed in the hopper of a single screw volumetric feeder, (K-tron Model No. 7), from which it free falls to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) |
|---|---|---|---|---|---|
| 200 | 230 | 240 | 240 | 240 | 245 |

A plasticizer, acetyl tri-n-butyl citrate, from Morflex, Inc., is injected into zone 2 at a rate to provide the compositions listed below in Table 4 with an Accurate feeder. The plasticizer level shown in Table 4 is based on the weight of the total composition.

TABLE 4

| Example | Plasticizer Level (wt. %) |
|---|---|
| 65 | 0 |
| 66 | 5 |
| 67 | 10 |
| 68 | 15 |
| 69 | 20 |

The extrude polymer film is electrostatically pinned on a 12 inch diameter smooth quench drum maintained at a temperature of 26° C. with cold water and collected on release paper using a standard tension roll. The quench drum speed is justed from 5 to 15 feet per minute to obtain film samples with a thickness of about 8 mils to about 1.5 mils.

The films of Examples 65–69 are tested as fast food sandwich wrap packaging and are found to have excellent deadfold performance.

Examples 70–75

A polymer prepared as described for Example 15, above, except at a larger scale, is dried overnight in a large tray dryer at 60° C. with hot dry air recirculation to a moisture content of less than 0.04 percent. Corn starch, (Corn Products 3005 from CPC International, Inc.), and rice starch, (Sigma Chemicals catalog number S7260), are dried in a large tray vacuum oven at less than 1 at 90° C. and less than 1 mm Hg vacuum to a moisture content of less than 1 percent and stored in sealed containers until used. Polyethylene adipate, (Rucoflex® S-101-55, nominal molecular weight of 2000, from the Ruco Polymer Corporation), is used directly as received without pretreatment.

Blends of the polymer and starch are made by manually tumbling the materials in plastic bags. The dry starch is added to the warm polymer from the dryer, and the still warm mixture fed to the extruder. When polyethylene adipate, (Rucoflex®), is used, the Rucoflex® is melted and liquid injected into the heater zone of the extruder through a metering pump. The final compositions listed in Table 5, below are prepared.

TABLE 5

| Example | Polymer (wt. %) | Cornstarch (wt. %) | rice starch (wt. %) | Rucoflex ® (wt. %) |
|---|---|---|---|---|
| 70 | 80 | 20 | | |
| 71 | 60 | 40 | | |
| 72 | 55 | 40 | | 5 |
| 73 | 45 | 35 | | 20 |
| 74 | 60 | | 40 | |
| 75 | 45 | | 35 | 20 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a mild mixing screw. The temperature of the extruder barrel is electrically heated from 140° C. at the feed end of the extruder to 180° C. at the discharge. The extruder is operated at 150 RPM, and the vacuum port is connected to house vacuum and permitted to fluctuate with process conditions. A single hole die, (⅛/inch diameter), is used for discharge. The resulting strand is quenched in a 6 foot long water trough, dewatered with an air knife and cut into pellets with a Conair cutter, (Model number 304). Specific operating conditions for the individual compositions are listed below in Table 6.

TABLE 6

| Example | Feed Rate (pph) | Screw Torque (% max.) | Die Pressure (psig) | Melt Temperature (° C.) | Vacuum (Inches Hg) |
|---|---|---|---|---|---|
| 70 | 34 | 58 | 800 | 190 | 13 |
| 71 | 32 | 60 | 800 | 210 | 13 |
| 72 | 31 | 50 | 750 | 205 | 12 |
| 73 | 32 | 35 | 600 | 185 | 12 |
| 74 | 33 | 60 | 800 | 210 | 13 |
| 75 | 32 | 35 | 600 | 185 | 13 |

Examples 76–81

The polymer-starch blends prepared above in Examples 70–75 are dried in a hopper dryer for 8 hours at 60° C. to a −40° C. dew point. The materials are placed in the hopper of a single screw volumetric feeder, (K-tron Model No. 7), from that they free fall to the inlet of a 28 mm Werner and Pfleider twin screw extruder with a vacuum port maintained at house vacuum attached to a 10 inch wide film die with about a 0.010 inch gap. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 145 | 170 | 190 | 190 | 190 | 195 | 200 |

The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 7

| Example | Blend Example |
|---|---|
| 76 | 70 |
| 77 | 71 |
| 78 | 72 |
| 79 | 73 |
| 80 | 74 |
| 81 | 75 |

The films of Examples 76–81 are tested as fast food sandwich packaging and found to have excellent deadfold performance.

Examples 82–88

The polymer prepared similarly to that described for Example 19, above, except at a larger scale, is dried overnight in a large tray dryer at 60° C. with hot dry air recirculation to a moisture content of less than 0.04 percent. Talc, (from Luzenac, located in Englewood, Colo., having a particle size of 3.8 microns), titanium dioxide, (supplied by Kerr-McGee Chemical, LLC, located in Oklahoma City, Okla., grade Tronox® 470, having a particle size of 0.17 micron), and calcium carbonate, (from ECCA Calcium Products, Inc., of Sylacauga, A, ECC Supercoat(T) grade with a 1 micron average particle size), are dried in a large tray vacuum oven at 90° C. and less than 1 mm Hg vacuum to a moisture content of less than 1 percent and stored in sealed containers until used.

Blends of the polymer and the inorganic fillers are made by manually tumbling the materials in plastic bags. The dry inorganic fillers are added to the warm polymer from the dryer, and the still warm mixture fed to the extruder The final compositions listed in Table 8, below, are prepared.

TABLE 8

| Example | Polymer (wt. %) | Talc (wt. %) | Titanium dioxide (wt. %) | Calcium carbonate (wt. %) |
|---|---|---|---|---|
| 82 | 85 | 2.5 | 5 | 7.5 |
| 83 | 70 | 5 | 5 | 20 |
| 84 | 70 | 5 | 10 | 15 |
| 85 | 30 | 10 | 15 | 45 |

TABLE 8-continued

| Example | Polymer (wt. %) | Talc (wt. %) | Titanium dioxide (wt. %) | Calcium carbonate (wt. %) |
|---|---|---|---|---|
| 86 | 95 | 5 | | |
| 87 | 95 | | 5 | |
| 88 | 70 | | | 30 |

The blends are placed in the feed hopper, (with a nitrogen purge), of a Ktron twin screw feeder, (Model Number T-35 with 190 6300 controller), and metered to a Werner and Pfleider ZSK 30 mm twin screw extruder. This extruder has an L/D of 30/1 with a vacuum port and a hard mixing screw. The temperature of the extruder barrel is electrically heated from 170° C. at the feed end of the extruder to 210° C. at the discharge. The extruder is operated at 150 RPM, and the vacuum port is connected to house vacuum and permitted to fluctuate with process conditions. A single hole die, (⅛-inch diameter), is used for discharge. The resulting strand is quenched in a 6 foot long water trough, dewatered with an air knife and cut into pellets with a Conair cutter, (Model number 304). Specific operating conditions for the individual compositions are listed below in Table 9.

TABLE 9

| Example Number | Feed Rate (pph) | Screw Torque (% max.) | Die Pressure (psig) | Melt Temperature (° C.) | Vacuum (Inches Hg) |
|---|---|---|---|---|---|
| 82 | 34 | 52 | 800 | 205 | 13 |
| 83 | 30 | 70 | 800 | 220 | 13 |
| 84 | 31 | 70 | 800 | 220 | 12 |
| 85 | 32 | 80 | 800 | 230 | 12 |
| 86 | 33 | 50 | 600 | 205 | 13 |
| 87 | 32 | 50 | 600 | 205 | 13 |
| 88 | 30 | 70 | 800 | 220 | 12 |

Examples 89–95

The polymer-inorganic filler blends prepared above in Examples 82–88 and a polymer prepared similarly to that described for Example 19, above, except at a larger scale, are dried in a hopper dryer for 8 hours at 60° C. to a −40° C. dew point. The materials are placed in the hopper of a single screw volumetric feeder, (K-tron Model No. 7), from which they free fall to the inlet of a 28 mm Werner and Pfleider twin screw extruder with a vacuum port maintained at house vacuum attached to a 10 inch wide film die with about a 0.010 inch gap. In Example 92, the material is a tumbled blend of 50 weight percent of the material prepared in Example 19 and 50 weight percent of the material prepared in Example 85. A dry nitrogen purge is maintained in the feed hopper and the feed throat of the extruder. The extruder is operated at a 150 RPM screw speed with a heater profile of

| Zone 1 (° C.) | Zone 2 (° C.) | Zone 3 (° C.) | Zone 4 (° C.) | Zone 5 (° C.) | Die (° C.) | Melt (° C.) |
|---|---|---|---|---|---|---|
| 170 | 195 | 210 | 210 | 210 | 215 | 220 |

The polymer blends are extruded and formed into films. The extruded polymer films are electrostatically pinned on a 12 inch diameter smooth quench drum maintained at a temperature of 26° C. with cold water and collected on release paper using a standard tension roll. The quench drum speed is adjusted from 5 to 15 feet per minute to obtain film samples with a thickness of about 8 mils to about 1.5 mils.

TABLE 10

| Example | Blend Example |
|---|---|
| 89 | 82 |
| 90 | 83 |
| 91 | 84 |
| 92 | 50 wt. % 85, 50 wt. % 19 |
| 93 | 86 |
| 94 | 87 |
| 95 | 88 |

The films of Examples 89 to 95 are tested as fast food sandwich packaging and found to have excellent deadfold performance. The films further are found to resemble paper, both in feel and appearance.

Examples 96–102

Polymers prepared as in the Polymer Examples noted below in Table 11, except at a larger scale, are dried overnight at 60° C. in a dehumidified air dryer. The dried polymers are fed to a laboratory scale blown film line that consisted of a Killion 1.25 inch diameter extruder with a 15:1 gear reducer. The extruder heater zones are set around the temperature noted below in Table 11. The screw is a Maddock mixing type with an LID of 24 to 1. The compression ratio for the mixing screw is 3.5:1. The screw speed is 25 to 30 RPM. A 1.21 inch diameter die with a 25 mil die gap is used. The air ring is a Killion single-lip, No. 2 type. Blowing conditions can be characterized by the blow up ratio, (BUR), that is the ratio of the bubble diameter to die the die diameter that gives an indication of hoop or transverse direction, (TD), stretch, or the draw-down ratio, (DDR), that is an indication of the axial or machined direction, (MD), stretch. The greater the level of stretch, the greater the level of orientation in the film.

TABLE 11

| Example Number | Polymer Example Number | Extruder Heater Zones (° C.) | Film Thickness (mils) | BUR | DDR |
|---|---|---|---|---|---|
| 97 | 5 | 240 | 2.5 | 3.2 | 3.9 |
| 98 | 13 | 190 | 2.0 | 2.6 | 4.6 |
| 99 | 15 | 175 | 1.2 | 3.1 | 8.0 |
| 100 | 16 | 140 | 2.0 | 2.5 | 5.0 |
| 101 | 73 | 200 | 1.5 | 3.0 | 7.0 |
| 102 | 84 | 210 | 2.3 | 2.0 | 2.0 |

The tubular films are slit and tested as fast food sandwich packaging and found to have excellent deadfold performance.

Examples 103–105

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3¼ inch David Standard extruders fed the A and B layers. The process line further utilizes a Brampton Engineering rotating air ring for polymer cooling. Layer A contains a polymer prepared similarly to that described for Example 10, except at a large scale. Layer B contains a polymer prepared similarly to that described for Example 15, except at a larger scale. Both polymers are dried in a dehumidified dryer at 60° C. The operation was tailored to provide the layer ratios for the films noted below in Table 12 as of the total film structure. The thickness of the film is about 2.25 mil (0.00225 inch). The processing conditions for the film are provided in Table 13, below

TABLE 12

| Example | Layer A (wt. %) | Layer B |
|---|---|---|
| 103 | 25 | 75 |
| 104 | 50 | 50 |
| 105 | 75 | 25 |

TABLE 13

|  | Extruder A | Extruder B |
|---|---|---|
| Zone 1 | 185° C. | 145° C. |
| Zone 2 | 210° C. | 165° C. |
| Zone 3 | 220° C. | 175° C. |
| Zone 4 | 220° C. | 175° C. |
| Zone 5 | 225° C. | 180° C. |
| Screen Changer | 220° C. | 175° C. |
| Adapter 1 | 220° C. | 175° C. |
| Adapter 2 | 220° C. | 175° C. |
| Adapter 4 | 220° C. | 175° C. |
| Die 1 | 220° C. | 220° C. |
| Die 2 | 220° C. | 220° C. |
| Die 3 | 220° C. | 220° C. |
| Line Speed | 122 feet per minute | |
| Notes | 10 | 15 |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance.

Examples 106–108

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains the plasticized, starch filled polymer prepared similarly to that described for Example 72. Layer B contains a polymer prepared similarly to that described for Example 15, except at a larger scale. Both polymers are dried in a dehumidified dryer at 60° C. The operation is tailored to provide the layer ratios for the films noted below in Table 14 as of the total film structure. The thickness of the film is about 2.25 mil (0.00225 inch). The processing conditions for the film are provided in Table 15, below.

TABLE 14

| Example | Layer A (wt. %) | Layer B (wt. %) |
|---|---|---|
| 106 | 25 | 75 |
| 107 | 50 | 50 |
| 108 | 75 | 25 |

TABLE 15

|  | Extruder A | Extruder B |
|---|---|---|
| Zone 1 | 165° C. | 145° C. |
| Zone 2 | 190° C. | 165° C. |
| Zone 3 | 205° C. | 175° C. |
| Zone 4 | 205° C. | 175° C. |
| Zone 5 | 210° C. | 180° C. |
| Screen Changer | 205° C. | 175° C. |
| Adapter 1 | 205° C. | 175° C. |
| Adapter 2 | 205° C. | 175° C. |
| Adapter 4 | 205° C. | 175° C. |
| Die 1 | 205° C. | 205° C. |
| Die 2 | 205° C. | 205° C. |
| Die 3 | 205° C. | 205° C. |
| Line Speed | 122 feet per minute | |
| Notes | 72 | 15 |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance.

Examples 109–111

Bilayer films are produced on a 10 inch, two layer, Streamlined Coextrusion Die, (SCD), blown film die manufactured by Brampton Engineering. Layer configuration of the die is as follows from outside to inside layers of the die, A/B. Two 3½ inch David Standard extruders fed the A and B layers. The process line further utilizes a Brampton Engineering rotating air ring for polymer cooling. Layer A contains a polymer prepared similarly to that described for Example 8, except at a larger scale. Layer B contains Eastar® Bio, from the Eastman Chemical Company and as described above. Both polymers are dried in a dehumidified dryer at 60° C. The operation was tailored to provide the layer ratios for the films noted below in Table 16 as of the total film structure. The thickness of the film is about 2.25 mil (0.00225 inch). The processing conditions for the film are provided in Table 17, below.

TABLE 16

| Example | Layer A (wt. %) | Layer B (wt. %) |
|---|---|---|
| 109 | 25 | 75 |
| 110 | 50 | 50 |
| 111 | 75 | 25 |

TABLE 17

|  | Extruder A | Extruder B |
|---|---|---|
| Zone 1 | 195° C. | 100° C. |
| Zone 2 | 215° C. | 115° C. |
| Zone 3 | 225° C. | 130° C. |
| Zone 4 | 225° C. | 130° C. |

TABLE 17-continued

|  | Extruder A | Extruder B |
|---|---|---|
| Zone 5 | 230° C. | 135° C. |
| Screen Changer | 225° C. | 130° C. |
| Adapter 1 | 225° C. | 130° C. |
| Adapter 2 | 225° C. | 130° C. |
| Adapter 4 | 225° C. | 130° C. |
| Die 1 | 225° C. | 225° C. |
| Die 2 | 225° C. | 225° C. |
| Die 3 | 225° C. | 225° C. |
| Line Speed | 122 feet per minute | |
| Notes | 8 | Eastar ® Bio |

The multilayer films prepared above are converted into bags using an inline bag machine manufactured by Battenfeld Gloucester Engineering Co., Inc. downstream of the extrusion line nips.

The slit films are tested as fast food sandwich wraps and are found to have excellent deadfold performance.

Examples 112–141 and Comparative Examples CE 14–CE 16

Polyester resins prepared as in the Examples and Comparative Example listed below in Table 18, except at a larger scale, are dried in a desiccant air dryer with a dew point of −40° C. overnight at a temperature of 60° C. The polyester resins are extrusion coated onto paperboard stock by feeding the dried pellets into a 2.5 inch commercial extruder having a barrel length to diameter ratio of 28:1. The five zones of the extruder are maintained at a temperature in the range noted below within Table 18. A single flight screw having eight compression flights, four metering flights, a two flight mixing section and six metering flights is used in the extruder. The screw speed is maintained at 180 revolutions per minute, (RPM). The molten polyester resins are passed through three 24×24 mesh screens. The polymers are passed through a center fed die with 0.75 inch lands having a die opening of 36 inches by 0.02 inches. The extrusion feed rate is held constant at 460 pounds per hour. The resulting extrudates are passed through a 5 inch air gap into the nip formed by a rubber-covered pressure roll and a chill roll. At the same time, the paperboard stock noted below in Table 18, that is 32 inches wide, is fed into the nip with the roll in contact with the film. A nip pressure of 100 pounds per linear inch is applied. A 24 inch diameter mirror finished chill roll is maintained at a temperature of 19° C. during the extrusion trials. The coated paperboard is taken off the chill roll at a point 180 degrees from the nip formed by the pressure roll and the chill roll. The chill roll is operated at linear speeds of 300 feet per minute. At this coating speed, a polyester resin thickness of 1.25 mils is obtained. The polyester resin thickness can be varied by operational modifications.

TABLE 18

| Ex. | Polymer Ex. | Extruder Temp. (° C.) | Paper/Paperboard Stock |
|---|---|---|---|
| CE 14 | CE 3 | 230 | Parchment |
| 112 | 4 | 240 | Parchment |
| 113 | 9 | 225 | 15 pound basis weight Kraft paper |
| 114 | 12 | 205 | 18 pound basis weight natural paper |
| 115 | 15 | 180 | 18 pound basis weight bleached paper |
| 116 | 16 | 150 | 25 pound basis weight bleached Kraft paper |
| 117 | 18 | 210 | 35 pound basis weight natural Kraft paper |
| 118 | 19 | 210 | Parchment |
| 119 | 69 | 240 | 15 pound basis weight Kraft paper |
| 120 | 75 | 180 | 18 pound basis weight bleached paper |
| 121 | 82 | 210 | 18 pound basis weight natural paper |
| CE 15 | CE 3 | 230 | Trilayered cup paperboard (210 g/m² weight) |
| 122 | 5 | 240 | Trilayered cup paperboard (210 g/m² weight) |
| 123 | 10 | 225 | Trilayered cup paperboard (210 g/m² weight) |
| 124 | 13 | 195 | Trilayered cup paperboard (210 g/m² weight) |
| 125 | 15 | 180 | Trilayered cup paperboard (210 g/m² weight) |
| 126 | 16 | 150 | Trilayered cup paperboard (210 g/m² weight) |
| 127 | 18 | 210 | Trilayered cup paperboard (210 g/m² weight) |
| 128 | 19 | 210 | Trilayered cup paperboard (210 g/m² weight) |
| 129 | 66 | 240 | Trilayered cup paperboard (210 g/m² weight) |
| 130 | 71 | 180 | Trilayered cup paperboard (210 g/m² weight) |
| 131 | 83 | 210 | Trilayered cup paperboard (210 g/m² weight) |
| CE 16 | CE 3 | 230 | 18 point paperboard |
| 132 | 6 | 230 | 18 point paperboard |
| 133 | 11 | 215 | 12 point paperboard |
| 134 | 14 | 205 | 18 point paperboard |
| 135 | 15 | 180 | 12 point paperboard |
| 136 | 16 | 150 | 18 point paperboard |
| 137 | 18 | 210 | 12 point paperboard |
| 138 | 19 | 210 | 18 point paperboard |
| 139 | 67 | 240 | 12 point paperboard |
| 140 | 72 | 180 | 18 point paperboard |
| 141 | 84 | 210 | 12 point paperboard |

The materials of Comparative Examples CE 14, CE 15, and CE 16 are found to have a low yield due to extensive blocking of the laminated substrates.

The materials of Examples 112–121 are tested as fast food sandwich wrap packaging and are found to have excellent deadfold performance.

The materials of Examples 112–121 are formed and heat sealed by conventional processes into the shape of envelopes or bags, suitable for, for example, waste, trash, leaf, airsickness, and groceries.

The materials of Examples 122–131 are formed by conventional processes into the shape of cups, glasses, bowls, trays, liquid containers and cartons, suitable for, for example, milk, juice, water, wine, yogurt, cream, and soda.

The materials of Examples 132–141 are formed by conventional processes into the shape of trays, boxes, lidded sandwich containers, lidded salad containers, hinged lid sandwich containers, and hinged lid salad containers.

Example 142

Extrusion-coated paper laminates are prepared as described below. A resin produced as described above in Example 16, above, except at a larger scale, is dried at 60° C. Overnight. The resin is then placed in a hopper above the inlet of a 1 inch, (2.5 cm), extruder, (Echlin Manufacturing Company Serial Number 0717), with an 18 inch wide film die with a 0.007 inch gap. An 18 inch wide nonwoven fabric for use as a support fabric is led continuously at a speed of 47–106 feet/minute through an extrusion coating machine made by Bertek Inc., of St. Albans, Vt. Paper to be coated, (11 inch wide, 18 pound paperstock), is fed over the support fabric, and the assembly is led through a corona treatment, (made by Intercon), through an S-warp between tow 4 inch diameter rolls, heated to 150–260° F., onto a polytetrafluoroethylene-coated, matte-finished chill roll with a diameter of 12 inches, (30 cm.), at 100–200° F., around 300 degrees of the circumference of the 12 inch diameter roll, while the resin is extruded through the die at a delivery rate found appropriate to yield a coating of the desired thickness, at a position between the chill and nip rolls as close as possible to the chill roll, (about 0.25–0.50 inches). The polymer temperature in the extruder is 315° F. and the polymer temperature in the die is 320° F. The polymer temperature can be adjusted to minimize flow irregularity. A film with 0.5 mil thickness is applied to the paper.

The paper laminate is tested as a fast food sandwich wrap packaging and found to have excellent deadfold performance.

Pieces of the laminates, (8-inch by 8-inch squares), are placed in a rotary composter with about 0.5 cubic yards squared of mixed municipal solid waste, (from that glass, cans, and much of the light plastic and paper is removed), and sewage sludge in the ratio of about 2:1. The composter is rotated once a week and the temperature and moisture content is monitored. The laminates are found to rapidly disintegrate.

Example 143

A polymer prepared similarly to as described in Example 11, except at a larger scale, and poly(lactide), (from the Cargill Dow Company), are dried in a hopper dryer overnight at 60° C. to a −40° C. dew point. On a trilayered paperboard that weighs 210 grams/meter$^2$ with a forward speed of 150 meters/minute is coextruded the Example 11 polymer and poly(lactide) in a weight ratio of 1:3. The melt temperature of the Example 11 polymer is 210° C. and the melt temperature of the poly(lactide) is 240° C. A coated paperboard is obtained wherein the total weight of the polymeric coating is 19.4 grams/meter$^2$ in a weight ratio of 75 weight percent of the poly(lactide), that formed the outer layer, and 25 weight percent of the polymer from Example 11, that formed the inner layer adhered to the paperboard.

The paperboard prepared above is formed by conventional processes into the shape of cups, glasses, bowls, trays, liquid containers and cartons, suitable for, for example, milk, juice, water, wine, yogurt, cream, and soda.

Examples 144–149

Calendered paper laminates are prepared by making an assembly of the film produced as described above in the Examples noted below in Table 19, coated onto release paper, in contact with a similar sized sheet of paper to be coated, and then pressed through the nip between a heated polished metal top roll and an unheated resilient (silk) roll at a surface speed of 5 yards/minute, at a temperature of 200° F. and under a pressure of 10 tons.

Details of the various paper substrates of the laminated paper products are given in Table 19, below.

TABLE 19

| Example | Film Example | Paper Substrate | Paper Basis Wt./ Thickness (oz/yd.sup2/mils |
|---------|--------------|-----------------|----------------------------------------------|
| 144 | 22 | Towel, (Scott, Viva) | 1.2/6 |
| 145 | 36 | Towel, (G.P., Sparkle) | 1.3/10 |
| 146 | 53 | Toilet Tissue, (Charmin) | 0.9/6 |
| 147 | 57 | Wrapping Tissue, (white) | 0.5/2 |
| 148 | 78 | Newsprint | 1.5/4 |
| 149 | 90 | Kraft, recycled | 2.8/6 |

Pieces of the laminates, (8-inch by 8-inch squares), are placed in a rotary composter with about 0.5 cubic yards squared of mixed municipal solid waste, (from that glass, cans, and much of the light plastic and paper is removed), and sewage sludge in the ratio of about 2:1. The composter is rotated once a week and the temperature and moisture content is monitored. The laminates are found to rapidly disintegrate.

Example 150

A laminated stock is produced from a combination of a paperboard and a corona-treated polyester film using a combination of two water-based acrylic adhesive formulations. The paperboard base stock is a bleached white paperboard of the type typically referred to as a solid bleached sulfate (SBS) paperboard, which is well known as a base stock for food packaging materials. The paperboard used is uncoated milk carton stock with a thickness of 0.0235 inch and weighing 282 pounds per 3,000 square feet. The film is produced as described in Example 24, above, and is corona discharge treated by conventional methods on one side to enhance adhesive bonding. The lamination process is run on a conventional wet-bond laminating machine with adhesive stations for applying adhesive to both the paperboard and to the film. Adhesive is applied to the paperboard with a 110 line gravure roll applicator delivering about 3 pounds of wet adhesive per 1,000 square feet of paperboard. The adhesive applied to the paperboard consists of 200 pounds of Rhoplex® N-1031 acrylic latex from the Rohm & Haas Company and 1.5 ounces of Foamaster NXZ defoamer (predispersed in an equal volume of water) from the Diamond Shamrock Chemical Company. Adhesive is applied to the corona-treated side of the polyester film. The adhesive applied consists of 375 pounds of Rhoplex® N-1031 acrylic latex from the Rohm & Haas Company, 11.5 pounds of Cymel® 325 melamine-formaldehyde crosslinking agent, 11.5 pounds of isopropyl alcohol, 23 pounds of water, and 3 ounces of Foamaster NXZ defoamer (predispersed in an equal volume of water) from the Diamond Shamrock Chemicals Company.

The laminating process is run with the paperboard and the film running simultaneously through the respective adhesive application stations, and then the paperboard and the film are both directed into a laminating nip where the two adhesive-coated surfaces are joined with the adhesive still moist on both surfaces. The laminating machine is run at a rate of 300 to 350 feet per minute. The laminated stock is run the laminating nip into a hot air oven with an air temperature of 400 degrees F. Residence time for the laminated stock in the oven is about 5 seconds. The laminated stock is then run over a chill roll and rewound into a finished roll.

The laminated stock prepared above is formed by conventional processes into the shape of cups, glasses, bowls, trays, liquid containers and cartons, suitable for, for example, milk, juice, water, wine, yogurt, cream, and soda.

Examples 151–171

These examples demonstrate the lamination of the films of aliphatic-aromatic copolyetheresters onto preformed substrates. The lamination is conducted in a Lab Form Inc. forming machine with a 10 by 10-inch platen. A preformed substrate is shuttled onto the platen. The film is unrolled, preheated for the time noted below in Table 20 by "Black Box Heating" with infrared type heaters. The preheated film is then positioned over the preformed substrate and pulled down onto the preformed substrate. Examples 151–157 utilize vacuum lamination by drawing a vacuum through the preformed substrate, which, in turn, draws the film onto the contours of the preformed substrate. Examples 158–164 utilize plug assisted vacuum lamination whereby, in addition to the above described vacuum, a plug helps to push the preheated film from the side opposite the preformed substrate to help reduce film thinning into deep draw preformed substrates. Examples 165–171 utilize pressure lamination by applying an air pressure to the preheated film side opposite to the preformed substrate, which forces the film onto the contours of the preformed substrate. The lamination process typically takes from 5 to 100 seconds, at that time excess film is trimmed off the laminated substrate and the laminated substrate is ejected and cooled.

The preformed substrates used are as follows: a 9-inch molded "pulp plate", prepared by conventional processes; a formed frozen dinner paperboard "tray", prepared by conventional processes; a formed paperboard coffee "cup", 3.5 inches tall, prepared by conventional processes; a formed paperboard "bowl", 3 inches tall and 4 inches in diameter, prepared by conventional processes; a 9 inch "foam plate", obtained by carefully stripping off the barrier film from commercially available plates obtained from the EarthShell Company, (Stock Number PL9V00001); a 12 ounce "foam bowl", obtained by carefully stripping off the barrier film from commercially available bowls obtained from the EarthShell Company, (Stock Number BL12V00001); hinged-lid salad and sandwich "foam containers" with a double-tab closure mechanism, obtained by carefully stripping off the barrier film from commercially available containers obtained from the EarthShell Company, (Stock Number CLS0001).

TABLE 20

| Example | Film Example | Film Preheat Time(seconds) | Preformed Substrate |
| --- | --- | --- | --- |
| 151 | 23 | 40 | pulp plate |
| 152 | 30 | 30 | tray |
| 153 | 33 | 25 | cup |
| 154 | 36 | 20 | bowl |
| 155 | 39 | 30 | foam plate |
| 156 | 53 | 40 | foam bowl |
| 157 | 89 | 40 | foam containers |
| 158 | 25 | 45 | cup |
| 159 | 31 | 30 | bowl |
| 160 | 34 | 25 | foam bowl |
| 161 | 37 | 10 | foam container |
| 162 | 46 | 40 | cup |
| 163 | 67 | 40 | bowl |
| 164 | 92 | 40 | foam bowl |
| 165 | 26 | 45 | pulp plate |
| 166 | 32 | 30 | tray |
| 167 | 35 | 25 | cup |
| 168 | 38 | 30 | bowl |
| 169 | 47 | 50 | foam plate |
| 170 | 78 | 30 | foam bowl |
| 171 | 94 | 40 | foam containers |

What is claimed is:

1. An aliphatic-aromatic copolyetherester comprising an acid component, a glycol component, and 0 to about 5.0 mole percent based on 100 mole % acid component of a polyfunctional branching agent selected from polyfunctional acid, glycol or mixtures thereof, wherein the acid component comprises
   a. about 90.0 to about 20.0 mole percent of an aromatic dicarboxylic acid component based on 100 mole percent total acid component, and
   b. about 10.0 to about 80.0 mole percent of an aliphatic dicarboxylic acid component based on 100 mole percent total acid component, and wherein
the glycol component comprises
   a. about 99.9 to about 92.0 mole percent of a single glycol component selected from a first glycol component group consisting of ethylene glycol, 1,3-propanediol and 1,4-butanediol,
   b. about 0.1 to 3.0 about mole percent of a poly(alkylene ether) glycol component,
   c. 0 to about 5.0 mole percent of one or more of a second glycol component that is different than the single component selected from the first glycol component group based on 100 mole percent total glycol component, provided that said poly(alkylene ether) glycol component comprises a poly(alkylene ether) glycol other than poly (1,2-propylene glycol).

2. The aliphatic-aromatic copolyetherester of claim 1 wherein said second glycol component is selected from the group consisting of ethylene glycol, 1,3-propanediol, 1,4-butanediol, 1,6-hexanediol, 1,8-octanediol, 1,10-decanediol, 1,12-dodecanediol, 1,14-tetradecanediol, 1,16-hexadecanediol, dimer diol, 4,8-bis(hydroxymethyl)-tricyclo[5.2.1.0/2.6]decane, 1,4-cyclohexanedimethanol, isosorbide, di(ethylene glycol), and tri(ethylene glycol) and mixtures derived therefrom.

3. The aliphatic-aromatic copolyetherester of claim 1 wherein said poly(alkylene ether) glycol component is selected from the group consisting of: poly(ethylene glycol); poly(1,3-propylene glycol); poly(1,4-butylene glycol); polytetrahydrofuran; poly(pentmethylene glycol); poly (hexamethylene glycol); poly(hepthamethylene glycol); poly(ethylene glycol)-block-poly(propylene glycol)-block-poly(ethylene glycol); 4,4'-isopropylidenediphenol ethoxylate; 4,4'-(1-phenylethylidene)bisphenol ethoxylate; 4,4'-ethylidenebisphenol ethoxylate; bis(4-hydroxyphenyl) methane ethoxylate; 4,4'-(1,3-phenylenediisopropylidene) bisphenol ethoxylate; 4,4'-(1,4-phenylenediisopropylidene) bisphenol ethoxylate; sulfonyldiphenol ethoxylate; 4,4'-cyclohexylidenebisphenol ethoxylate; and mixtures derived therefrom.

4. The aliphatic-aromatic copolyetherester of claim 1 wherein said aromatic dicarboxylic acid component is selected from the group consisting of: terephthalic acid, dimethyl terephthalate, bis(2-hydroxyethyl)terephthalate, bis(3-hydroxypropyl)terephthalate, bis(4-hydroxybutyl) terephthalate, isophthalic acid, dimethyl isophthalate, bis(2-hydroxyethyl)isophthalate, bis(3-hydroxypropyl)

isophthalate, bis(4-hydroxybutyl)isophthalate; 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures derived therefrom.

5. The aliphatic-aromatic copolyetherester of claim 1, wherein the acid component comprises about 85 to about 30 mole percent aromatic dicarboxylic acid component and about 15 to about 70 mole percent of said aliphatic dicarboxylic acid component.

6. The aliphatic-aromatic copolyetherester of claim 1, wherein the acid component comprises about 80 to about 40 mole percent aromatic dicarboxylic acid component and about 20 to about 60 mole percent aliphatic dicarboxylic acid component.

7. The aliphatic-aromatic copolyetherester of claim 1, wherein said aliphatic dicarboxylic acid component is selected from the group consisting of oxalic acid, dimethyl oxalate, malonic acid, dimethyl malonate, succinic acid, dimethyl succinate, methylsuccinc acid, glutaric acid, dimethyl glutarate, bis(2-hydroxyethyl)glutarate, bis(3-hydroxypropyl)glutarate, bis(4-hydroxybutyl)glutarate, 2-methylglutaric acid, 3-methylglutaric acid, adipic acid, dimethyl adipate, bis(2-hydroxyethyl)adipate, bis(3-hydroxypropyl)adipate, bis(4-hydroxybutyl)adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures derived therefrom.

8. The aliphatic-aromatic copolyetherester of claim 1 wherein said aliphatic dicarboxylic acid component is selected from the group consisting of succinc acid, dimethyl succinate, glutaric acid, dimethyl glutarate, bis(2-hydroxyethyl)glutarate, bis(3-hydroxypropyl)glutarate, bis(4-hydroxybutyl)glutarate, adipic acid, dimethyl adipate, bis(2-hydroxyethyl)adipate, bis(3-hydroxypropyl)adipate, bis(4-hydroxybutyl)adipate and mixtures derived therefrom.

9. The aliphatic-aromatic copolyetherester of claim 1, wherein said branching agent is selected from the group consisting of: 1,2,4-benzenetricarboxylic acid; trimethyl-1,2,4-benzenetricarboxylate; tris(2-hydroxyethyl)-1,2,4-benzenetricarboxylate; tris(3-hydroxypropyl)-1,2,4-benzenetricarboxylate; tris(4-hydroxybutyl)-1,2,4-benzenetricarboxylate; 1,2,4-benzenetricarboxylic anhydride; 1,3,5-benzenetricarboxylic acid; 1,2,4,5-benzenetetracarboxylic acid; 1,2,4,5-benzenetetracarboxylic dianhydride; 3,3',4,4'-benzophenonetetracarboxylic dianhydride; 1,4,5,8-naphthalenetetracarboxylic dianhydride; citric acid; tetrahydrofuran-2,3,4,5-tetracarboxylic acid; 1,3,5-cyclohexanetricarboxylic acid; pentaerythritol; glycerol; 2-(hydroxymethyl)-1,3-propanediol; 2,2-bis(hydroxymethyl)propionic acid; and mixtures derived therefrom.

10. The aliphatic-aromatic copolyetherester of claim 1, having an inherent viscosity of at least about 0.15 dL/g.

11. The aliphatic-aromatic copolyetherester of claim 10, having an inherent viscosity of at least about 0.35 dL/g.

12. The aliphatic-aromatic copolyetherester of claim 11, having an inherent viscosity of at least about 0.65 dL/g.

13. The aliphatic-aromatic copolyetherester of claim 1, further comprising a filler.

14. The aliphatic-aromatic copolyetherester of claim 13, wherein said filler comprises a first set of particles having a first average particle size, and a second set of particles having a second average particle size, and wherein second average particle size is at least about 2 times that of said first average particle size.

15. The aliphatic-aromatic copolyetherester of claim 13, wherein said filler consists essentially of particles having an average-diameter less than about 40 microns.

16. The aliphatic-aromatic copolyetherester of claim 13, wherein said filler consists essentially of particles having an average diameter less than about 20 microns.

17. A blend comprising an aliphatic-aromatic copolyetherester of claim 1 and at least one other polymer.

18. The blend of claim 17 wherein said other polymer is biodegradable.

19. The blend of claim 18 wherein said biodegradable polymer is selected from the group consisting of poly (hydroxy alkanoates), polycarbonates, poly(caprolactone), aliphatic polyesters, aliphatic-aromatic copolyesters, aliphatic-aromatic copolyetheresters, aliphatic-aromatic copolyamideesters, sulfonated aliphatic-aromatic copolyesters, sulfonated aliphatic-aromatic copolyetheresters, sulfonated aliphatic-aromatic copolyamideesters, and mixtures derived therefrom.

20. The blend of claim 17 wherein said other polymer is nonbiodegradable.

21. The blend of claim 17 wherein said other polymer is a natural polymer.

22. The blend of claim 21 wherein said natural polymer is a starch.

23. A shaped article formed from an aliphatic-aromatic copolyetherester of claim 1 or claim 13.

24. A shaped article of claim 23 selected from the group consisting of films, sheets, fiber, melt blown containers, molded parts, and foamed parts.

25. A film comprising the aliphatic-aromatic copolyetherester of claim 1 or claim 13.

26. The film of claim 25, having a thickness from about 0.025 mm to about 0.15 mm.

27. An oriented film according to claim 25.

28. An oriented film comprising the aliphatic-aromatic copolyetherester of claim 1 wherein said film is biaxially oriented.

29. An oriented film comprising the aliphatic-aromatic copolyetherester of claim 1 wherein said film is uniaxially oriented.

30. A multilayer film comprising a layer comprising an aliphatic-aromatic copolyetherester of claim 1 or claim 13.

31. An article comprising a substrate and a coating on said substrate, said coating comprising an aliphatic-aromatic copolyetherester of claim 1 or claim 13.

32. The article of claim 31 wherein said coating has a thickness from about 0.2 to about 15 mils.

33. The article of claim 32 wherein said coating has a thickness from about 0.5 to about 2 mils.

34. The article of claim 31 wherein said substrate is selected from the group consisting of textiles, nonwovens, foil, paper, paperboard, and metals.

35. An article comprising a substrate having laminated thereon an aliphatic-aromatic copolyetherester of claim 1.

36. The article of claim 35 wherein said substrate is selected from the group consisting of paper, paperboard, cardboard, fiberboard, cellulose, starch, plastic, polystyrene foam, glass, metals, polymeric foams, organic foams, inorganic foams, organic-inorganic foams, and polymeric films.

37. A package comprising an article of claim 35.

38. A wrap comprising an aliphatic-aromatic copolyetherester of claim 1 or claim 13.

39. A sheet comprising an aliphatic-aromatic copolyetherester of claim 1.

40. The sheet of claim 39, having a thickness of at least about 0.50 mm.

41. A fiber comprising an aliphatic-aromatic copolyetherester of claim 1.

42. The fiber of claim 41 having a denier from about 0.1 to about 100.

43. The fiber of claim 42 having a denier from about 0.5 to 20.

44. A fiber comprising an aliphatic-aromatic copolyetherester of claim 1 and at least one other polymer.

45. The fiber of claim 44 wherein said fiber comprises a blend of said aliphatic-aromatic copolyester and one or more natural fibers.

46. The fiber of claim 45 wherein said fiber is a heterogeneous fiber.

47. A foamed article comprising an aliphatic-aromatic copolyetherester of claim 13.

48. An article comprising a substrate having laminated thereon an aliphatic-aromatic copolyetherester of claim 13.

49. A sheet comprising an aliphatic-aromatic copolyetherester of claim 13.

50. A foamed article comprising an aliphatic-aromatic copolyetherester of claim 17.

51. A shaped article formed from an aliphatic-aromatic copolyetherester of claim 17.

52. A shaped article of claim 51 selected from the group consisting of films, sheets, fiber, melt blown containers, molded parts, and foamed parts.

53. A film comprising the aliphatic-aromatic copolyetherester of claim 19.

54. The film of claim 53, having a thickness from about 0.025 mm to about 0.15 mm.

55. An oriented film according to claim 54.

56. A multilayer film comprising a layer comprising an aliphatic-aromatic copolyetherester of claim 17.

57. An article comprising a substrate and a coating on said substrate, said coating comprising an aliphatic-aromatic copolyetherester of claim 17.

58. An article comprising a substrate having laminated thereon an aliphatic-aromatic copolyetherester of claim 17.

59. A wrap comprising an aliphatic-aromatic copolyetherester of claim 17.

60. A sheet comprising an aliphatic-aromatic copolyetherester of claim 17.

61. A foamed article comprising an aliphatic-aromatic copolyetherester of claim 18.

62. A shaped article formed from an aliphatic-aromatic copolyetherester of claim 18.

63. A shaped article of claim 62 selected from the group consisting of films, sheets, fiber, melt blown containers, molded parts, and foamed parts.

64. A film comprising the aliphatic-aromatic copolyetherester of claim 18.

65. The film of claim 64, having a thickness from about 0.025 mm to about 0.15 mm.

66. An oriented film according to claim 65.

67. A multilayer film comprising a layer comprising an aliphatic-aromatic copolyetherester of claim 18.

68. An article comprising a substrate and a coating on said substrate, said coating comprising an aliphatic-aromatic copolyetherester of claim 18 or claim 21.

69. An article comprising a substrate having laminated thereon an aliphatic-aromatic copolyetherester of claim 18 or claim 21.

70. A wrap comprising an aliphatic-aromatic copolyetherester of claim 18 or claim 21.

71. A sheet comprising an aliphatic-aromatic copolyetherester of claim 18 or claim 21.

72. A foamed article comprising an aliphatic-aromatic copolyetherester of claim 21.

73. A shaped article formed from an aliphatic-aromatic copolyetherester of claim 21.

74. A shaped article of claim 73 selected from the group consisting of films, sheets, fiber, melt blown containers, molded parts, and foamed parts.

75. A film comprising the aliphatic-aromatic copolyetherester of claim 21.

76. The film of claim 75, having a thickness from about 0.025 mm to about 0.15 mm.

77. An oriented film according to claim 75.

78. A multilayer film comprising a layer comprising an aliphatic-aromatic copolyetherester of claim 21.

79. A process for producing a package, comprising (1) providing a substrate; (2) forming said substrate into a desired package form; (3) providing an aliphatic-aromatic copolyetherester comprising an acid component, a glycol component, and 0 to about 5.0 mole percent based on 100 mole % acid component of a polyfunctional branching agent selected from polyfunctional acid, glycol or mixtures thereof, wherein the acid component comprises a. about 90.0 to about 20.0 mole percent of an aromatic dicarboxylic acid component based on 100 mole percent total acid component, and b. about 10.0 to about 80.0 mole percent of an aliphatic dicarboxylic acid component based on 100 mole percent total acid component, and wherein the glycol component comprises a. about 99.9 to about 92.0 mole percent of a single glycol component selected from a first glycol component group consisting of ethylene glycol, 1,3-propanediol and 1,4-butanediol, b. about 0.1 to 3.0 about mole percent of a poly(alkylene ether) glycol component a poly(alkylene ether) glycol other than poly (1,2-propylene glycol), c. 0 to about 5.0 mole percent of one or more of a second glycol component that is different than the single component selected from the first glycol component group based on 100 mole percent total glycol component; and (4) laminating or coating said substrate with said aliphatic-aromatic copolyetherester to form said package.

80. The process of claim 79 wherein said substrate comprises a material selected from the group consisting of paper, paperboard, inorganic foams, organic foams, and inorganic-organic foams.

81. The process of claim 79 wherein said package form is selected from the group consisting of wrappers, stretch wrap films, bags, cups, trays, cartons, boxes, bottles, crates, packaging films, blister pack wrappers, skin packaging, and hinged containers.

* * * * *